(12) United States Patent
Clough et al.

(10) Patent No.: US 12,284,955 B2
(45) Date of Patent: Apr. 29, 2025

(54) COMPOSITE MATERIALS PROMOTING THE CATCHMENT AND ATTACHMENT OF SEAWEED HOLDFASTS

(71) Applicant: W. L. Gore & Associates, Inc., Newark, DE (US)

(72) Inventors: Norman E. Clough, Landenberg, PA (US); Eric Dufford, Newark, DE (US); Varendra N. Silva, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 136 days.

(21) Appl. No.: 18/131,934

(22) Filed: Apr. 7, 2023

(65) Prior Publication Data
US 2023/0263118 A1  Aug. 24, 2023

Related U.S. Application Data

(63) Continuation of application No. 17/880,484, filed on Aug. 3, 2022, now abandoned.
(Continued)

(51) Int. Cl.
*A01G 33/00* (2006.01)
*A01G 24/40* (2018.01)
(Continued)

(52) U.S. Cl.
CPC ............ *A01G 33/00* (2013.01); *A01G 24/40* (2018.02); *D02G 3/38* (2013.01); *D02G 3/44* (2013.01);
(Continued)

(58) Field of Classification Search
CPC .......... A01G 33/00; A01G 24/40; D04C 1/02; D07B 1/02; D02G 3/38; D02G 3/44
See application file for complete search history.

(56) References Cited

U.S. PATENT DOCUMENTS

| | | | |
|---|---|---|---|
| 4,235,043 A | 11/1980 | Harasawa | |
| 4,879,232 A | 11/1989 | MacDonald et al. | |

(Continued)

FOREIGN PATENT DOCUMENTS

| | | |
|---|---|---|
| CN | 2653872 Y | 11/2004 |
| CN | 1829667 A | 9/2006 |

(Continued)

OTHER PUBLICATIONS

Bilad, et al., "Membrane technology in microalgae cultivation and harvesting: A review," Biotechnology Advances, vol. 32, No. 7, Nov. 15, 2014, pp. 2.

(Continued)

*Primary Examiner* — Shaun R Hurley

(57) ABSTRACT

Some aspects of the disclosure relate to composite materials and cultivation systems with particular utility for use in aquaculture, for example cultivating various species of seaweed. The systems comprise at least one highly tortuous and often micro-fibrous material and at least one material having low tortuosity. These systems may be configured in a variety of shapes and associated with a number of different structures. Some of these composite materials and cultivation systems may be used in both direct and indirect seeding of macroalgae plants such as seaweed.

20 Claims, 24 Drawing Sheets
(8 of 24 Drawing Sheet(s) Filed in Color)

Related U.S. Application Data

(60) Provisional application No. 63/308,876, filed on Feb. 10, 2022, provisional application No. 63/238,003, filed on Aug. 27, 2021, provisional application No. 63/229,973, filed on Aug. 5, 2021.

(51) Int. Cl.
*D02G 3/04* (2006.01)
*D02G 3/38* (2006.01)
*D02G 3/44* (2006.01)
*D04C 1/02* (2006.01)
*D04C 1/06* (2006.01)

(52) U.S. Cl.
CPC ............... *D04C 1/02* (2013.01); *D04C 1/06* (2013.01); *D02G 3/045* (2013.01); *D10B 2321/042* (2013.01)

(56) References Cited

U.S. PATENT DOCUMENTS

| | | | |
|---|---|---|---|
| 4,921,803 A | 5/1990 | Nohr | |
| 4,950,601 A | 8/1990 | MacDonald et al. | |
| 5,266,476 A | 11/1993 | Sussman et al. | |
| 5,270,207 A | 12/1993 | Matsumura et al. | |
| 5,374,473 A | 12/1994 | Knox et al. | |
| 5,527,456 A | 6/1996 | Jensen | |
| 5,736,398 A | 4/1998 | Giambernardi et al. | |
| 6,821,107 B1 | 11/2004 | Hara et al. | |
| 7,479,243 B2 | 1/2009 | Funaoka et al. | |
| 7,521,010 B2 | 4/2009 | Kennedy et al. | |
| 7,932,184 B2 | 4/2011 | Ishii | |
| 9,441,088 B2 | 9/2016 | Sbriglia et al. | |
| 9,848,544 B2 | 12/2017 | Hessel et al. | |
| 9,926,416 B2 | 3/2018 | Sbriglia | |
| 9,932,429 B2 | 4/2018 | Sbriglia | |
| 2002/0040684 A1 | 4/2002 | McNeil | |
| 2003/0019153 A1 | 1/2003 | Tonkin et al. | |
| 2003/0034115 A1* | 2/2003 | Barth | D04H 3/11 |
| | | | 156/296 |
| 2004/0072338 A1 | 4/2004 | Tsuzuki et al. | |
| 2006/0159718 A1 | 7/2006 | Rathenow et al. | |
| 2006/0251905 A1 | 11/2006 | Arakawa | |
| 2008/0083160 A1 | 4/2008 | Levy | |
| 2008/0155890 A1 | 7/2008 | Oyler | |
| 2010/0003480 A1 | 1/2010 | Agata | |
| 2010/0006497 A1 | 1/2010 | Thottupurathu | |
| 2010/0216203 A1 | 8/2010 | Trent et al. | |
| 2011/0065165 A1 | 3/2011 | Takebe et al. | |
| 2011/0244572 A1 | 10/2011 | Perez et al. | |
| 2011/0289840 A1 | 12/2011 | Bakken | |
| 2012/0076971 A1* | 3/2012 | Debnath | D02G 3/04 |
| | | | 28/165 |
| 2012/0198761 A1 | 8/2012 | Cooke et al. | |
| 2013/0118981 A1 | 5/2013 | Vogel et al. | |
| 2013/0180166 A1 | 7/2013 | Bayless et al. | |
| 2014/0127776 A1 | 5/2014 | Picard | |
| 2014/0273172 A1 | 9/2014 | Gross et al. | |
| 2015/0258250 A1 | 9/2015 | Knisley et al. | |
| 2016/0032069 A1 | 2/2016 | Sbriglia | |
| 2016/0075915 A1 | 3/2016 | Dutta et al. | |
| 2016/0273134 A1 | 9/2016 | Minor et al. | |
| 2017/0027120 A1 | 2/2017 | Parsheh et al. | |
| 2018/0201887 A1 | 7/2018 | Gross et al. | |
| 2018/0263200 A1 | 9/2018 | Elituv et al. | |
| 2019/0186054 A1* | 6/2019 | Debnath | D02G 3/04 |
| 2020/0087520 A1 | 3/2020 | Hebrink et al. | |
| 2020/0123482 A1 | 4/2020 | Gross et al. | |
| 2020/0308732 A1 | 10/2020 | Newbill et al. | |
| 2020/0343511 A1* | 10/2020 | Nagao | H01M 50/457 |
| 2021/0144937 A1 | 5/2021 | Szeman et al. | |
| 2022/0256792 A1 | 8/2022 | Clough | |
| 2022/0259539 A1 | 8/2022 | Clough | |
| 2023/0232761 A1 | 7/2023 | Clough | |
| 2024/0384225 A1 | 11/2024 | Clough | |

FOREIGN PATENT DOCUMENTS

| | | | |
|---|---|---|---|
| CN | 101415818 A | 4/2009 | |
| CN | 103717728 A | 4/2014 | |
| CN | 203833923 U | 9/2014 | |
| CN | 105815208 A | 8/2016 | |
| CN | 106962171 A | 7/2017 | |
| CN | 107429446 A | 12/2017 | |
| CN | 212270341 U | 1/2021 | |
| CN | 115734813 A | 3/2023 | |
| EP | 3079459 A1 | 10/2016 | |
| JP | 01-252225 A | 10/1989 | |
| JP | 02-069120 A | 3/1990 | |
| JP | 02-154685 A | 6/1990 | |
| JP | 06-046827 A | 2/1994 | |
| JP | 06-153695 A | 6/1994 | |
| JP | 09-298965 A | 11/1997 | |
| JP | 2002-065057 A | 3/2002 | |
| JP | 2002-084903 A | 3/2002 | |
| JP | 2003-158928 A | 6/2003 | |
| JP | 2004-000065 A | 1/2004 | |
| JP | 2004-313089 A | 11/2004 | |
| JP | 2005-247627 A | 9/2005 | |
| JP | 2006-314286 A | 11/2006 | |
| JP | 2007-215420 A | 8/2007 | |
| JP | 2011-062123 A | 3/2011 | |
| JP | 2011-172533 A | 9/2011 | |
| JP | 2013-146193 A | 8/2013 | |
| JP | 2013-158928 A | 8/2013 | |
| JP | 2014-030377 A | 2/2014 | |
| JP | 2015-509785 A | 4/2015 | |
| JP | 2016-007173 A | 1/2016 | |
| JP | 2017-099301 A | 6/2017 | |
| KR | 101013888 B1 * | 2/2011 | |
| KR | 20110041225 A * | 4/2011 | |
| KR | 10-1425979 B1 | 8/2014 | |
| KR | 10-2015-0061168 A | 6/2015 | |
| KR | 10-2015-0062338 A | 6/2015 | |
| KR | 101059917 B1 * | 1/2016 | |
| KR | 101586451 B1 * | 1/2016 | |
| KR | 10-2016-0068547 A | 6/2016 | |
| KR | 10-1743653 B1 | 6/2017 | |
| TW | 201832651 A | 9/2018 | |
| WO | 89/12655 A2 | 12/1989 | |
| WO | 92/07525 A1 | 5/1992 | |
| WO | 01/19505 A2 | 3/2001 | |
| WO | 2006/004315 A1 | 1/2006 | |
| WO | 2007/030811 A2 | 3/2007 | |
| WO | WO-2007143433 A1 * | 12/2007 | ............... A61F 2/82 |
| WO | 2012/013345 A1 | 2/2012 | |
| WO | 2012/171123 A1 | 12/2012 | |
| WO | 2014/124391 A2 | 8/2014 | |
| WO | 2015/087153 A1 | 6/2015 | |
| WO | 2016/121767 A1 | 8/2016 | |
| WO | 2017/051334 A1 | 3/2017 | |
| WO | WO-2020006460 A1 * | 1/2020 | ............ B65D 65/466 |
| WO | WO-2020093015 A1 * | 5/2020 | ............. A01N 25/10 |
| WO | 2020/198674 A1 | 10/2020 | |
| WO | 2020/264391 A1 | 12/2020 | |
| WO | 2020/264394 A1 | 12/2020 | |
| WO | 2021/263141 A1 | 12/2021 | |
| WO | 2023/014869 A1 | 2/2023 | |

OTHER PUBLICATIONS

Clough, E. N., "Innovations in ePTFE Fiber Technology: New Capabilities, New Applications, New Opportunities," vol. 59, Dec. 2009, pp. 16.

Drexler, et al., "Membrane applications for microalgae cultivation and harvesting: a review," Reviews in Environmental Science and Bio/Technology, vol. 13, 2014, pp. 487-504.

International Search Report and Written Opinion received for PCT Patent Application No. PCT/US2020/039948, mailed on Oct. 16, 2020, 18 pages.

International Search Report and Written Opinion received for PCT Patent Application No. PCT/US2020/039951, mailed on Oct. 19, 2020, 19 pages.

(56) References Cited

OTHER PUBLICATIONS

International Search Report and Written Opinion received for PCT Patent Application No. PCT/US2021/039150, mailed on Oct. 20, 2021, 19 pages.

International Search Report and Written Opinion received for PCT Patent Application No. PCT/US2022/039401, mailed on Nov. 18, 2022, 10 pages.

Kerrison, et al., Assessing the suitability of twelve polymer substrates for the cultivation of macroalgae Laminaria digitata and Saccharina latissima (Laminariales), Algal Research, vol. 22, Dec. 20, 2016, pp. 127-134.

Kerrison, et al., "Holding (not so) fast: surface chemistry constrains kelp bioadhesion," European Journal of Phycology, vol. 54, No. 3, Feb. 20, 2019, pp. 291-299.

Kerrison, et al., "Optimising the settlement and hatchery culture of Saccharina latissima (Phaeophyta) by manipulation of growth medium and substrate surface condition," Journal of Applied Phycology, vol. 28, No. 2, May 25, 2015, pp. 1181-1191.

Kerrison, et al., "Textile substrate seeding of Saccharina latissima sporophytes using a binder: An effective method for the aquaculture of kelp", Algal Research, vol. 33, Jun. 20, 2018, pp. 352-357.

Kuster, et al., "Thin PTFE-like membranes allow characterizing germination and mechanical penetration competence of pathogenic fungi," Acta Biomaterialia, vol. 4, No. 6, Nov. 1, 2008, pp. 1809-1818.

Philip et al., "Twine selection is essential for successful hatchery cultivation of Saccharina latissima, seeded with either meiospores or juvenile sporophytes", Journal of Applied Phycology, vol. 31, No. 5, Apr. 24, 2019, pp. 3051-3060.

Redmond, S., "Investigations into Applications of Gore-Tex Fibers for Seaweed Cultivation," Springtide Seaweed LLC, Jan. 9, 2019, 21 pages.

Wood, et al., "Living biofouling-resistant membranes as a model for the beneficial use of engineered biofilms," PNAS, vol. 113, No. 20, May 2, 2016, pp. E2802-E2811.

Hwang et al., "Seaweed cultivation and utilization of Korea", Algae, vol. 35, No. 2, Jun. 15, 2020, pp. 107-121.

International Search Report and Written Opinion received for PCT Patent Application No. PCT/US24/29537, mailed on Sep. 9, 2024, 13 pages.

* cited by examiner

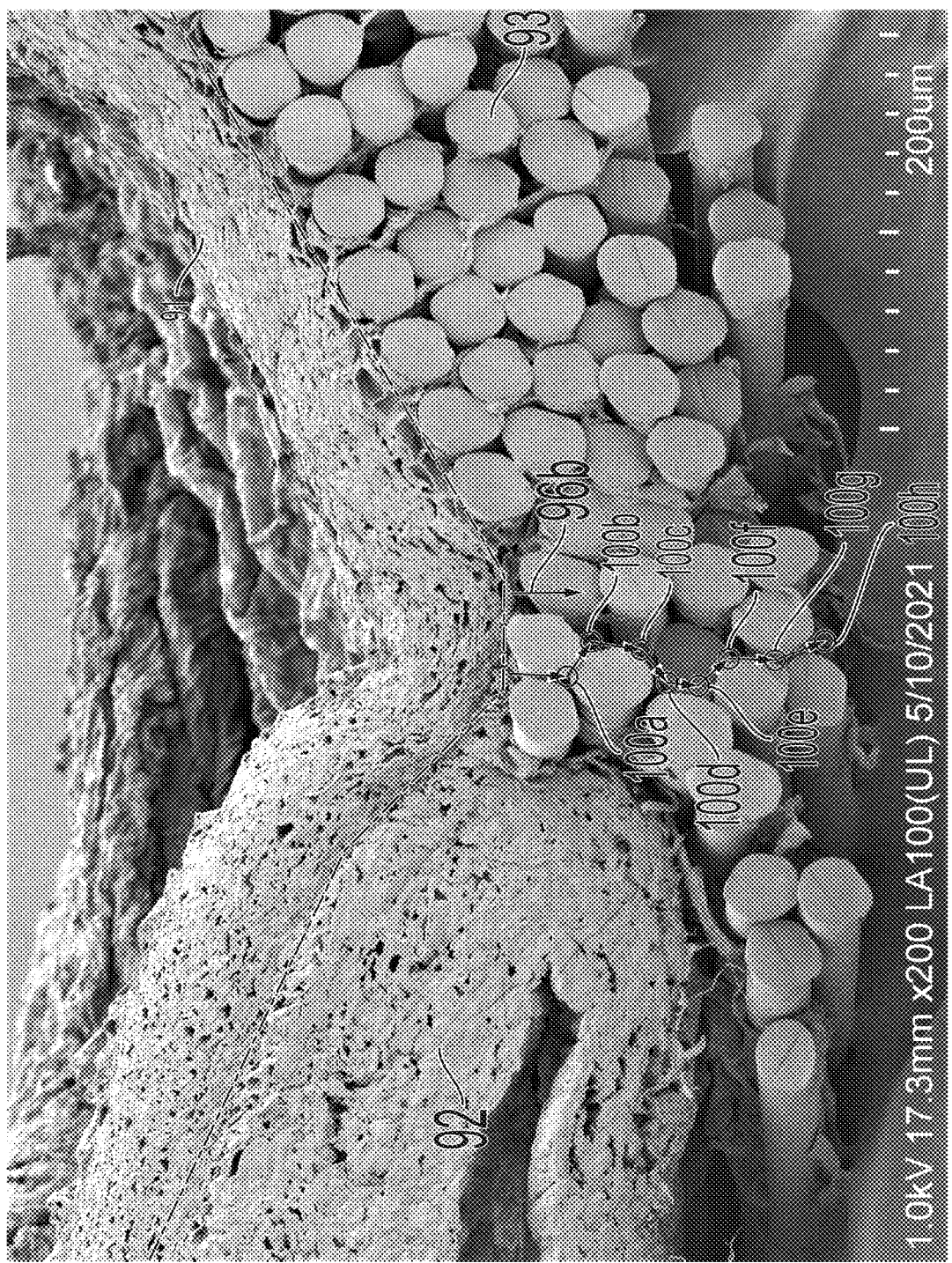

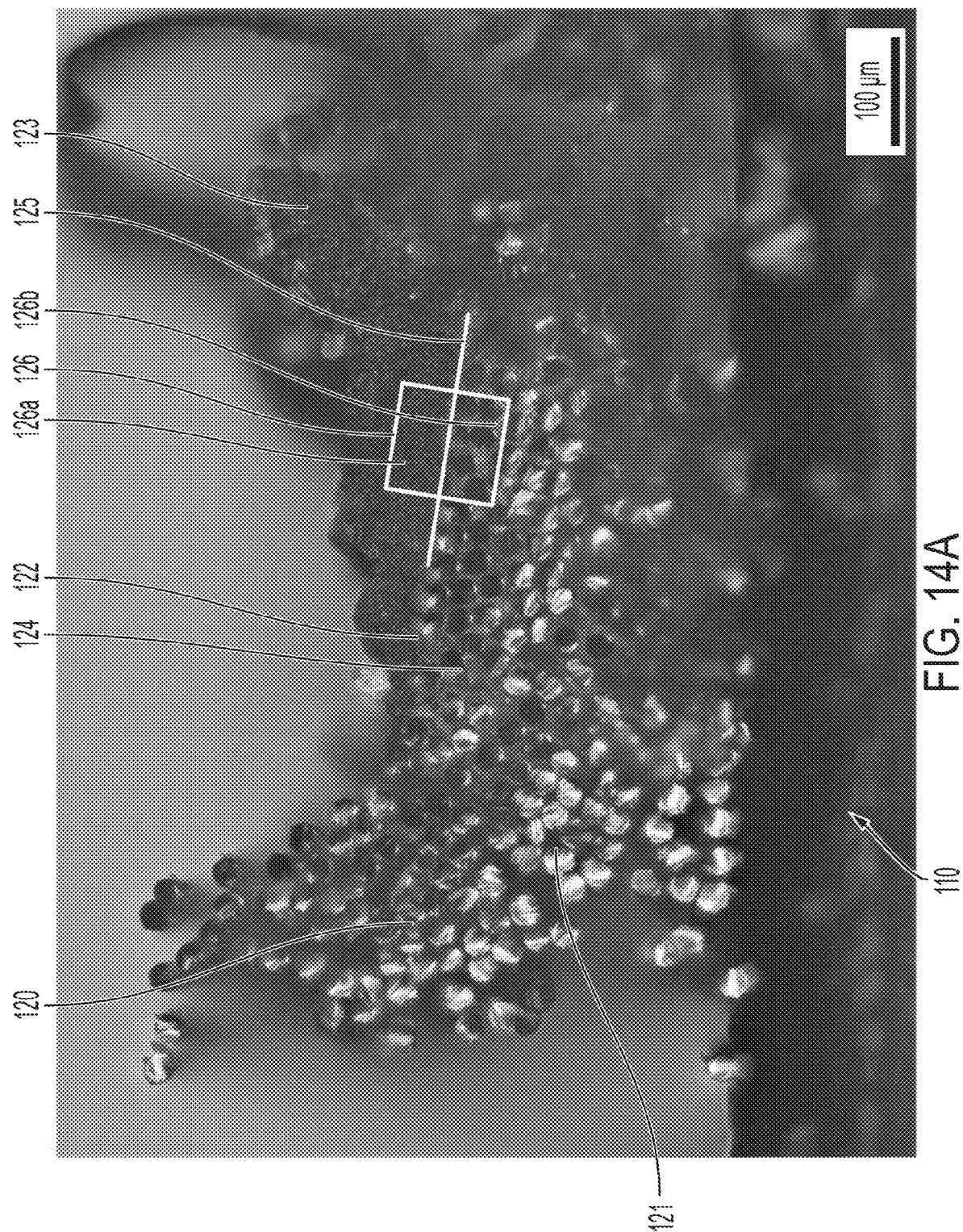

COMPOSITE MATERIALS PROMOTING THE CATCHMENT AND ATTACHMENT OF SEAWEED HOLDFASTS

CROSS-REFERENCE TO RELATED APPLICATION

This application is a continuation of U.S. application Ser. No. 17/880,484, filed Aug. 3, 2022, which claims the benefit of Provisional Application No. 63/229,973, filed Aug. 5, 2021, Provisional Application No. 63/238,003, filed Aug. 27, 2021, and Provisional Application No. 63/308,876, filed Feb. 10, 2022, which are incorporated herein by reference in their entireties for all purposes.

FIELD

The present disclosure relates generally to apparatuses, systems, and methods for cultivating plants. More specifically, the disclosure relates to apparatuses, systems, and methods for promoting the attachment and growth of seaweed spores and/or sporophytes.

BACKGROUND

While significant research and development has gone into the development of biointerfaces for mammalian (e.g., human) cells, there is a need for biointerfaces specifically tailored to nonmammalian cells.

Traditional seaweed hatcheries rely on spores that attach to seed strings. For example, one current process to cultivate seaweed from spores involves using textured nylon "culture strings" or "seed strings" to which the spores weakly attach during a lab-based seeding process and are then nourished through external nutrient systems. The culture string containing weakly attached juvenile seaweed (gametophytes and sporophytes) is then wound onto ropes at a seaweed farm, where the ropes are subsequently placed under water. The process is inherently variable in terms of yield and throughput due in large part to the ease in which the seaweed can be damaged.

Additional approaches to growing seaweed at scale include direct seeding. Many of these methods include growing gametophytes and sporophytes in culture and then removing the gametophytes and sporophytes from the culture media and manually attaching the gametophytes and sporophytes to ropes using binders, which are essentially glues that help to fasten the gametophytes and sporophytes to the ropes on which the seaweed plants are intended to grow. This technique is labor intensive and requires the use of adhesives that may slow the development of a holdfast and may slow plant growth. Clearly, there remains a need for new materials and new methods for both the indirect and the direct growth of seaweed.

SUMMARY

Various embodiments are directed toward cultivation systems configured to attract, retain and viably maintain spores and juvenile seaweed plants, and associated methods of cultivation. Some aspects relate to a cultivation system that includes ropes or platforms that have a composite structure that in turn includes at least two distinct types of materials. The materials include at least one micro-fibrous material that includes a microstructure suitable for attaching holdfasts and elements of holdfasts, especially aquatic plants such as macroalgae. The other is at least one macro-fibrous material that includes macrostructure, suitable for the catchment of young plants. In one exemplary cultivation system, the macro-fibrous material is associated either intimately or proximally to at least one surface of micro-fibrous material comprising the cultivation system. These cultivation systems may be configured in virtually any shape, including, for example, ropes, ribbons, rods, panels, sheets, planks, and the like. These structures may be comprised of at least one material having microstructure configured to retain an adult plant or a form of the plant formed during the plant's reproductive cycle, including but not limited to macroalgae spores, sporophytes, juvenile sporophytes, gametophytes, juvenile plants and/or mature plants and at least one relatively hydrophilic material that acts as an attractant for macroalgae spores, sporophytes, juvenile sporophytes, gametophytes, juvenile plants and/or mature plants.

According to one example ("Ex. 1"), a composite material for growing macroalgae includes at least one first highly tortuous component having an average pore size of between about 1 mm to about 200 mm; and at least one second component, the second component having low tortuosity, wherein at least one portion of the second component is in contact with of at least one portion of the surface of the at least one first highly tortuous component and the highly tortuous component is at least 5 times more tortuous than is the second component having low tortuosity.

According to another example ("Ex. 2"), further to Ex. 1, the first highly tortuous component is at least 50 times more tortuous than the second component having low tortuosity.

According to another example ("Ex. 3"), further to Ex. 1, the first highly tortuous component is at least 500 times more tortuous than the second component having low tortuosity.

According to another example ("Ex. 4"), further to Exs. 1 to 3, the first highly tortuous component is comprised of a micro-fibrous material comprising a network of linked fibers with an inter-fibril distance of about 1 μm to about 200 μm.

According to another example ("Ex. 5"), further to Exs. 1 to 4, the at least one second component having low tortuosity is comprised a bundle of nonlinked fibers.

According to another example ("Ex. 6"), further to Exs. 1 to 4, the at least one second component having low tortuosity is comprised of a bundle of linked fibers.

According to another example ("Ex. 7"), further to Exs. 1 to 6, the highly tortuous components and least one second component having low tortuosity have hydrophilicities that differ from one another.

According to another example ("Ex. 8"), further to Exs. 1 to 7, the second component absorbs more water on a weight basis than does the highly tortuous first component on a weight basis.

According to another example ("Ex. 9"), further to Exs. 1 to 8, the highly tortuous component has a density equal to or less than 1.0 g cm−3 and the second component having low tortuosity has a density greater than or equal to 1.0 g cm−3.

According to another example ("Ex. 10"), further to Exs. 1 to 8, the highly tortuous component has an average density from 0.1 to 1.0 g cm−3.

According to another example ("Ex. 11"), further to Ex. 10, the highly tortuous component has a ratio of the average inter-fibril distance (μm) to the average density (g cm−3) from about 1 to about 2000.

According to another example ("Ex. 12"), further to Exs. 1 to 11, the highly tortuous component has areas with a density equal to or less than 1 g cm−3.

According to another example ("Ex. 13"), further to Exs. 1 to 11, the highly tortuous component has areas with a density equal to or greater than 1.7 g cm−3 or more.

According to another example ("Ex. 14"), further to Exs. 1 to 13, the highly tortuous component includes at least one expanded fluoropolymer.

According to another example ("Ex. 15"), further to Ex. 14, the expanded fluoropolymer is one of: expanded fluorinated ethylene propylene (eFEP), porous perfluoroalkoxy alkane (PFA), expanded ethylene tetrafluoroethylene (eETFE), expanded vinylidene fluoride co-tetrafluoroethylene or trifluoroethylene polymer (eVDF-co-(TFE or TrFE)), or expanded polytetrafluoroethylene (ePTFE).

According to another example ("Ex. 16"), further to Exs. 1 to 15, the composite material includes at least one expanded thermoplastic polymer.

According to another example ("Ex. 17"), further to Ex. 16, the expanded thermoplastic polymer is one of: expanded polyester sulfone (ePES), expanded ultra-high-molecular-weight polyethylene (eUHMWPE), expanded polylactic acid (ePLA), or expanded polyethylene (ePE).

According to another example ("Ex. 18"), further to Exs. 1 to 17, the composite material includes at least one expanded polymer.

According to another example ("Ex. 19"), further to Ex. 18, the expanded polymer is expanded polyurethane (ePU).

According to another example ("Ex. 20"), further to Exs. 1 to 19, the composite material includes at least one polymer formed by expanded chemical vapor deposition (CVD).

According to another example ("Ex. 21"), further to Exs. 1 to 20, the composite material includes expanded polyparaxylylene (ePPX).

According to another example ("Ex. 22"), further to Exs. 1-21, the second component is at least one material selected from the group of materials consisting of: spun/filament polyester, spun/filament nylon, spun HEMP, and natural fibers.

According to another example ("Ex. 23"), further to Exs. 1 to 22, the second component includes at least one material comprised of interconnected fibers.

According to another example ("Ex. 24"), further to Exs. 1 to 23, the second component includes at least one material having a plurality of fibers having at least one end not connected to another fiber in the material.

According to another example ("Ex. 25"), further to Exs. 1 to 24, the composite material is in at least one of the forms selected from the group consisting of: a braid, a knit, a yarn, a covered yarn, a non-woven, a weave, a fabric, a particulate dispersion, a bead, a stitch bonded fabric, and a laminate.

According to another example ("Ex. 26"), further to Exs. 1 to 25, the surface of the composite material has regions or relatively high hydrophilicity and relatively low hydrophilicity.

According to another example ("Ex. 27"), further to Ex. 26, the regions of relatively high hydrophilicity on the surface of the composite material are randomly spaced apart.

According to another example ("Ex. 28"), further to Ex. 26, the regions of relatively high hydrophilicity on the surface of the composite material are uniformly spaced apart.

According to another example ("Ex. 29"), further to Exs. 26 to 28, the regions of relatively high hydrophilicity are any distance from one another in the range of between about 0.9 to about 1.0 mm apart from one another.

According to another example ("Ex. 30"), further to Exs. 26 to 28, the regions of relatively high hydrophilicity are on average about 1.0 mm or more apart from one another.

According to another example ("Ex. 31"), further to Exs. 1 to 30, the highly tortuous component forms a core having a surface.

According to another example ("Ex. 32"), further to Ex. 31, wherein the second component forms bands, and the bands are attached to at least a portion of the surface of the core of the highly tortuous component.

According to another example ("Ex. 33"), further to Ex. 32, the bands are spaced at any distance from one another selected from the range of about 0.9 mm to about 10.1 mm from one another.

According to another example ("Ex. 34"), further to Ex. 32, the bands are spaced more than about 10 mm from one another.

According to another example ("Ex. 35"), further to Ex. 31, wherein the second component is in the form of regular or irregular patches and the patches are evenly or randomly attached to the surface of the core.

According to another example ("Ex. 36"), further to Ex. 31, the second component is the form of at least one rope, and the at least one rope is wrapped around at least a portion of the surface of the core.

According to another example ("Ex. 37"), further to Ex. 31, the second component is the form of at least one ribbon, and the at least one ribbon is wrapped around at least a portion of the surface of the core.

According to another example ("Ex. 38"), further to Ex. 31, the second component is the form of one or more particles, and the at least one or more particles are attached to at least a portion of the surface of the core.

According to another example ("Ex. 39"), further to Exs. 31-38, the core is in at least one form selected from the group of forms consisting of: a rope, a sheet, a column, a sheet, a layer, and a rod.

According to another example ("Ex. 40"), further to Exs. 1 to 30, the composite material is in the form of a braid including at least one highly tortuous component and at least one second component having low tortuosity.

According to another example ("Ex. 41"), further to Exs. 1 to 39, the composite material is in the form of a covered yarn including the at least one highly tortuous component and the at least one second component having low tortuosity.

According to another example ("Ex. 42"), further to Ex. 41, the second component having low tortuosity is wound around the high tortuous component.

According to another example ("Ex. 43"), further to Ex. 42, repeating portions from about 0.9 mm to about 1.1 mm of the surface of the highly tortuous component are not covered by the second component having low tortuosity.

According to another example ("Ex. 44"), further to Ex. 42, repeating portions from about greater than 1.0 mm of the surface of the highly tortuous component are not covered by the second component having low tortuosity.

According to another example ("Ex. 45"), further to Exs. 1-44, the second component is attached to the surface of the highly tortuous component at intervals that promote the catchment of seaweed on the composite material.

According to another example ("Ex. 46"), further to Exs. 1 to 45, the composite material includes at least one nutrient that promotes macroalgae attachment and/or growth.

According to another example ("Ex. 47"), further to Exs. 1 to 46, the highly tortuous component includes a micro-fibrous material and the micro-fibrous material has at least one region of higher porosity portion and at least one lower porosity portion.

According to another example ("Ex. 48"), further to Ex. 47, the micro-fibrous material includes greater inter-fibril distance portions and lower inter-fibril distance portions.

According to another example ("Ex. 49"), further to Exs. 47 to 48, the inter-fibril-distance portions define an axial orientation of the inter-fibril-distance portions.

According to another example ("Ex. 50"), further to Exs. 45 to 49, the highly tortuous components and less tortuous components have different hydrophilicities and the components are randomly associated with one another.

According to another example ("Ex. 51"), further to Exs. 1-50, further including one or more structural elements selected from the group consisting of: rods, backer layers, hollow tubes, sold shafts, ropes, cages, boards, bars, growth modules, linear frames, and circular frames.

According to another example ("Ex. 52"), further to Exs. 1-51, further including at least one material selected from the group consisting of: synthetic fibers, natural fibers, plastic, wood, metals, coated metals, and combinations thereof.

According to another example ("Ex. 53"), further to Exs. 1-52, wherein the composite material is configured to promote spore catchment, development, and growth.

According to another example ("Ex. 54"), further to Exs. 1-52, wherein the composite material is configured to promote catchment, development, and growth of at least one at least one form of the seaweed growth cycle selected from the group consisting of: sporophytes, gametophytes, juvenile sporophytes, juvenile plants, and mature plants.

According to another example ("Ex. 55"), further to Exs. 1 to 52, wherein the composite material is configured to promote direct seeding of at least one of the following forms of macroalgae selected from the group consisting of: sporophytes, gametophytes, juvenile sporophytes, juvenile plants, and mature plants.

According to another example ("Ex. 56"), further to Ex. 55, the composite material further includes at least on exogenous binder selected from the group consisting of an adhesive and a bio-glue.

According to another example ("Ex. 57"), further to Ex. 55, the composite material is substantially free of exogenous binders.

According to another example ("Ex. 58"), further to Exs. 1 to 57, the highly tortuous component is configured to allow for the ingrowth and/or development of seaweed holdfasts.

According to another example ("Ex. 59"), further to Exs. 1-58, the second component having low tortuosity is configured to facilitate the catchment of one or more elements of seaweed growth and reproduction selected from the group consisting of: sporophytes, gametophytes, juvenile sporophytes, juvenile plants, and mature plants.

According to another example ("Ex. 60"), further to Exs. 1 to 59, the composite material is configured to promote the catchment and/or growth of at least one species of macroalgae selected from the group of divisions consisting of: Rhodophyta, Phaeophyceae, and Chlorophyta.

According to another example ("Ex. 61"), further to Exs. 1 to 59, the composite material is configured to promote the catchment and/or growth of at least one species of macroalgae selected from the group consisting of: *Palmaria palmata, Porphyra, Pyropia*, and *Saccharina latissima*.

According to another example ("Ex. 62"), further to Exs. 1 to 59. the second component having low tortuosity is configured to promote the catchment of at least one form of the macroalgae growth cycle, and highly tortuous material is configured to promote the growth, development and attachment of a seaweed holdfast.

According to another example ("Ex. 63"), further to Exs. 1 to 62, the highly tortuous competent is configured to securely anchor a seaweed plant.

According to another example ("Ex. 64"), a cultivation system includes any of the composite materials of Exs. 1-63; and at least one additional feature, wherein the feature is useful for the cultivation of macroalgae.

According to another example ("Ex. 65"), further to Ex. 64 the cultivation system further includes at least support element.

According to another example ("Ex. 66"), further to Ex. 65, wherein the support element includes at least one element selected from the group consisting of: ropes, cables, bars, rods, plates, screens, and sheets.

According to another example ("Ex. 67"), further to Exs. 64 to 66, the cultivation system further includes at least one of the following structures: a hook, a loop, a weight, a float, a buoy, a cage, a screen, a ladder, a tie, and a platform.

According to another example ("Ex. 68"), further to Exs. 64 to 67, the cultivation system further includes at least one of the following structural elements: a backer layer, a carrier layer, a laminate of a plurality of layers, a composite material, or combinations thereof.

According to another example ("Ex. 69"), further to Exs. 64 to 68, wherein the cultivation system is configured to promote the growth and/or harvesting of seaweed.

According to another example ("Ex. 70"), a method for cultivating seaweed includes contacting a population of seaweed spores, gametophytes, or sporophytes with any of the composite material of any of Exs. 1 to 62 until at least a portion of the population of seaweed spores, gametophytes, or sporophytes is retained by the cultivation system.

According to another example ("Ex. 71"), a method for cultivating seaweed includes contacting at least one juvenile and or one mature seaweed plant with the composite material of any of Exs. 1 to 62, until at least a portion of the population of seaweed spores, gametophytes, or sporophytes grows and develops an attachment to the material According to another example ("Ex. 72"), further to Ex. 70 to 71, further including transporting the composite material once at least a portion of at least one seaweed plant or seaweed reproductive structure has attached to said composite material.

According to another example ("Ex. 73"), further to Exs. 70 to 72, further including positioning the composite material including a portion of the population of seaweed plant or seaweed reproductive structure has attached to said composite material in an open-water environment.

According to another example ("Ex. 74"), a composite material for use in the aquaculture of seaweed includes a six-carrier diamond braid of expanded polytetrafluoroethylene (ePTFE) having between about five to six picks per inch, the ePTFE having a density of less than 1.0 g cm−3, a typical inter-fibril spacing of between 1 μm to 50 μm, and linear mass density of 3,000 denier.

According to another example ("Ex. 75"), a material for use in the aquaculture of seaweed includes a six-carrier diamond braid of three carriers, one end of expanded polytetrafluoroethylene (ePTFE), the ePTFE having a density of less than 1.0 g cm−3, a typical inter-fibril spacing of between 1 μm to 50 μm, and linear mass density of 1,000 denier, and one end of 8/1 spun polyester, and three carriers each of two ends of 8/1 spun polyester, said braid having between about five to six picks per inch.

According to another example ("Ex. 76"), a composite material for use in the aquaculture of seaweed includes a double covered yarn consisting of a core comprising an expanded polytetrafluoroethylene (ePTFE), the ePTFE having a density of less than 1.0 g cm−3, a typical inter-fibril spacing of between 1 μm to 50 μm, and linear mass density of 5,000 denier, and a pair of double covered surface windings of 1/8 spun polyester.

According to another example ("Ex. 77"), a method for culturing dulse includes the steps of providing any of the materials of Exs. 72 to 77; and contacting the materials with seaweed from *Palmaria, palmata*, selected from the forms consisting of: spores, sporophytes, juvenile sporophytes, gametophytes, juvenile plants, and mature plants.

According to another example ("Ex. 78"), a seaweed cultivation substrate for anchoring a holdfast of a seaweed plant in an aquatic environment includes a first cord extending over a first length and defining an exterior first cord surface configured to face the aquatic environment, the first cord comprising a plurality of first polymer fibers disposed proximate to each other along the first length and defining a first cross-sectional thickness of the first cord, each of the plurality of first polymer fibers further defining a first spacing between adjacent first polymer fibers, the plurality of first polymer fibers and the first spacing together defining a first natural path length extending from the exterior first cord surface and navigating around adjacent first polymer fibers to a first midpoint (or in a direction of a first midpoint) of the first cross-sectional thickness, the plurality of first polymer fibers and the first spacing together further defining a first tortuosity ratio of the first cord defined by the first natural path length compared to a first straight-line length measured from the exterior first cord surface to the first midpoint (or to a first position in a direction of the first midpoint); a second cord engaging the exterior first cord surface, the second cord extending over a second length and defining an exterior second cord surface configured to face the aquatic environment, the second cord comprising a plurality of second polymer fibers disposed proximate to each other along the second length and defining a second cross-sectional thickness of the second cord, each of the plurality of second polymer fibers further defining a second spacing between adjacent second polymer fibers, the plurality of second fibers and the second spacing together defining a second natural path length extending from the exterior second cord surface and navigating around adjacent second polymer fibers to a second midpoint (or to a second position in a direction of a second midpoint) of the second cross-sectional thickness, the plurality of second polymer fibers and the second spacing together further defining a second tortuosity ratio of the second cord defined by the second natural path length compared to a second straight-line length measured from the exterior second cord surface to the second midpoint (or to a second position in a direction of the second midpoint); wherein the second tortuosity ratio is at least five times greater than the first tortuosity ratio. Alternatively, Ex. 78 may have a first tortuosity ratio that is at least five times greater than the second tortuosity ratio.

The length of a path through preexisting contiguous spaces within a material or between bound or unbound layers, stacks, and/or bundles of elements of a given material may increase as the size of the spaces decreases and the number of the spaces increases per-unit thickness of a given material. A measure of the relative tortuosity of the material may be defined as the ratio of the length of the path through a material measured from a specific starting point on the surface of the material to a specific stopping point at a midpoint in the material (or a point located in a direction of a midpoint of the material) to the length of a straight-line line drawn from the same starting point on the surface of the material to the same stopping point in the midpoint in the material (or at a point in a direction of the midpoint of the material). According to this definition, the higher the ratio the more tortuous the material. For example, the more tortuous material may be at least 5, or 50, or 500 times more tortuous than is the less tortuous material.

Some embodiments of seaweed cultivation substrates are comprised of at least two cords in which each cord possess a different tortuosity. For example, a first cord having relatively low tortuosity is contacted with a portion of the surface of a second cord having relatively high tortuosity, where sections of the surfaces of each material are exposed to the environment. In an aqueous environment the surfaces of the cords not in contact with one another may be in contact with water, for example seawater. The cord comprised of material having high tortuosity may be comprised of a porous or semi-porous micro-fibrous material having a plurality of inter-fibril spaces. The material having low tortuosity may be comprised of porous macro-fibrous material having a plurality of inter-fibril spaces. In some embodiment the porous material having low tortuosity may be comprised of solid or nearly solid individual elements that are positioned relative to one another so as to create spaces between the individual elements. These spaces between elements may be so arranged so as to create a tortuous path. In some embodiments the cords comprised of highly tortuous material may be configured to promote the attachment of aquatic plants such as various species of seaweed, these materials may also be configured to facilitate a substrate suitable for the in-growth of elements of seaweed holdfasts. In some embodiments the material exhibit relatively low tortuosity may be configured to promote the catchment of germinated form of seaweed such a sporophytes, juvenile sporophytes, gametophytes, juvenile plants and plants.

In some embodiments the seaweed substrates may be configured to facilitate direct and/or indirect seeding of various or specific forms of the seaweed in its life cycle extending from spore to mature plant.

According to another example ("Ex. 79"), seaweed cultivation substrate for anchoring a holdfast of a seaweed plant in an aquatic environment includes a first cord disposed over a frame and having a first exterior surface and a series of first fibers defining first passages between the series of first fibers, the first passages extending from the first exterior surface into the first cord. The substrate further includes a second cord having a second exterior surface, the second cord disposed over portions of the first cord to cover said portions of the first cord and present an alternating substrate exterior surface to the aquatic environment. The alternating substrate exterior surface having an uncovered first exterior surface disposed adjacent to the second exterior surface. The second cord has second passages extending from the second exterior surface into the second cord. In some examples, tortuosity may be defined by determining a tortuosity value corresponding to a length of a tortuous path extending into or through a material and navigating into or though the material, the length extending from an entry point into the material along the tortuous path until reaching a terminal point where a cumulative quantity of degrees turned while travelling along the tortuous path equates to at least some angular quantity (e.g., 100 degrees, 200 degrees, 500 degrees, and 1000 degrees).

Thus, according to one example further to Ex. 79, the uncovered first exterior surface extends into the first cord for a first distance from a first entry point toward an interior of the first cord, the uncovered first exterior surface defining a first tortuosity value representing a first length of a first tortuous path extending into or through the uncovered first exterior surface and navigating into or though the material, the first length extending from the first entry point along the first tortuous path until reaching a first terminal point where a cumulative quantity of degrees turned while travelling along the first tortuous path equates to at least 100 degrees, wherein the second exterior surface extends into the second cord for a distance from a second entry point into or through the of the second cord, the second exterior surface defining a second tortuosity value representing a second length of a second tortuous path extending through the second exterior surface and navigating through an approximate second center of the second tortuous path, the second length extending from the second entry point along the second tortuous path until reaching a second terminal point where a cumulative quantity of degrees turned while travelling along the second tortuous path equates to at least 100 degrees, wherein the second tortuosity value is at least five times greater than the first tortuosity value. Alternatively, Ex. 79 may have a first tortuosity value that is at least five times greater than the second tortuosity value.

In some embodiments the tortuosity of a given material may be measured by setting a selected limit on angularity measured, for example, in degrees and tracing the path of a particle though the center of contiguous space defined by elements of a material. The degrees of turn that the particle must make on a given path may be measured for each turn on the particle's path, the degrees of turn being summed until the selected limit on angularity is reached, at which point the total distance into or through the material that the particle traveled from its starting point is measured to render a measure of tortuosity. In the case of a relatively tortuous material, the particle will travel a shorter distance into or through a material relative to a less tortuous material as the particle will undergo more turns in the more tortuous material. Stated differently, particles through tortuous material will travel relatively shorter lengths, or depths, into or through a material as they encounter a plurality of obstacles and must make frequent turns (e.g., being redirected laterally or even in a retrograde direction) without passing further through the thickness of the material. Conversely, particles traveling through material having low tortuosity may be required to make fewer turns and will be able to travel longer distance through the thickness of the material before they reach the arbitrary degrees of angularity. If the same arbitrary limit of angularity is used and the same sized particle is used to trace a path through a material the distance traveled by the particle until it reaches the set limit of angularity may be used to the define the tortuosity of a given material, as function of the number of acute and/or obtuse turns that given body must take to travers a path of a length defined by the path. The change in direction that a given particle must make to avoid or at least minimize contact with the structural elements of the material may be expressed as the total number of degrees of turn required for the particle to traverse a given path through a thickness or depth of material. For comparative purposes the total number of degrees of turns may normalized to a given value expressed per unit of thickness of a given material. For example, 100 degrees of turns may define a 10 µm path into or through a relatively tortuous material, while 100 degrees of turn many define a path extending 1 mm or more into a less tortuous material. In some embodiments, the calculation of the cumulative quantity of degrees may be an addition of the leftward or rightward angulation measured for each turn taken along the tortuous path measured along a two-dimensional plane or along a cutting plane used to cut into the material of the cord during evaluation. In other embodiments, the calculation of the cumulative quantity of degrees may be an addition of the leftward, rightward, upward, and downward angulation measured for each turn taken along the tortuous path measured in a three-dimensional reference system with the angulation attributable to the leftward, rightward, upward, or downward turns being added together to provide the cumulative quantity of degrees. In further embodiments, the measurement of the turns and the angulation of the turns may be based on a centrally positioned tortuous path where the tortuous path remains equidistant from surrounding structure the extend needed to provide a representation of a centrally-positioned tortuous path. In other embodiments, the tortuous path may be biased to one side of a central position based on an equidistance from surround structures. In yet other embodiments, the tortuous path may be biased to favor turns that provide a more direct path towards a center of the cord. In still other embodiments, the tortuous path may be biased to disfavor turns that lead to dead ends or that require reversals of direction. In yet other embodiments, the assessment of the cumulative number of turns, the assessment may disregard turns that provide angulations corresponding to dead ends or reversals. In still other embodiments, the central or biased position along the tortuous path or the assessment of the cumulative quantity of turns may be based on an average of a representative collection of data points or measurements observed from a subject material or cord.

According to another example ("Ex. 80"), a composite material for use in the aquaculture of seaweed, comprising: an eight-carrier diamond braid having at least five picks per inch, the eight-carrier diamond braid having a first group of four carriers and second group of four carriers, wherein each of the four carriers of the first group has one end of an expanded polytetrafluoroethylene (ePTFE) fiber, each of the ePTFE fibers having a density of less than 1.0 g/cc, a typical inter-fibril spacing inclusively between 1 µm and 50 µm, and a linear mass density of at least 1000 denier, with each of the four carriers of the first group further comprising one end of an 8/1 spun polyester fiber, and wherein each of the four carriers of the second group has two ends of an 8/1 spun polyester fiber.

According to another example ("Ex. 81"), a material for use in the aquaculture of seaweed, comprising: an eight-carrier diamond braid having at least five picks per inch, the eight-carrier diamond braid woven with 100% ePTFE fiber having at least eight carriers with each of the at least eight carriers having one end of an ePTFE fiber, each of the ePTFE fibers having a density of less than 1.0 g/cc, a typical inter-fibril spacing inclusively between 1 µm and 50 µm, and a linear mass density of at least 1000 denier.

According to another example ("Ex. 82"), a seaweed cultivation substrate for anchoring a holdfast of a seaweed plant in an aquatic environment, the substrate comprising: any of the materials of Exs. Exs. 80 to 81 and at least one feature for securing the substrate to a fixed object.

According to another example ("Ex. 83"), a method for culturing dulse, comprising the steps of: providing any of the material of any of Exs. 80 or 81; and contacting the material with at least one from of *Palmaria, palmata*, selected from the forms consisting of: spores, sporophytes, juvenile sporophytes, gametophytes, juvenile plants, and mature plants.

According to another example ("Ex. 84"), further to any of Exs. 78 to 83, the first and the second cords have hydrophilicities that differ from one another.

According to another example ("Ex. 85"), further to any of Exs. 78 to 84, the first cord absorbs more water on a weight basis than does the second cord on a weight basis.

According to another example ("Ex. 86"), further to any of Exs. 78 to 85, the second cord has a density equal to or less than 1.0 g cm$^{-3}$ and the first cord has a density greater than or equal to 1.0 g cm$^{-3}$.

According to another example ("Ex. 87"), further to any of Exs. 78 to 86, the second cord has an average density from 0.1 to 1.0 g cm$^{-3}$.

According to another example ("Ex. 88"), further to any of Exs. 78 to 87, the second cord has a ratio of the average inter-fibril distance (μm) to the average density (g cm$^{-3}$) from about 1 to about 2000.

According to another example ("Ex. 89"), further to any of Exs. 78 to 88, the second cord has areas with a density equal to or less than 1 g cm$^{-3}$.

According to another example ("Ex. 90"), further to any of Exs. 78 to 89, the second cord has areas with a density equal to or greater than 1.7 g cm$^{-3}$ or more.

According to another example ("Ex. 91"), further to any of Exs. 78 to 90, wherein the second cord includes at least one expanded fluoropolymer.

According to another example ("Ex. 92"), further to Ex. 91, wherein the expanded fluoropolymer is one of: expanded fluorinated ethylene propylene (eFEP), porous perfluoroalkoxy alkane (PFA), expanded ethylene tetrafluoroethylene (eETFE), expanded vinylidene fluoride co-tetrafluoroethylene or trifluoroethylene polymer (eVDF-co-(TFE or TrFE)), or expanded polytetrafluoroethylene (ePTFE).

According to another example ("Ex. 93"), further to any of Exs. 78 to 92, wherein the cultivation substrate includes at least one expanded thermoplastic polymer.

According to another example ("Ex. 94"), further to Ex. 93, wherein the expanded thermoplastic polymer is one of: expanded polyester sulfone (ePES), expanded ultra-high-molecular-weight polyethylene (eUHMWPE), expanded polylactic acid (ePLA), or expanded polyethylene (ePE).

According to another example ("Ex. 95"), further to any of Exs. 78 to 94, wherein the cultivation substrate includes at least one expanded polymer.

According to another example ("Ex. 96"), further to Ex. 95, wherein the expanded polymer is expanded polyurethane (ePU).

According to another example ("Ex. 97"), further to any of Exs. 78 to 96, wherein the cultivation substrate includes at least one polymer formed by expanded chemical vapor deposition (CVD).

According to another example ("Ex. 98"), further to any of Exs. 78 to 97, wherein the cultivation substrate includes expanded polyparaxylylene (ePPX).

According to another example ("Ex. 99"), further to any of Exs. 78 to 97, wherein the first cord is at least one material selected from the group of materials consisting of: spun/filament polyester, spun/filament nylon, spun HEMP, and natural fibers.

According to another example ("Ex. 100"), further to any of Exs. 78 to 99, wherein the second cord includes at least one material comprising interconnected fibers.

According to another example ("Ex. 101"), further to any of Exs. 78 to 100, wherein the first cord includes at least one material has a plurality of fibers has at least one end not connected to another fiber in the material.

According to another example ("Ex. 102"), further to any of Exs. 78 to 101, wherein the cultivation substrate is in at least one of the forms selected from the group consisting of: a braid, a knit, a yarn, a covered yarn, a nonwoven, a weave, a fabric, a particulate dispersion, a bead, a stitch-bonded fabric, and a laminate.

According to another example ("Ex. 103"), further to any of Exs. 78 to 102, wherein the surface of the cultivation substrate has regions or relatively high hydrophilicity and relatively low hydrophilicity.

According to another example ("Ex. 104"), further to Ex. 103, wherein the regions of relatively high hydrophilicity on the surface of the cultivation substrate are randomly spaced apart.

According to another example ("Ex. 105"), further to Ex. 103, wherein the regions of relatively high hydrophilicity on the surface of the cultivation substrate are uniformly spaced apart.

According to another example ("Ex. 106"), further to any of Exs. 103 to 105, wherein the regions of relatively high hydrophilicity are any distance from one another in the range of between about 0.9 to about 1.0 mm apart from one another.

According to another example ("Ex. 107"), further to any of Exs. 103 to 105, wherein the regions of relatively high hydrophilicity are on average about 1.0 mm or more apart from one another.

According to another example ("Ex. 108"), further to any of Exs. 78 to 107, the second cord forms a core having a surface engaging the first cord.

According to another example ("Ex. 109"), further to Ex. 108, wherein the first cord forms bands, each band defined by a single wrap of the first cord about the second cord, and the bands are attached to at least a portion of the surface of the second cord.

According to another example ("Ex. 110"), further to Ex. 109, wherein the bands are spaced at any distance from one another selected from the range of about 0.9 mm to about 10 mm from one another.

According to another example ("Ex. 111"), further to Ex. 109, wherein the bands are spaced more than about 10 mm from one another.

According to another example ("Ex. 112"), further to Ex. 108, wherein the first cord is in the form of regularly or irregularly spaced bands, and the bands are evenly or randomly attached to the surface of the core, wherein each band is defined by a single wrap of the first cord about the second cord.

According to another example ("Ex. 113"), further to Ex. 108, wherein the first cord is in the form of at least one rope, and the at-least one rope is wrapped around at least a portion of the surface of the core.

According to another example ("Ex. 114"), further to Ex. 108, wherein the first cord is in the form of at least one ribbon, and the at-least one ribbon is wrapped around at least a portion of the surface of the core.

According to another example ("Ex. 115"), further to any of Exs. 108 to 114, wherein the core is in at least one form selected from the group of forms consisting of: a rope, a sheet, a column, a layer, and a rod.

According to another example ("Ex. 116"), further to any of Exs. 78 to 107, wherein the cultivation substrate is in the form of a braid including at least one second cord and at least one first cord.

According to another example ("Ex. 117"), further to any of Exs. 78 to 107, wherein the cultivation substrate is in the form of a covered yarn including the at-least one first cord and at least one second chord.

According to another example ("Ex. 118"), further to Ex. 117, wherein the first cord is wound around the second.

According to another example ("Ex. 119"), further to Ex. 118, wherein repeating portions from about 0.9 mm to about 1.1 mm of the surface of the second cord are not covered by the first cord.

According to another example ("Ex. 120"), further to Ex. 118, wherein repeating portions from about greater than 1.0 mm of the surface of the second cord are not covered by the first cord.

According to another example ("Ex. 121"), further to any of Exs. 78 to 120, wherein the first cord is attached to the surface of the second cord at intervals that promote catchment of the seaweed on the composite.

According to another example ("Ex. 122"), further to any of Exs. 78 to 121, wherein the cultivation substrate includes at least one nutrient that promotes macroalgae attachment and/or growth.

According to another example ("Ex. 123"), further to of any of Exs. 78 to 122, wherein the second cord includes a micro-fibrous material, and the micro-fibrous material has at least one region of higher porosity and at least one region of lower porosity.

According to another example ("Ex. 124"), further to Ex. 123, wherein the micro-fibrous material includes greater inter-fibril-distance portions and lower inter-fibril-distance portions.

According to another example ("Ex. 125"), further to Exs. 124, wherein the inter-fibril-distance portions define an axial orientation of the inter-fibril-distance portions.

According to another example ("Ex. 126"), further to any of Exs. 45 to 49, wherein the first cord and the second cord have different hydrophilicities, and the first cord and the second cord are randomly associated with one another.

According to another example ("Ex. 127"), further to any of Exs. 78 to 126, further including one or more structural elements selected from the group consisting of: rods, backer layers, hollow tubes, sold shafts, ropes, cages, boards, bars, growth modules, linear frames, and circular frames.

According to another example ("Ex. 128"), further to any of Exs. 78 to 127, further including at least one material selected from the group consisting of: synthetic fibers, natural fibers, plastic, wood, metals, coated metals, and combinations thereof.

According to another example ("Ex. 129"), further to any of Exs. 78 to 128, wherein the cultivation substrate is configured to promote spore catchment, development, and growth.

According to another example ("Ex. 130"), further to any of Exs. 78 to 128, wherein the cultivation substrate is configured to promote catchment, development, and growth of at least one form of the seaweed growth cycle selected from the group consisting of: sporophytes, gametophytes, juvenile sporophytes, juvenile plants, and mature plants.

According to another example ("Ex. 131"), further to any of Exs. 78 to 130, wherein the cultivation substrate is configured to promote direct seeding of at least one of the following forms of macroalgae selected from the group consisting of: sporophytes, gametophytes, juvenile sporophytes, juvenile plants, and mature plants.

According to another example ("Ex. 132"), further to Ex. 131, further including at least on exogenous binder selected from the group consisting of an adhesive and a bio-glue.

According to another example ("Ex. 133"), further to Ex. 131, wherein the composite is substantially free of exogenous binders.

According to another example ("Ex. 134"), further to any of Exs. 78 to 133, wherein the second cord is configured to allow for the ingrowth and/or development of seaweed holdfasts.

According to another example ("Ex. 135"), further to any of Exs. 78 to 133, wherein the first cord is configured to facilitate the catchment of one or more elements of seaweed growth and reproduction selected from the group consisting of: sporophytes, gametophytes, juvenile sporophytes, juvenile plants, and mature plants.

According to another example ("Ex. 136"), further to any of Exs. 78 to 135, wherein the cultivation substrate is configured to promote the catchment and/or growth of at least one species of macroalgae selected from the group of genera consisting of: Rhodophyta, Phaeophyceae, and Chlorophyta.

According to another example ("Ex. 137"), further to any of Exs. 78 to 135, wherein the cultivation substrate is configured to promote the catchment and/or growth of at least one species of macroalgae selected from the group consisting of: *Palmaria palmata, Porphyra, Pyropia*, and *Saccharina latissima*.

According to another example ("Ex. 138"), further to any of Exs. 78 to 137, wherein the first cord is configured to promote the catchment of at least one form of the macroalgae growth cycle, and the highly tortuous second cord is configured to promote the growth, development and attachment of a seaweed holdfast.

According to another example ("Ex. 139"), further to any of Exs. 78 to 138, wherein the second cord is configured to securely anchor a seaweed plant.

According to another example ("Ex. 140"), a seaweed cultivation substrate for anchoring a holdfast of a seaweed plant in an aquatic environment, the substrate includes: a first cord disposed over a frame and having a first exterior surface and a series of first fibers defining first passages between the series of first fibers, the first passages extending from the first exterior surface into the first cord; and a second cord having a second exterior surface, the second cord disposed over portions of the first cord to cover said portions of the first cord and present an alternating substrate exterior surface to the aquatic environment having an uncovered first exterior surface disposed adjacent to the second exterior surface, the second cord having second passages extending from the second exterior surface into the second cord, wherein the uncovered first exterior surface extends into the first cord for a first distance from a first entry point towards an interior of the first cord, the uncovered first exterior surface defining a first tortuosity value representing a first length of a first tortuous path extending through the uncovered first exterior surface and navigating through an approximate first center of the first tortuous path, the first length extending from the first entry point along the first tortuous path until reaching a first terminal point where a cumulative quantity of degrees turned while travelling along the first tortuous path equates to at least 100 degrees, wherein the second exterior surface extends into the second cord for a second distance from a second entry point towards an interior of the second cord, the second exterior surface defining a second tortuosity value representing a second length of a second tortuous path extending through the second exterior surface and navigating through an approximate second center of the second tortuous path, the second length extending from the second entry point along the second tortuous path until reaching a second terminal point where a cumulative quantity of degrees turned while travelling along the second tortuous path equates to at least 100 degrees, wherein the second tortuosity value is at least five times greater than the first tortuosity value.

According to another example ("Ex. 141"), further to Ex. 140, wherein the second tortuosity ratio is at least 50 times greater than the first tortuosity ratio.

According to another example ("Ex. 142"), further to Ex. 140, wherein the second tortuosity ratio is at least 500 times greater than the first tortuosity ratio.

According to another example ("Ex. 143"), further to any of Exs. 140 to 142, wherein the said second cord comprises a micro-fibrous material comprising a network of linked fibers with an inter-fibril distance of about 1 μm to about 200 μm.

According to another example ("Ex. 144"), further to any of Exs. 140 to 143, wherein the first cord comprises a bundle of nonlinked fibers.

According to another example ("Ex. 145"), further to any of Exs. 140 to 143, wherein the first cord comprises a bundle of linked fibers.

According to another example ("Ex. 146"), further to any of Exs. 140 to 145, wherein the first cord and the second cords chords have different hydrophilicities.

According to another example ("Ex. 147"), further to any of Exs. 140 to 146, wherein the first cord absorbs more water on a weight basis than does the second cord on a weight basis.

According to another example ("Ex. 148"), further to any of Exs. 140 to 147, the second cord has a density equal to or less than 1.0 g cm$^{-3}$ and the first cord has a density greater than or equal to 1.0 g cm$^{-3}$.

According to another example ("Ex. 149"), further to any of Exs. 140 to 147, the second cord has an average density from 0.1 to 1.0 g cm$^{-3}$.

According to another example ("Ex. 150"), further to any of Exs. 140 to 149, the second cord has a ratio of the average inter-fibril distance (μm) to the average density (g cm$^{-3}$) from about 1 to about 2000.

According to another example ("Ex. 151"), further to any of Exs. 140 to 149, the second cord has areas with a density equal to or less than 1 g cm$^{-3}$.

According to another example ("Ex. 152"), further to any of Exs. 140 to 149, the second cord has areas with a density equal to or greater than 1.7 g cm$^{-3}$ or more.

According to another example ("Ex. 153"), further to any of Exs. 140 to 152, wherein the second cord includes at least one expanded fluoropolymer.

According to another example ("Ex. 154"), further to Exs. 153, wherein the expanded fluoropolymer is one of: expanded fluorinated ethylene propylene (eFEP), porous perfluoroalkoxy alkane (PFA), expanded ethylene tetrafluoroethylene (eETFE), expanded vinylidene fluoride co-tetrafluoroethylene or trifluoroethylene polymer (eVDF-co-(TFE or TrFE)), or expanded polytetrafluoroethylene (ePTFE).

According to another example ("Ex. 155"), further to any of Exs. 140 to 154, wherein the cultivation substrate includes at least one expanded thermoplastic polymer.

According to another example ("Ex. 156"), further to Ex. 155, wherein the expanded thermoplastic polymer is one of: expanded polyester sulfone (ePES), expanded ultra-high-molecular-weight polyethylene (eUHMWPE), expanded polylactic acid (ePLA), or expanded polyethylene (ePE).

According to another example ("Ex. 157"), further to any of Exs. 140 to 156, wherein the cultivation substrate includes at least one expanded polymer.

According to another example ("Ex. 158"), further to Ex. 157, wherein the expanded polymer is expanded polyurethane (ePU).

According to another example ("Ex. 159"), further to any of Exs. 140 to 158, wherein the cultivation substrate includes at least one polymer formed by expanded chemical vapor deposition (CVD).

According to another example ("Ex. 160"), further to any of Exs. 140 to 159, wherein the cultivation substrate includes expanded polyparaxylylene (ePPX).

According to another example ("Ex. 161"), further to any of Exs. 140 to 160, wherein the first cord is at least one material selected from the group of materials consisting of: spun/filament polyester, spun/filament nylon, spun HEMP, and natural fibers.

According to another example ("Ex. 162"), further to any of Exs. 140 to 161, wherein the second cord includes at least one material that includes interconnected fibers.

According to another example ("Ex. 163"), further to any of Exs. 140 to 162, wherein the first cord includes at least one material has a plurality of fibers has at least one end not connected to another fiber in the at least material.

According to another example ("Ex. 164"), further to any of Exs. 140 to 163, wherein the cultivation substrate is in at least one of the forms selected from the group of forms consisting of: a braid, a knit, a yarn, a covered yarn, a nonwoven, a weave, a fabric, a particulate dispersion, a bead, a stitch-bonded fabric, and a laminate.

According to another example ("Ex. 165"), further to any of Exs. 140 to 164, wherein the surface of the cultivation substrate has regions or relatively high hydrophilicity and relatively low hydrophilicity.

According to another example ("Ex. 166"), further to Ex. 165, wherein the regions of relatively high hydrophilicity on the surface of the cultivation substrate are randomly spaced apart.

According to another example ("Ex. 167"), further to Ex. 165, wherein the regions of relatively high hydrophilicity on the surface of the cultivation substrate are uniformly spaced apart.

According to another example ("Ex. 168"), further to any of Exs. 165 to 157, wherein the regions of relatively high hydrophilicity are any distance from one another in the range of between about 0.9 to about 1.0 mm apart from one another.

According to another example ("Ex. 169"), further to any of Exs. 165 to 167, wherein the regions of relatively high hydrophilicity are on average about 1.0 mm or more apart from one another.

According to another example ("Ex. 170"), further to any of Exs. 140-169, wherein the second cord forms a core has a surface.

According to another example ("Ex. 171"), further to Ex. 170, wherein the first cord forms bands, and the bands are attached to at least a portion of the surface of the second cord.

According to another example ("Ex. 172"), further to Ex. 171, wherein the bands are spaced at any distance from one another selected from the range of about 0.9 mm to about 10 mm from one another.

According to another example ("Ex. 173"), further to Ex. 171, wherein the bands are spaced more than about 10 mm from one another.

According to another example ("Ex. 174"), further to Ex. 170, wherein the first cord is in the form of regular or irregular spaced bands, and the bands are evenly or randomly attached to the surface of the core, wherein each band is defined by a single wrap of the first cord about the second cord.

According to another example ("Ex. 175"), further to Ex. 170, wherein the first cord is in the form of at least one rope, and the at-least one rope is wrapped around at least a portion of the surface of the core.

According to another example ("Ex. 176"), further to Ex. 170, wherein the first cord is in the form of at least one ribbon, and the at-least one ribbon is wrapped around at least a portion of the surface of the core.

According to another example ("Ex. 177"), further to any of Exs. 170 to 176, wherein the core is in at least one form selected from the group of forms consisting of: a rope, a sheet, a column, a layer, and a rod.

According to another example ("Ex. 178"), further to any of Exs. 140 to 169, wherein the cultivation substrate is in the form of a braid including at least one second cord and at least one first cord.

According to another example ("Ex. 179"), further to any of Exs. 140 to 179, wherein the composite is in the form of a covered yarn including the at-least one first cord and at least one second chord.

According to another example ("Ex. 180"), further to Ex. 179, wherein the first cordis wound around the second cord.

According to another example ("Ex. 181"), further to Ex. 180, wherein repeating portions from about 0.9 mm to about 1.0 mm of the surface of the second cord are not covered by the first cord.

According to another example ("Ex. 182"), further to Ex. 180, wherein repeating portions from about greater than 1.0 mm of the surface of the second cord are not covered by the first cord.

According to another example ("Ex. 183"), further to any of Exs. 140 to 182, wherein the first cord is attached to the surface of the second cord at intervals that promote catchment of the seaweed on the cultivation substrate.

According to another example ("Ex. 184"), further to any of Exs. 140 to 183, wherein the cultivation substrate includes at least one nutrient that promotes macroalgae attachment and/or growth.

According to another example ("Ex. 185"), further to any of Exs. 140 to 184, wherein the second cord includes a micro-fibrous material, and the micro-fibrous material has at least one region of higher porosity and at least one region of lower porosity.

According to another example ("Ex. 186"), further to Ex. 185, wherein the micro-fibrous material includes greater inter-fibril-distance portions and lower inter-fibril-distance portions.

According to another example ("Ex. 187"), further to Exs. 186, wherein the inter-fibril-distance portions define an axial orientation of the inter-fibril-distance portions.

According to another example ("Ex. 188"), further to any of Exs. 140 to 187, wherein the first cord and the second cord have different hydrophilicities, and the first cord and the second cord are randomly associated with one another.

According to another example ("Ex. 189"), further to of any of Exs. 140 to 188, further including one or more structural elements selected from the group consisting of: rods, backer layers, hollow tubes, sold shafts, ropes, cages, boards, bars, growth modules, linear frames, and circular frames.

According to another example ("Ex. 190"), further to any of Exs. 140 to 189, further including at least one material selected from the group consisting of: synthetic fibers, natural fibers, plastic, wood, metals, coated metals, and combinations thereof.

According to another example ("Ex. 191"), further to any of Exs. 140 to 190, wherein the cultivation substrate is configured to promote spore catchment, development, and growth.

According to another example ("Ex. 192"), further to any of Exs. 140 to 190, wherein the cultivation substrate is configured to promote catchment, development, and growth of at least one form of the seaweed growth cycle selected from the group consisting of: sporophytes, gametophytes, juvenile sporophytes, juvenile plants, and mature plants.

According to another example ("Ex. 193"), further to any of Exs. 140 to 190, wherein the cultivation substrate is configured to promote direct seeding of at least one of the following forms of macroalgae selected from the group consisting of: sporophytes, gametophytes, juvenile sporophytes, juvenile plants, and mature plants.

According to another example ("Ex. 194"), further to Ex. 193, further including at least one exogenous binder selected from the group consisting of an adhesive and a bio-glue.

According to another example ("Ex. 195"), further to Ex. 193, wherein the cultivation substrate is substantially free of exogenous binders.

According to another example ("Ex. 196"), further to any of Exs. 140 to 195, wherein the second cord is configured to allow for the ingrowth and/or development of seaweed holdfasts.

According to another example ("Ex. 197"), further to any of Exs. 140 to 196, wherein the first cord is configured to facilitate the catchment of one or more elements of seaweed growth and reproduction selected from the group consisting of: sporophytes, gametophytes, juvenile sporophytes, juvenile plants, and mature plants.

According to another example ("Ex. 198"), further to any of Exs. 140 to 197, wherein the cultivation substrate is configured to promote the catchment and/or growth of at least one species of macroalgae selected from the group of genera consisting of: Rhodophyta, Phaeophyceae, and Chlorophyta.

According to another example ("Ex. 199"), further to any of Exs. 140 to 197, wherein the cultivation substrate is configured to promote the catchment and/or growth of at least one species of macroalgae selected from the group consisting of: *Palmaria palmata, Porphyra, Pyropia*, and *Saccharina latissima*.

According to another example ("Ex. 200"), further to any of Exs. 140 to 199, wherein the second cord is configured to promote the catchment of at least one form of the macroalgae growth cycle, and the highly tortuous material is configured to promote the growth, development and attachment of a seaweed holdfast.

According to another example ("Ex. 201"), further to any of Exs. 140 to 200, wherein the first cord is configured to securely anchor a seaweed plant.

According to another example ("Ex. 202"), a composite material for use in the aquaculture of seaweed, includes: an eight-carrier diamond braid having at least five picks per inch, the eight-carrier diamond braid having a first group of four carriers and second group of four carriers, wherein each of the four carriers of the first group has one end of an expanded polytetrafluoroethylene (ePTFE) fiber, each of the ePTFE fibers having a density of less than 1.0 g/cc, a typical inter-fibril spacing inclusively between 1 µm and 50 µm, and a linear mass density of at least 1000 denier, with each of the four carriers of the first group further comprising one end of an 8/1 spun polyester fiber, and wherein each of the four carriers of the second group has two ends of an 8/1 spun polyester fiber.

According to another example ("Ex. 203"), a material for use in the aquaculture of seaweed, includes: an eight-carrier diamond braid having at least five picks per inch, the eight-carrier diamond braid woven with 100% ePTFE fiber having at least eight carriers with each of the at least eight carriers having one end of an ePTFE fiber, each of the ePTFE fibers having a density of less than 1.0 g/cc, a typical inter-fibril spacing inclusively between 1 µm and 50 µm, and a linear mass density of at least 1000 denier.

According to another example ("Ex. 204"), a seaweed cultivation substrate for anchoring a holdfast of a seaweed plant in an aquatic environment, the substrate comprising: any of the materials of Exs. 202 to 203 and at least one feature for securing the substrate to a fixed object.

According to another example ("Ex. 205"), a method for culturing dulse, including the steps of: providing any of the material of any of Exs. 202 to 203; and contacting the material with at least one from of *Palmaria, palmata*, selected from the forms consisting of: spores, sporophytes, juvenile sporophytes, gametophytes, juvenile plants, and mature plants.

According to another example ("Ex. 206"), a seaweed cultivation substrate, including: a more porous cultivation substrate material; a less porous cultivation substrate material disposed adjacent to the more porous cultivation substrate material; and an aquatic plant, the aquatic plant having plant matter growing on and into at the more porous cultivation substrate material, wherein the plant matter growth on and into the more porous cultivation substrate forms a plant-material interface, the plant-material interface having a boundary between a first portion of the plant matter growth on the more porous cultivation substrate and an adjacent second portion of the plant matter growth into the more porous cultivation substrate, wherein the first portion and second portion together define a 100 µm thickness of the plant matter growth at the boundary with a first half of the 100 µm thickness being plant matter growth on the more porous cultivation substrate and with a second half of the 100 µm thickness being plant matter growth into the more porous cultivation substrate, and wherein the first and second portions together define a transition of the plant matter growth across the boundary at the plant-material interface, a density of the plant matter growth at the second half being at least 50% of a density of the plant matter growth at the first half.

According to another example ("Ex. 207"), further to Ex. 206, wherein a first material is at least 10 time more porous than a second material.

According to another example ("Ex. 208"), further to any of Exs. 206 to 207, wherein a cross section of the plant-material interface creates a side view of the plant growing on the material and into the material and a bounded area bisected by the defined boundary forms a first half of the bisected area and a second half of the bisected area, where first half of the bisected bounded area includes only the aquatic plant growing naturally and the second half of the bisected bounded area includes a mixture of the material and of the plant matter where the amount of plant matter in the first half of the bisected bounded area the amount of plant matter in the second half of the bisected bounded area determines a ratio.

According to another example ("Ex. 209"), further to Ex. 208, wherein a first ratio is determined using the bounded area bisected by the defined boundary between the plant and the more porous material and a second ratio is determined by the bounded area bisected by the defined boundary between the plant and the less porous material.

According to another example ("Ex. 210"), further to Ex. 209, wherein the first ratio is 5 time smaller than the second ratio.

According to another example ("Ex. 211"), further to Ex. 209, wherein the first ratio is 10 time smaller than the second ratio.

According to another example ("Ex. 212"), further to any of Exs. 206 to 211, wherein the less porous material is at least one material selected from the group consisting of: spun/filament polyester, spun/filament nylon, spun HEMP, and natural fibers.

According to another example ("Ex. 213"), further to any of Exs. 206 to 212, wherein the more porous material is at least one material selected from the group consisting of: expanded fluorinated ethylene propylene (eFEP), porous perfluoroalkoxy alkane (PFA), expanded ethylene tetrafluoroethylene (eETFE), expanded vinylidene fluoride co-tetrafluoroethylene or trifluoroethylene polymer (eVDF-co-(TFE or TrFE)), or expanded polytetrafluoroethylene (ePTFE).

According to another example ("Ex. 214"), further to any of Exs. 206 to 213, wherein the at least two porous materials are combined to form a spun yarn.

According to another example ("Ex. 215"), further to any of Exs. 206 to 214, further including at least one structural element.

According to another example ("Ex. 216"), further to any of Exs. 206 to 215, further including at least one element for fixing the substrate to a specific location.

According to another example ("Ex. 217"), further to any of Exs. 206 to 216, wherein the aquatic plant is a macroalgae.

According to another example ("Ex. 218"), a method of measuring plant in-growth on a cultivation substrate, including the steps of: cross sectioning a portion of the aquatic plant and the cultivation substrate through a boundary between the aquatic plant and a combination zone, the combination zone being an area where the aquatic plant and the cultivation substrate are combined; imaging the cross section across the boundary between the aquatic plant and the combination zone, the image including the placement of a frame of 100 µm by 100 µm placed over the boundary to bisect the frame; comparing a first amount of plant material in a first image of a first half of the bisected frame comprised primarily of plant and a second amount of plant material in a second image of a second half of the bisected frame comprised of the aquatic plant and the cultivation substrate; and scoring a degree of growth by comparing the first amount of plant material to the second amount of plant material, the scoring indicating that a second amount value is at least 50% of a first amount value.

According to another example ("Ex. 219"), further to Ex. 218, further including treating the cross section with a contrast agent before performing the imaging step.

According to another example ("Ex. 220"), further to any of Exs. 218 to 219, where the imaging step uses a technique selected from the group consisting of: visible imaging, fluorescent imaging, and electron microscopy.

According to another example ("Ex. 221"), a seaweed cultivation system for use in an aquatic environment, including: a rope having a rope length sufficient to support a seaweed plant in the aquatic environment, the rope having a first fibrous material extending the rope length to define a tensile strength of the rope, the rope further having a second material disposed adjacent to the first fibrous material and further disposed to present a porous surface of the second material to an exterior of the rope; and a holdfast of the seaweed plant engaging the porous surface of the second material to define an engagement zone at which both first portions of the holdfast are adjacent to the porous surface of the second material and adjoining second portions of the holdfast penetrate the porous surface of the second material, wherein the rope length defines an axis of the rope and the engagement zone is observable in a cross-sectional view provided at a cut portion of the rope disposed perpendicular to the rope axis, an image of the engagement zone further including an engagement region upon which is applied a squared frame engagement zone of 100 µm by 100 µm to dispose a first half of the squared framed engagement zone over one of the first portions of the holdfast and a second half of the squared framed engagement zone over one of the second portions of the holdfast, and wherein the square framed engagement zone first half circumscribes a first viewable area of the image that contains entirely naturally-disposed seaweed plant material to define a 100% seaweed plant benchmark value and wherein the square framed engagement zone second half circumscribes a second viewable area of the image that contains at least 50% seaweed plant material as compared to the 100% seaweed plant benchmark value.

According to another example ("Ex. 222"), further to Ex. 221, wherein a presence of the seaweed plant material is observable with the use of visible light.

According to another example ("Ex. 223"), further to Ex. 221, wherein a presence of the seaweed plant material is observable with the use of a fluorescence-enabling light source, wherein the seaweed plant material fluoresces when exposed to the fluorescence-enabling light source.

According to another example ("Ex. 224"), further to any one of Exs. 221-223, wherein the second viewable area is at least 75% seaweed plant material as compared to the 100% seaweed plant benchmark value.

According to another example ("Ex. 225"), further to any one of Exs. 221-223, wherein the second viewable area is at least 90% seaweed plant material as compared to the 100% seaweed plant benchmark value.

According to another example ("Ex. 226"), further to any one of Exs. 221-223, wherein the second viewable area is 50-90% seaweed plant material as compared to the 100% seaweed plant benchmark value.

According to another example ("Ex. 227"), further to any one of Exs. 221-223, wherein the second viewable area is 50-75% seaweed plant material as compared to the 100% seaweed plant benchmark value.

According to another example ("Ex. 228"), further to any one of Exs. 218-224, wherein the second material is braided with at least a portion of the first fibrous material.

According to another example ("Ex. 229"), further to Ex. 228, wherein the braided second material is disposed to present portions of the second material at varying and non-continuous externally-facing positions along the rope length.

According to another example ("Ex. 230"), further to any one of Exs. 221-227, wherein the second material is disposed on an external surface of the first fibrous material.

According to another example ("Ex. 231"), further to any one of Exs. 221-227, wherein the second material is disposed at multiple discrete and non-continuous locations along the rope length.

According to another example ("Ex. 232"), further to any one of Exs. 221-232, wherein the second material is at least one material selected from the group consisting of: expanded fluorinated ethylene propylene (eFEP), porous perfluoroalkoxy alkane (PFA), expanded ethylene tetrafluoroethylene (eETFE), expanded vinylidene fluoride co-tetrafluoroethylene or trifluoroethylene polymer (eVDF-co-(TFE or TrFE)), and expanded polytetrafluoroethylene (ePTFE).

According to another example ("Ex. 233"), further to any one of Exs. 221-232, wherein the holdfast has grown into the second material over a period of at least 7 days.

According to another example ("Ex. 234"), further to any one of Exs. 221-232, wherein the holdfast has grown into the second material over a period of at least 1 month.

According to another example ("Ex. 235"), further to any one of Exs. 221-232, wherein the holdfast has grown into the second material over a period of at least 3 months.

According to another example ("Ex. 236"), further to any one of Exs. 221-232, wherein the holdfast has grown into the second material over a period defined by a season suitable for the cultivation of the seaweed plant.

According to another example ("Ex. 237"), further to any one of Exs. 221-232, wherein the holdfast has grown into the second material over a period defined by a spore stage of the seaweed plant.

According to another example ("Ex. 238"), further to any one of Exs. 221-232, wherein the holdfast has grown into the second material over a period defined by a seedling stage of the seaweed plant.

According to another example ("Ex. 239"), further to any one of Exs. 221-232, wherein the holdfast has grown into the second material over a period defined by a juvenile stage of the seaweed plant.

According to another example ("Ex. 240"), a seaweed cultivation system for use in an aquatic environment, including: a rope having a rope length sufficient to support a seaweed plant in the aquatic environment, the rope having a fibrous first material extending the rope length to define a tensile strength of the rope, the rope further having a second material disposed adjacent to the first fibrous material and further disposed to present a porous surface of the second material to an exterior of the rope, wherein the first material and the second material are positioned adjacent to each other to present a seaweed growth supporting surface on an exterior surface of the rope, wherein the adjacent first and second materials are viewable at a microscopic level to provide an image of a first natural path extending into the first material and a second natural path extending into the second material, wherein the image of the first material defines a first tortuosity value of the first material and wherein the image of the second material defines a second tortuosity value of the second material, wherein the second material tortuosity value is greater than the first material tortuosity value.

According to another example ("Ex. 241"), further to Ex. 240, wherein the image is a two-dimensional perspective applied to a three-dimensional view of the cord.

According to another example ("Ex. 242"), further to any one of Exs. 240-241, wherein the image includes both the first and second materials.

According to another example ("Ex. 243"), further to any one of Exs. 240-241, wherein the image includes a first image of the first material and a second image of the second material.

According to another example ("Ex. 244"), further to any one of Exs. 240-243, wherein the image is enhanced by a tracing applied to the image to trace the first natural path and/or the second natural path.

According to another example ("Ex. 245"), further to any one of Exs. 240-244, wherein a seaweed plant in-growth is present within the cord, wherein the image is enhanced by a tracing applied to the image to trace a natural path defined by the ingrowth.

According to another example ("Ex. 246"), further to any one of Exs. 240-245, wherein the natural path is defined to advance in a direction towards a midpoint of the cord.

According to another example ("Ex. 247"), further to any one of Exs. 240-246, wherein the natural path is defined to advance in a direction that is orthogonal to the cord surface.

According to another example ("Ex. 248"), further to any one of Exs. 240-247, wherein the natural path includes a series of turns providing an angulation of the natural path.

According to another example ("Ex. 249"), further to any one of Exs. 240-248, wherein the natural path defines a terminal point of the natural path.

According to another example ("Ex. 250"), further to Ex. 249, wherein the terminal point defines a straight-line depth relative to the cord surface.

According to another example ("Ex. 251"), further to any one of Exs. 240-250, wherein the first tortuosity value is based on a comparison of the first natural path having a first natural path length and a first terminal point to a first depth, wherein the first tortuosity value is at least one of less than 2, between 1 and 2, between 1 and 1.75, between 1 and 1.50, and between 1 and 1.25.

According to another example ("Ex. 252"), further to any one of Exs. 240-251, wherein the second tortuosity value is based on a comparison of the second natural path having a second natural path length and a second terminal point to a second depth, wherein the second tortuosity value is one of an inclusive range of 2-200, an inclusive range of 2-100, an inclusive range of 2-50, an inclusive range of 2-10, an inclusive range of 2-5, an inclusive range of 2-3, an inclusive range of 5-200, an inclusive range of 5-100, an inclusive range of 5-50, an inclusive range of 5-10, an inclusive range of 10-200, an inclusive range of 10-100, an inclusive range of 10-50, an inclusive range of 50-200, an inclusive range of 50-100, and an inclusive range of 100-200.

According to another example ("Ex. 253"), further to any one of Exs. 240-252, wherein the second tortuosity value is based on a comparison of the second natural path having a second natural path length and a second terminal point to a second depth, wherein the second tortuosity value is one of equal or greater than 2, equal or greater than 5, equal or greater than 10, equal or greater than 20, equal or greater than 50, equal or greater than 100, and equal or greater than 200.

According to another example ("Ex. 254"), further to any one of Exs. 240-253, wherein the first tortuosity value is based on a quantity of turning experienced along the first natural path per a first unit length of the first natural path, wherein the first tortuosity value is less than 3.00 degrees/μm.

According to another example ("Ex. 255"), further to any one of Exs. 240-254, wherein the second tortuosity value is based on a quantity of turning experienced along the second natural path per a second unit length of the second natural path, wherein the second tortuosity value is one of an inclusive range of 3-1000 degrees/μm, an inclusive range of 3-500 degrees/μm, an inclusive range of 3-200 degrees/μm, an inclusive range of 3-100 degrees/μm, an inclusive range of 3-50 degrees/μm, an inclusive range of 3-10 degrees/μm, an inclusive range of 3-5 degrees/μm, an inclusive range of 5-1000 degrees/μm, an inclusive range of 5-500 degrees/μm, an inclusive range of 5-200 degrees/μm, an inclusive range of 5-100 degrees/μm, an inclusive range of 5-50 degrees/μm, an inclusive range of 5-10 degrees/μm, an inclusive range of 7-1000 degrees/μm, an inclusive range of 7-500 degrees/μm, an inclusive range of 7-200 degrees/μm, an inclusive range of 7-100 degrees/μm, an inclusive range of 7-50 degrees/μm, and an inclusive range of 7-10 degrees/μm.

According to another example ("Ex. 256"), further to any one of Exs. 240-255, wherein the second tortuosity value is based on a quantity of turning experienced along the second natural path per a second unit length of the second natural path, wherein the second tortuosity value is one of equal or greater than 3 degrees/μm, equal or greater than 5 degrees/μm, equal or greater than 7 degrees/μm, and equal or greater than 10 degrees/μm.

According to another example ("Ex. 257"), further to any one of Exs. 240-256, wherein the first tortuosity value is based on the first natural path having a first depth-advancing portion and a first depth-neutral portion and further based on a percentage of the first depth-neutral portion compared to a total of the first depth-advancing portion and the first depth-neutral portion, wherein the first tortuosity value is less than 30%.

According to another example ("Ex. 258"), further to any one of Exs. 240-257, wherein the second tortuosity value is based on the second natural path having a second depth-advancing portion and a second depth-neutral portion and further based on a percentage of the second depth-neutral portion compared to a total of the second depth-advancing portion and the second depth-neutral portion, wherein the second tortuosity value is at least one of an inclusive range of 30-90%, an inclusive range of 30-80%, an inclusive range of 30-70%, an inclusive range of 30-60%, an inclusive range of 30-50%, an inclusive range of 30-40%, an inclusive range of 40-90%, an inclusive range of 40-80%, an inclusive range of 40-70%, an inclusive range of 40-60%, an inclusive range of 40-50%, an inclusive range of 50-90%, an inclusive range of 50-80%, an inclusive range of 50-70%, an inclusive range of 50-60%, an inclusive range of 60-90%, an inclusive range of 60-80%, an inclusive range of 60-70%, an inclusive range of 70-90%, an inclusive range of 70-80%, and an inclusive range of 80-90%.

According to another example ("Ex. 259"), further to any one of Exs. 240-258, wherein the second tortuosity value is based on the second natural path having a second depth-advancing portion and a second depth-neutral portion and further based on a percentage of the second depth-neutral portion compared to a total of the second depth-advancing portion and the second depth-neutral portion, wherein the second tortuosity value is one of equal or greater than 50%, equal or greater than 60%, equal or greater than 70%, equal or greater than 80%, and equal or greater than 90%.

According to another example ("Ex. 260"), further to any one of Exs. 240-259, wherein the first tortuosity value is based on a visual presence of a seaweed ingrowth into the first material within a 100 μm square frame applied to a first image with the square frame bisected by the cord surface, and further based on a comparison of the visual presence of the seaweed in a first half of the square frame to a second half of the square frame, wherein the first tortuosity value is a range of 10%-25%.

According to another example ("Ex. 261"), further to any one of Exs. 240-260, wherein the second tortuosity value is based on a visual presence of a seaweed ingrowth into the second material within a 100 μm square frame applied to a second image with the square frame bisected by the cord surface, and further based on a comparison of the visual presence of the seaweed in a first half of the square frame to a second half of the square frame, wherein the first tortuosity value is at least one of an inclusive range of 25% to 90%, an inclusive range of 30-90%, an inclusive range of 30-80%, an inclusive range of 30-70%, an inclusive range of 30-60%, an inclusive range of 30-50%, an inclusive range of 30-40%, an inclusive range of 40-90%, an inclusive range of 40-80%, an inclusive range of 40-70%, an inclusive range of 40-60%, an inclusive range of 40-50%, an inclusive range of 50-90%, an inclusive range of 50-80%, an inclusive range of 50-70%, an inclusive range of 50-60%, an inclusive range of 60-90%, an inclusive range of 60-80%, an inclusive range of 60-70%, an inclusive range of 70-90%, an inclusive range of 70-80%, and an inclusive range of 80-90%.

According to another example ("Ex. 262"), further to any one of Exs. 240-261, wherein the second tortuosity value is based on a visual presence of a seaweed ingrowth into the second material within a 100 µm square frame applied to a second image with the square frame bisected by the cord surface, and further based on a comparison of the visual presence of the seaweed in a first half of the square frame to a second half of the square frame, wherein the first tortuosity value is one of equal or greater than 25%, equal or greater than 30%, equal or greater than 40%, equal or greater than 50%, equal or greater than 60%, equal or greater than 70%, equal or greater than 80%, and equal or greater than 90%.

According to another example ("Ex. 263"), further to any one of Exs. 240-262, wherein the visual presence is a visible light presence.

According to another example ("Ex. 264"), further to any one of Exs. 240-262, wherein the visual presence is a fluorescent presence.

According to another example ("Ex. 265"), further to any one of Exs. 240-263, wherein the first material and the second material form a braid in the cord.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 11A. The same SEM image of FIGS. 9A and 10A but with the addition of a series of vectors tracing a tortuous path through the component materials. The image is to the scale noted in the image.

FIG. 14A. A magnified visible light photographic image of a cross sectional view of a portion of an aquatic plant growing on and into a composite cultivation substrate. The image is to the scale noted in the image.

Figure 1A:
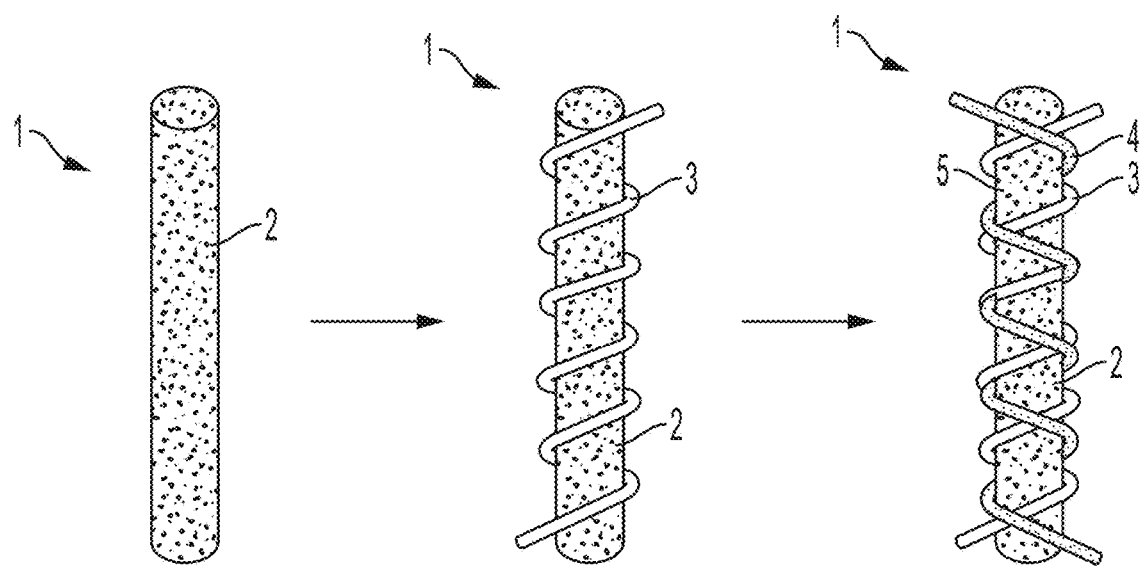
FIG. 1A. An illustration of a core, a single-covered yarn, and a double-covered yarn, and the steps of forming a single-covered yarn and a double-covered yarn.

Persons skilled in the art will readily appreciate that the accompanying drawing figures referred to herein are not necessarily drawn to scale but may be exaggerated or represented schematically to illustrate various aspects of the present disclosure, and, in that regard, the drawing figures should not be construed as limiting.

DETAILED DESCRIPTION

Definitions and Terminology

This disclosure is not meant to be read in a restrictive manner. For example, the terminology used in the application should be read broadly in the context of the meaning to which those in the field would attribute such terminology.

With respect to terminology of inexactitude, the terms "about" and "approximately" may be used interchangeably to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Certain terminology is used herein for convenience only. For example, words such as "top," "bottom," "upper," "lower," "left," "leftward," "right," "rightward," "horizontal," "vertical," "upward," and "downward" merely describe the configuration shown in the figures or the orientation of a part in the installed position. Indeed, the referenced components may be oriented in any direction. Similarly, throughout this disclosure, where a process or method is shown or described, the method may be performed in any order or simultaneously, unless it is clear from the context that the method depends on certain actions being performed first.

A coordinate system is presented in the figures and referenced in the description in which the "Y" axis corresponds to a vertical direction, the "X" axis corresponds to a horizontal or lateral direction, and the "Z" axis corresponds to the interior/exterior direction.

Catchment is the initial entrapment of spores/gametophytes within the growth medium after initial seeding in the hatchery. Catchment provides protection of the spores/gametophytes (i.e., resistance to loss through dislodgement of the spores/gametophytes) until attachment (holdfast formation) can provide sufficient stability for healthy plant growth to be initiated.

A holdfast is a root-like structure at the base of a seaweed plant that fastens it to a substrate, such as a rock, for example. Holdfasts and roots differ in shape and structure between species. Root-like structures can extend from the holdfast to further fasten the seaweed to a substrate. Substrate type can also affect holdfast and root shape and structure. Seaweed holdfasts differ from the roots of land plants because the seaweed holdfast has no nutrient-absorbing function as seen with roots of land plants, but both holdfasts and roots have similar anchoring functions in land and sea plants.

Tortuosity is a property of porous materials and may be defined in terms of a curve being tortuous, i.e., twisted with many turns. It characterizes the complex paths through openings and passages passing into or through portions of porous or semi-porous media. It may be defined as the ratio of (1) the length of a natural flow line or path from a first point to a second point passing into or through the material as permitted by the structure and surfaces defining the paths and (2) the length of a hypothetical straight line drawn between the same first and second points and passing into or through any intervening structures and surfaces. The more tortuous a material is, the greater the tortuosity ratio of the natural flow line length as compared to the hypothetical straight-line length. The tortuosity ratio may also be a comparison of (1) the distance an intrusive organic structure potentially or actually travels to gain adequate engagement with the porous material and (2) a straight-line depth that the same intrusive organic structure achieves for the same engagement as measured from the surface entry point of the organic structure to the terminal end of the organic structure. Porous media, including synthetic microporous materials and naturally porous structures, such as rock and soil, are a broad set of complex materials that contain pores that are highly chaotic with pore sizes that vary over a broad range. These porous media contain paths that are not straight, but tortuous and meandering. A hypothetical body flowing through a highly tortuous material must traverse a path that may be many times longer than a length of a hypothetical straight line drawn between the start and end of the same path. As used herein, unless stated otherwise, in some highly tortuous materials at least one path may not run completely through the material, meaning a body starting on one side of a highly tortuous material may not be able to traverse the entire width of the highly tortuous material and emerge from the material on the opposite side of the material by traversing a single path. Still another way to determine tortuosity is to trace the total distance that a particle traverses from a point stating on the surface of a material toward the midpoint of the material by following a natural path through the material, starting at the same starting point on a surface a straight line may be drawn from the starting surface point toward the midpoint arrived at by particle following its natural path the ratio of the distance traveled by the particle on its natural path to the straight line distance is a measure of tortuosity. The more tortuous the material, the more is the natural path length into or through the material and the greater the ratio of the length of the natural path to the straight-line drawn between the starting point of the natural path and a point disposed towards the midpoint of the material. Still another measure of tortuosity is to measure the total number of degrees of turn that a particle makes as it traces a natural path through the middle of channels with a material or layer of material. The total distance that a particle travels within or through a thickness or depth of material until it reaches a certain summative value of angularity is a measure of the tortuosity of a material. Particles traveling into or through tortuous material will make a number of turns in multiple directions, where the summation of the degrees of turning in any three-dimensional direction or in a direction aligned with a plane may be expressed as angularity and the length of the natural path of the material may be measured once the particle has reached a selected cumulative angularity. In each of the foregoing instances, the assessed tortuosity value may be an average or median value, or a range of values, for a selected volume or surface area of material. For example, tortuosity of a material may be assessed over a desired area (e.g., one square centimeter, one square meter, or some other value) by taking a desired number of measurements and averaging those values. In that example, the tortuosity value of a material may be expressed as an average tortuosity value seen over a manageable surface area or volume of the material. Likewise, for materials with a wide variety of pore sizes and variable channel dimensions, a mean tortuosity value determined in a manner similar to that used to obtain an average tortuosity value.

DESCRIPTION OF VARIOUS EMBODIMENTS

The present disclosure relates to cultivation systems that include a cultivation substrate that includes at least one fibrillated material that includes spaces suitable for the ingrowth of plant-anchoring structures such as holdfasts and at least one additional component that is more hydrophilic than is the fibrillated material and is typically associated with the exterior of the fibrillated material. The cultivation system may be used for the attraction, retention, culture, and/or growth of seaweed, and related methods and apparatuses. In some embodiments, the cultivation system is operable to grow seaweed in an open-water environment or in an incubator.

Cultivation systems, according to the instant disclosure, may be used to promote spore attachment, culture, germination, and/or growth in plants such as seaweed. These structures are useful in one or more stages of a plant's growth, development, and/or reproduction. Some embodiments find utility in one or more of the following phases of macroalgae reproduction and growth: the attachment and/or germination and growth of seaweed gametophytes and/or sporophytes and the attachment and growth of juvenile and mature plants as well as the transport and deposition of such plants in one or more stages of the plant's growth, development and reproduction. In certain embodiments, the cultivation substrates described herein may be used as an improved growth substrate for the growth and cultivation of seaweed forms (e.g., spores, gametophytes, sporophytes, juvenile sporophytes, juvenile plants, mature plants), resulting in improved yield and throughput relative to current cultivation practices.

In these embodiments, the cultivation system provides both catchment for the spores/gametophytes and attachment features for the holdfasts and the rootlike structures extending from the holdfasts.

Figure 6:
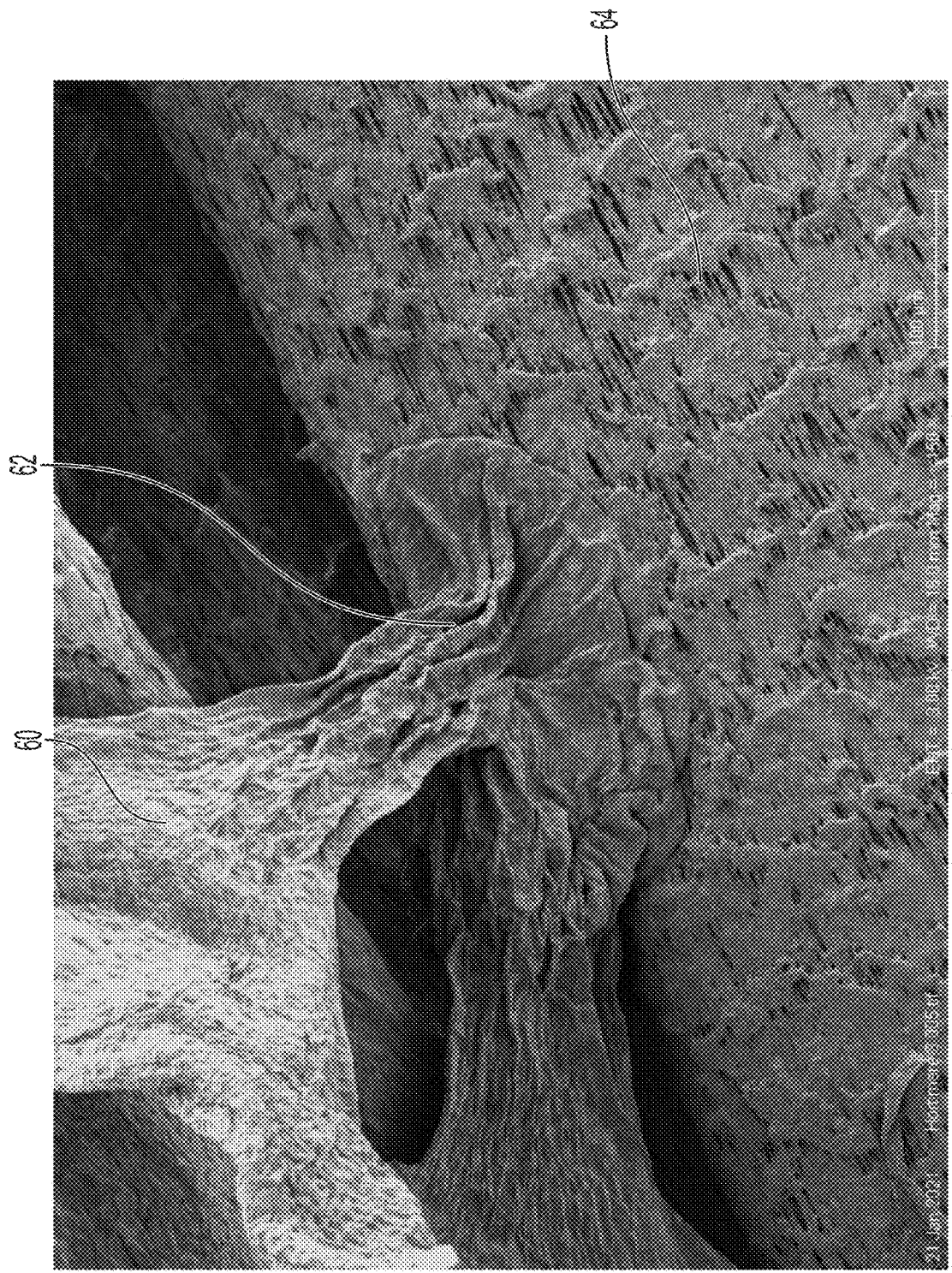
FIG. 6. A Scanning Electron Micrograph (SEM) image showing a portion of a seaweed holdfast attached to the surface of micro-fibrous material. The image is at the magnification and to the scale noted in the image.
Figure 7:
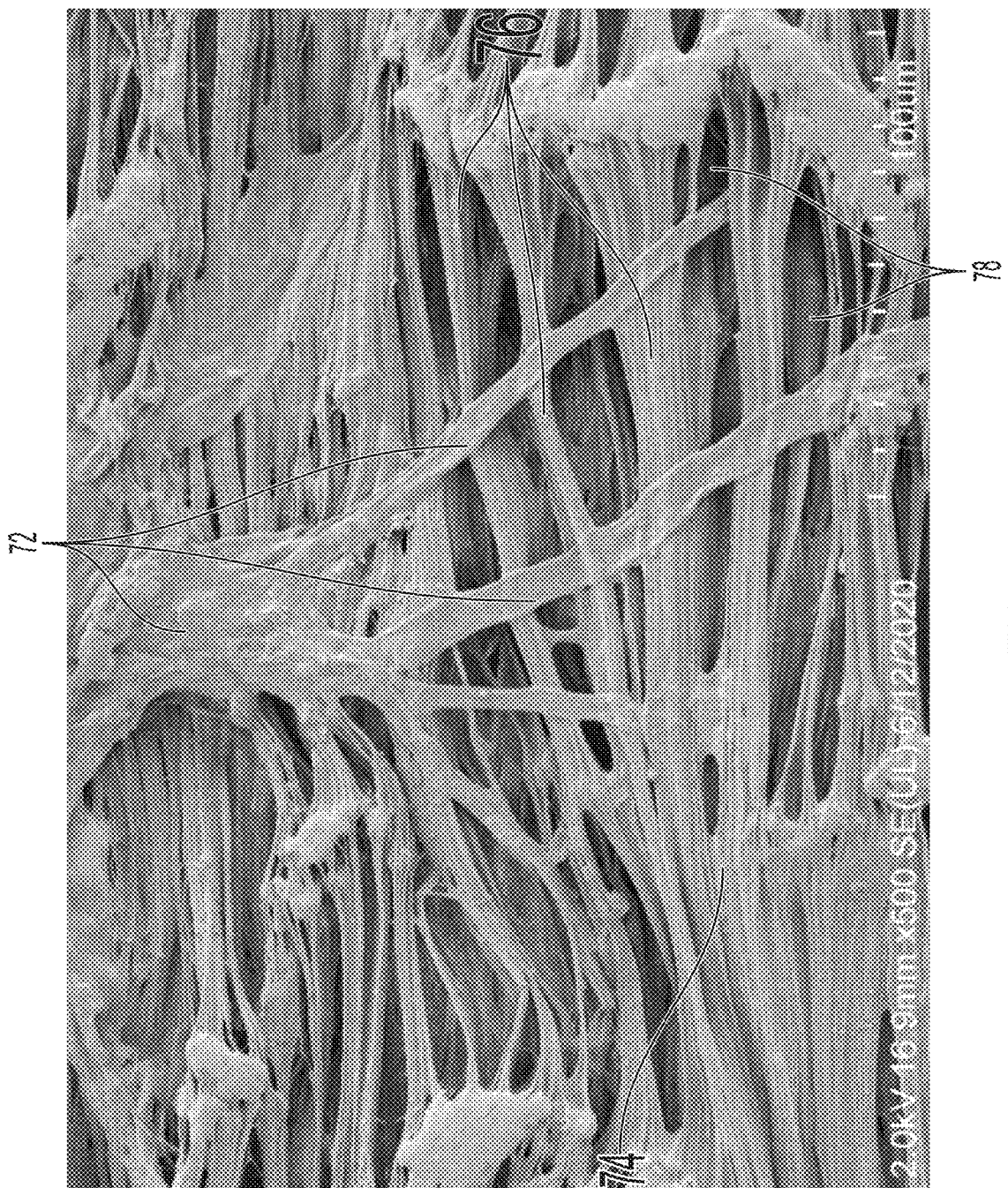
FIG. 7. An SEM image showing the growth of seaweed holdfast tendrils on the surface of and into the inter-fibral spaces of a micro-fibrous material. The image is to the scale noted in the image.

In some embodiments, the cultivation system includes at least one material having a network of both connected/interconnected and partially-connected fibril microstructures having pore sizes that promotes the ingrowth, stabilization, and anchoring of one or more species of seaweed. The fibrillated microstructure of the substrate and the more hydrophilic component of the system promote both the attachment of seaweed to the system as well as the growth and development of the plant. The pores of the microporous material may be selected so as to cultivate the attachment and in-growth of seaweed holdfasts. In further embodiments, the pores of the microporous material can be organized in, for example, an axial or single direction as shown in FIGS. 6 and 7.

In these embodiments, the more hydrophilic component of the cultivation system itself has a three-dimensional structure. The shapes of these structures include, but are not limited to, rods, ribbons, fibers, bands, layers, tubes, and variously sized and shaped patches. In some embodiments, the more hydrophilic component is attached or at least associated with the surface of the more hydrophobic core material. The more hydrophilic component may be in continuous contact with at least a portion of the core, or it may contact the core at only one or more areas of the surface of the more hydrophobic core. The hydrophilic component may be wound around the core, or layered unto the core, or tied to the core at one or more points using the same or a different material as a tethering device, or it may be glued or otherwise bonded, sewn, or coupled to the surface of the core.

Various aspects of the present disclosure relate to cultivation systems that include a cultivation substrate. Some embodiments relate to cultivation substrate being used for retention, culture, and/or growth of spores (e.g., for retaining and maintaining algal spores and growing mature seaweed therefrom), and related methods and apparatuses. In various examples, the cultivation system is operable to grow multicellular organisms (e.g., seaweed). In some embodiments, the cultivation system is operable to grow multicellular organisms in an open-water environment (e.g., salt water).

Cultivation systems, according to the instant disclosure, may be used in a variety of applications, including spore capture, spore culture and growth, spore and/or gametophyte/sporophyte transport and deposition, and seaweed holdfast growth and development.

In some embodiments, the cultivation substrates described herein may be used as an improved growth substrate for the growth and cultivation of seaweed forms (e.g., spores, gametophytes, sporophytes), resulting in improved yield and throughput relative to current cultivation practices.

In some embodiments, the cultivation system includes a cultivation substrate which itself includes a fibrillated material having a microstructure including a plurality of fibrils defining an average inter-fibril distance. In some embodiments, the micro-fibrous material is expanded polytetrafluoroethylene (ePTFE). The microstructure of the micro-fibrous material may be defined by a plurality of fibrils that interconnect nodes. The fibrils define inter-fibril spaces.

In some embodiments, the fibrils have a defined average inter-fibril distance, which may be from about 1 µm to about 200 µm, from about 1 µm to about 5 µm, from about 1 µm to about 20 µm, from about 1 µm to about 10 µm, from about 1 µm to about 5 µm, from about 5 µm to about 50 µm, from about 5 µm to about 20 µm, from about 5 µm to about 10 µm, from about 10 µm to about 100 µm, from about 10 µm to about 75 µm, from about 10 µm to about 50 µm, from about 10 µm to about 25 µm, from about 25 µm to about 200 µm, from about 25 µm to about 150 µm, from about 25 µm to about 100 µm, from about 25 µm to about 50 µm, from about 50 µm to about 200 µm, from about 50 µm to about 150 µm, from about 50 µm to about 100 µm, from about 100 µm to about 200 µm, from about 100 µm to about 150 µm, or from about 150 µm to about 200 µm. In some embodiments, the fibrils may have an average inter-fibril distance of about 1 µm, about 2 µm, about 3 µm, about 4 µm, about 5 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, or about 200 µm, for example, although a variety of additional values are contemplated.

The pores may be round, approximately round, or oblong. The pores may have a diameter or approximate diameter from about 1 µm to about 200 µm, from about 1 µm to about 50 µm, from about 1 µm to about 20 µm, from about 1 µm to about 10 µm, from about 1 µm to about 5 µm, from about 5 µm to about 50 µm, from about 5 µm to about 20 µm, from about 5 µm to about 10 µm, from about 10 µm to about 100 µm, from about 10 µm to about 75 µm, from about 10 µm to about 50 µm, from about 10 µm to about 25 µm, from about 25 µm to about 200 µm, from about 25 µm to about 150 µm, from about 25 µm to about 100 µm, from about 25 µm to about 50 µm, from about 50 µm to about 200 µm, from about 50 µm to about 150 µm, from about 50 µm to about 100 µm, from about 100 µm to about 200 µm, from about 100 µm to about 150 µm, or from about 150 µm to about 200 µm. In some embodiments, the pores may have a diameter or approximate diameter of about 1 µm, about 2 µm, about 3 µm, about 4 µm, about 5 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, or about 200 µm, for example, although a variety of additional values are contemplated.

In some embodiments, the microstructure of the cultivation substrate is configured to retain spores and sporophytes, gametophytes, or other organisms grown from the retained spores. In some embodiments, the microstructure is configured to retain algal spores, algal sporophytes and/or gametophytes, plant spores, seedlings, bacterial endospores, fungal spores, or a combination thereof. In some embodiments, the cultivation substrate retains a plurality of spores and/or organisms grown therefrom (e.g., sporophytes and/or gametophytes). The plurality of spores and/or organisms may all be of the same type or of two or more different types. In some embodiments, the cultivation substrate retains two different spore types that display a symbiotic relationship when cultured or grown together. For sake of simplicity, throughout this disclosure reference will be made to "spores," although gametophytes, sporophytes, seedlings, or other organisms grown from the spores are also contemplated by this term and are considered to be within the purview of the disclosure.

In some embodiments, in addition to retaining spores, cultivation systems and substrates of the instant disclosure promote germination of and growth from the retained spores. That is, the cultivation systems and substrates viably maintain the retained spores. In certain embodiments, the microstructure is configured to securely anchor at least a portion of a spore.

In some embodiments, the cultivation substrate creates a microenvironment conducive to the germination of and growth from the retained spores. In some embodiments, the microstructure is initially in a first-retention phase, in which the microstructure functions to retain and maintain the target spore. The microstructure subsequently moves to a second-growth phase, in which germination of the spore is induced, and ingrowth of sporelings (e.g., sporophytes, gametophytes, seedlings, etc.) from the spore on and/or into the microstructure occurs, thereby resulting in a mechanical coupling, or anchoring, of the sporelings to the microstructure. Thus, in some embodiments, the microstructure is configured to irremovably anchor germinated spores, preventing loss of the germinated spores during, for example, transport or placement in the field (e.g., an open-water environment), or loss to environmental factors (e.g., currents).

In certain embodiments, the cultivation substrate creates a selective microenvironment conducive to the germination and growth from a target spore while inhibiting or preventing germination, growth, and/or proliferation of nontarget spores or other cells. A selective microenvironment may be achieved by, for example, providing a combination of inter-fibril distance and/or pore size, material density, ratio of inter-fibril distance to average density of material, depth or thickness, hydrophobicity, and the presence or absence of nutrient sources, moisture, bioactive agents, and adhesives that supports germination of and growth from the target spore while inhibiting or preventing germination, growth, and/or proliferation of nontarget spores or other cells.

Several factors may affect retention and/or viable maintenance of the spores and organisms grown therefrom. Such factors include, for example, the inter-fibril distance and/or pore size, material density, a ratio of inter-fibril distance to average density of material, depth or thickness, hydrophobicity, and presence or absence of nutrient sources, moisture, bioactive agents, and adhesives. These factors will each be described in more detail.

In some embodiments, the distance between two fibrils (i.e., inter-fibril distance) defines an inter-fibril space. In some embodiments, an inter-fibril space and thus the inter-fibril distance is sufficient to retain a spore therein; the spore is retained between the two fibrils defining the inter-fibril space. The inter-fibril distance is sufficient to allow at least a portion of the spore to enter (e.g., via migration, growth, or a combination thereof) between the two fibrils defining the inter-fibril space.

In some embodiments, the average inter-fibril distance is controlled in order to encourage ingress of at least portions of spores into the microstructure. For example, where it is desirous for the microstructure to retain spores of dulse.

For dulse spores (*Palmaria palmata*), which have a diameter of about 30 µm, the average inter-fibril distance of the microstructure is about 30 µm, or slightly larger (e.g., about 32 µm to about 35 µm). Where it is desirous for the microstructure to retain spores of, for example, nori, e.g., *Porphyra/Pyropia*, or kelp, e.g., *Saccharina* spp, *Alaria* spp, *Macrocystis* spp, which each have a spore having a diameter of about 10 µm, the average inter-fibril distance of the microstructure is about 10 µm, or slightly larger (e.g., about 12 µm to about 15 µm). In some embodiments, it may be desirous to retain spores of multiple species (e.g., dulse, nori, and kelp). In such embodiments, the average inter-fibril distance is sufficient to allow at least a portion of the spores of the multiple species to enter the inter-fibril space and be retained there. In some embodiments, target spores, gametophytes, and sporophytes have a diameter of about 0.5 µm to about 200 µm.

In some embodiments, about half of the target spore may enter the inter-fibril space. In such embodiments, the inter-fibril distance is at least equal to a dimension (e.g., diameter or width) of the target spore. In some embodiments, the inter-fibril distance is slightly larger than the dimension of the target spore. This allows for the entire spore to enter the inter-fibril space and be retained therein.

In some embodiments, more than half of the target spore may enter the inter-fibril space, up to the entire spore. In such embodiments, the portion of the spore entering the inter-fibril space may be governed by the depth of a pore, the opening of which is defined by the inter-fibril space. The depth of the pore may be controlled by, for example, material density.

Figure 1B:
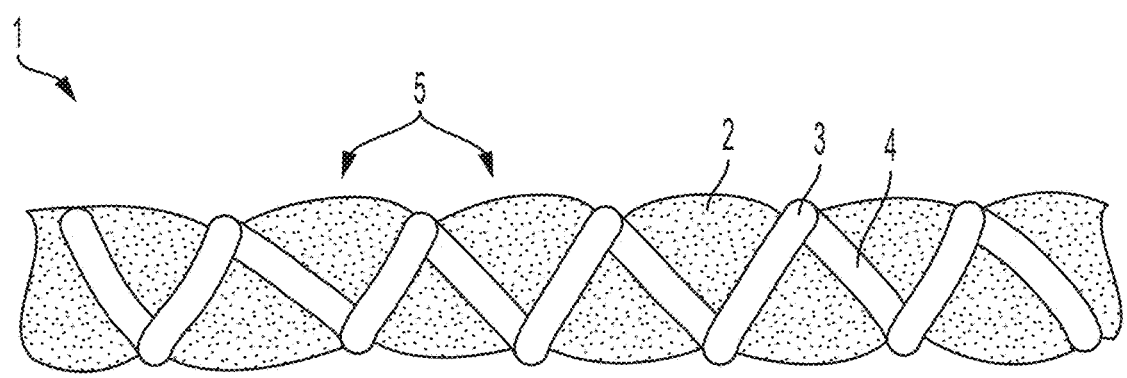
FIG. 1B. An illustration of a double covered yarn.

In some embodiments, only a portion of the spore, sporophytes, juvenile sporophyte, gametophytes, juvenile plant, and or the mature plant enters the inter-fibril space. Therefore, in instances where the inter-fibril distance is less than the diameter of the target spore, the target spore may only partially enter the inter-fibril space. Where the target spore only partially enters the inter-fibril space, the target spore may nonetheless be retained therein if a sufficient portion of the target spore enters the inter-fibril space. In some embodiments, a substance such as an adhesive applied to the microstructure may reduce the portion of the spore required to enter the inter-fibril space and aid in retention.

In some embodiments, the microstructure is formed by a non-fibrillated material. In certain embodiments, the pore openings are inherent to the material of the cultivation substrate. It will be recognized that different materials may have different pore opening properties and that a material may be manufactured or otherwise manipulated to provide the desired pore opening properties. In other embodiments, the pore openings are formed by micro-drilling techniques such as, for example, mechanical micro drilling, such as ultrasonic drilling, powder blasting or abrasive water jet machining (AWJM); thermal micro drilling, such as laser machining; chemical micro drilling, including wet etching, deep reactive ion etching (DRIE) or plasma etching; and hybrid micro-drilling techniques, such as spark-assisted chemical engraving (SACE), vibration-assisted micromachining, laser-induced plasma micromachining (LIPMM), and water-assisted micromachining.

In those embodiments where the microstructure is formed by a non-fibrillated material, the pore openings act much like the inter-fibril spaces described and are of a sufficient size to allow at least a portion of a target spore to enter the pore opening. In some embodiments, the spore is thereby retained within the microstructure of the cultivation substrate. In some embodiments, the size of pore openings is controlled to encourage ingress of at least portions of target spores into the microstructure. For example, where it is desirous for the microstructure to retain spores of dulse (*Palmaria palmata*), which have a diameter of about 30 μm, the pore openings of the microstructure have a diameter of about 30 μm, or slightly larger (e.g., about 32 μm to about 35 μm). In some embodiments, target spores have a diameter of about 0.5 μm to about 200 μm.

In some embodiments, about half of the target spore may enter the pore openings. In such embodiments, the pore opening is at least equal to a dimension (e.g., diameter or width) of the target spore. In some embodiments, the pore opening is slightly larger than the dimension of the target spore. This allows for the entire spore to enter the pore openings and be retained therein.

In some embodiments, more than half of the target spore may enter the pore openings up to the entire spore. In such embodiments, the portion of the spore entering the pore opening may be governed by the pore depth. The depth of the pore may be controlled by, for example, material density.

In some embodiments, only a portion of the spore enters the pore opening. Therefore, where the pore opening is smaller than the diameter of the target spore, the target spore may only partially enter the pore opening. Where the target spore only partially enters the pore opening, the target spore may nonetheless be retained therein when a sufficient portion of the target spore enters the pore opening. In some embodiments, a substance such as an adhesive applied to the microstructure may reduce the portion of the spore required to enter the pore opening and aid in retention.

In some embodiments, the cultivation substrate includes a low-density material. The low-density material may be fibrillated or non-fibrillated and, in some embodiments, defines the microstructure of the cultivation substrate. The density of the low-density material may be about 0.1 g/cm$^3$, about 0.2 g/cm$^3$, about 0.3 g/cm$^3$, about 0.4 g/cm$^3$, about 0.5 g/cm$^3$, about 0.6 g/cm$^3$, about 0.7 g/cm$^3$, about 0.8 g/cm$^3$, about 0.9 g/cm$^3$, or about 1.0 g/cm$^3$. In some embodiments, the density of the low-density material is from about 0.1 g/cm$^3$ to about 1 g/cm$^3$.

In some embodiments, the low-density material provides a sufficient pore depth to retain spores in inter-fibril spaces or pore openings.

In some embodiments, the dimensions of the pore openings (length (μm) and width (μm)), whether formed by a fibrillated or non-fibrillated material, together with the depth at which target spores enter the pores (μm) define a capture ratio. Each spore type may have a different capture ratio required for adequate retention of spores by the microstructure. The required capture ratio may be influenced by the properties of the material making up the microstructure and the presence or absence of nutrients, adhesives, and/or bioactive agents.

In some embodiments, the low-density material allows the spore to germinate and grow into the low-density material. For example, as dulse spores retained in a low-density material having a microstructure described herein develop into gametophytes and then sporophytes, the dulse grows into the low-density material in all three dimensions (i.e., horizontally in x- and y-dimensions and depth-wise in the z-dimension). This three-dimensional growth allows for improved retention of the dulse gametophytes and sporophytes.

EXAMPLES

As used in the following examples, the terms "tortuous" and "tortuosity" may be assessed according to any of the methods and definitions previously described, including any of the example ratios and values provided in association with such terms. The following examples may not correspond fully to the "Ex." examples described previously in this document.

Example 1

General cultivation systems may include composite materials that include one or more materials that differ in their ability to promote the catchment and attachment of various forms of plants found in the macroalgae growth cycle. Some nonlimiting examples include a micro-fibrous material, such as ePTFE, that is configured to promote the attachment of macroalgae-anchoring structures and/or components of the microalgae's anchoring systems, such as rhizoids and/or elements of holdfasts, and macro-fibrous materials such as spun polyester, which are configured to promote the catchment of various forms of the macroalgae growth cycle such as spores, sporophytes in one or more stages of growth and development, gametophytes, juvenile plants and mature plants. The different materials in the composite may also have different hydrophilicities.

Materials with relatively high hydrophilicities are thought to promote the catchment of seaweed forms such as sporophytes, gametophytes, juvenile plants and the like. Materials with relatively high hydrophilicities that absorb water are thought to be particularly effective at promoting the catchment of seaweed forms such as sporophytes, gametophytes and juvenile plants.

Example 2

A cultivation system may include a micro-fibrous material configured to promote the attachment and engraftment of at least some elements of macroalgae anchoring systems, with the micro-fibrous material, where needed, supported by additional materials that provide tensile strength to the cultivation system. FIG. 1A shows an exemplary cultivation system (1) with cords (2, 3, and 4) in various configurations that may also be viewed as stages of an assembly process starting with a single-material cord core (leftmost image) that leads to a wrapped cord or yarn (middle image) that then leads to a double-wrapped cord or braided configuration (rightmost image). As shown in FIG. 1A, the cultivation system (1) in the leftmost image may be a single core (2) material made from a high-tortuosity material such as ePTFE or a combination material of ePTFE modified to include additional materials that enhance tensile strength. At the middle image of FIG. 1A is shown the core (2) wrapped with a single cord (3) made of a high tensile material that provides tensile strength to system (1), with the material or cord (3) being a low-tortuosity material such as polyester. In the rightmost image of FIG. 1A is shown the cultivation system (1) with a double-wrapped cord (3, 4) that is wrapped or braided about the core (2). The cords (3, 4) may both be a high-tensile material that has low tortuosity such as polyester. As can be seen in all of the configurations shown in FIG. 1A, the exterior of the various cultivation systems (1) present an exterior surface that provides exposure of the low tortuosity materials (3, 4). The exteriors of the middle and rightmost images of FIG. 1A also present an exterior surface that provides exposure a high tortuosity material of the core (2) adjacent to low tortuosity materials (3, 4) such that both the low and high tortuosity materials are presented to the aquatic environment near enough to each other to allow individual seaweed plants to interact with adjacent low and high tortuosity materials to promote seaweed plant catchment, growth, and adhesion. Likewise, as also shown, the cultivation systems with the wrapped or braided configurations (middle and rightmost images) provide windows (5) defined by the cords (3, 4) through which the underlying material of the core (2) may be accessible to the exterior aquatic environment to promote plant growth. FIG. 1B shows an alternative exterior view of the rightmost cultivation system (1) of FIG. 1A with the windows (5) providing access through the cords (3, 4) to the underlying core (2) made from a high-tortuosity material such as ePTFE.

As can be appreciated by one skilled in the art, the cultivation system (1) may be varied to provide additional cords wrapped around the core (2) or braided about the core (2) in, for example, a six- or eight-braid configuration. In other configurations, the core (2) may be a low tortuosity material such as polyester and one or more of the cords (3, 4) may be a high tortuosity material or a combination of a low tortuosity cord (3) and a high tortuosity cord (4) to present an exterior surface with a high tortuosity material. In other configurations the core (2) may be absent and the cords (3, 4) may be braided using known techniques that preferably use a six- or eight-cord braid with one or more of the cords in the braid being a high tortuosity material such as ePTFE.

As can also be appreciated from FIGS. 1A and 1B, the cultivation system (1) shown may be a portion of a longer cord of a length sufficient to connect two buoys together so that the middle of the cord is suspended at a depth in the aquatic environment to provide sufficient sunlight and nutrients promoting the growth of a seaweed plant. In another embodiment, the cultivation system (1) shown may be a portion of a longer length sufficient to connect one end to a weight and the other end to a float or buoy to suspend the cord at an appropriate depth and position to promote seaweed growth. In yet another embodiment, the cultivation system (1) may be disposed about a supporting tube. In still another embodiment, the cultivation system (1) may be disposed in an incubator to promote the incubation of immature seaweed plants prior to transfer from one aquatic environment to another.

Example 3

A cultivation system may include a composite of a highly tortuous micro-fibrous material configured to promote the attachment and engraftment of at least some elements of the anchoring portion of at least one species of macroalgae and at least one macro-fibrous material configured to promote the catchment of at least one form of the macroalgae growth cycle. Referring again to FIG. 1A, cultivation system (1) is a covered yarn consisting of a highly tortuous micro-fibrous core (2) comprising a yarn of a material such as ePTFE covered with a second material having low tortuosity (3) which may be a material such as a spun polyester.

Referring now to FIG. 1B, shown is a double-covered yarn (1) comprising a highly tortuous micro-fibrous material (2), for example, low density expanded polytetrafluoroethylene (ePTFE) Gore material of 5000 denier linear mass, and a second component having low tortuosity (3, 4), for example 8/1 spun polyester. Still referring to FIG. 1B, the highly tortuous material (2) is double covered with the component having low tortuosity (3, 4) with windows (5) between nearby low tortuosity components (3, 4) exposing an underlying high tortuosity material (2) to an external aquatic environment.

Example 4

A cultivation system may include a composite of a highly tortuous micro-fibrous material configured to promote the attachment and engraftment of at least some elements of the anchoring portion of at least one species of macroalgae and at least one second material having low tortuosity material configured to promote the catchment of at least one form of the macroalgae growth cycle. Referring to FIG. 1A, a cultivation system (1) having a double-covered yarn or cord (rightmost image) consisting of a highly tortuous micro-fibrous core (2) comprising a yarn of for example ePTFE covered with two cords (3, 4) of a material having low tortuosity such as for example a spun polyester. FIG. 1B shows an alternative exterior view of the rightmost cultivation system (1) of FIG. 1A.

Figure 2A:
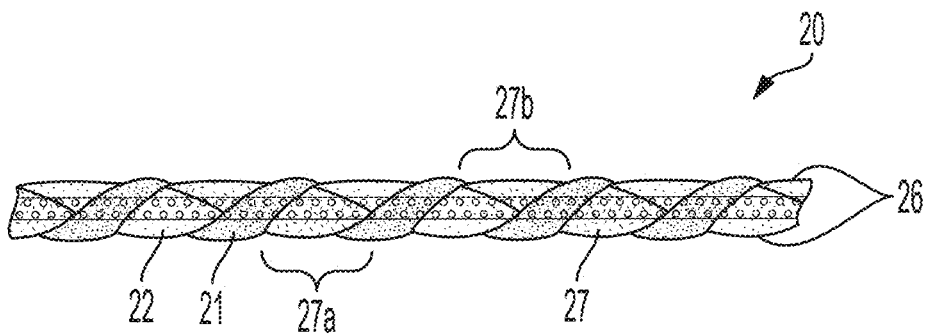
FIG. 2A. An illustration of a "loosely" wrapped covered yarn.

FIG. 2A provides an illustration of a portion of a double covered cord or yarn (20). The double covered yarn (20) includes a highly tortuous micro-fibrous core (27) made of a least one material, for example, ePTFE. The core (27) is "loosely" covered with a second component having low tortuosity (26), for example, a material such as spun polyester shown in FIG. 2A as a wrap or braid made of strands (21, 22). The strands (21, 22) are loosely wound or braided so that there are gaps (27a, 27b) presented between the strands (21, 22) that provide external access to the underlying core (27) to present a portion of the exposed (uncovered) surface of the core (27) to an external aquatic environment.

Figure 2B:
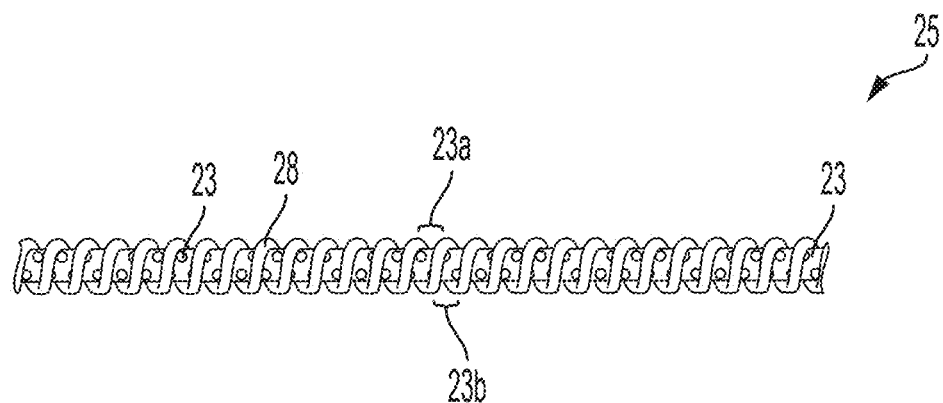
FIG. 2B. An illustration of a "tightly" wrapped covered yarn.

Referring to FIG. 2B, covered cord or yarn (25) includes a highly tortuous micro-fibrous core (23). The core (23) may be made from a high tortuosity material such as ePTFE. The core (23) may be "tightly" covered with a second component having low tortuosity (28) such as, for example, spun polyester. The tight wrapping of the low tortuosity material (28) over the high tortuosity core (23) may be arranged to provide spaces or gaps (23a, 23b) between individual wrappings of the low tortuosity material to expose a portion of the uncovered surface of the core (23) between individual windings of the tightly wrapped low tortuosity material (28). Comparing the covered yarn (20) depicted in FIG. 2A and the covered yarn (23) in FIG. 2B, it can be appreciated that more of the surface of the core material (21, 23) is exposed in a loosely wrapped covered yarn (20) than in a tightly wrapped covered yarn (25).

Figure 3:
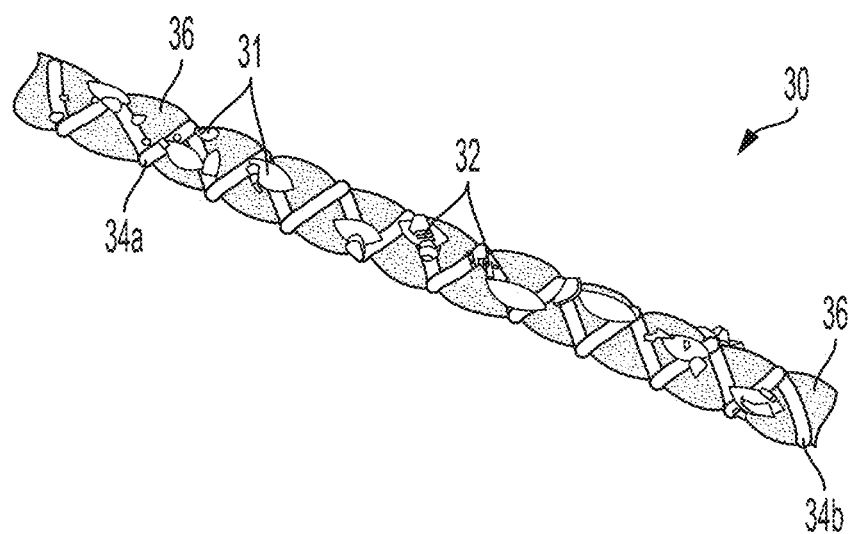
FIG. 3. An illustration of a covered yarn with seaweed shown to be located primarily on the surface of the material having low tortuosity.

FIG. 3 shows a double covered cord or yarn (30) (such as that shown and described in association with FIG. 1B). The double covered yarn (30) includes a core (36) comprised of at least one highly tortuous material such as ePTFE with the core (36) covered by two components having low tortuosity (34a and 34b) such as polyester. Using methods known in the art, immature seaweed plants may be made to adhere to growth media by allowing the immature seaweed plant, in for example the form of a seaweed flake, to contact the growth media so as to allow a surface structure of the flake to embed or hook itself onto the growth media. As shown in FIG. 3, flakes of kelp plants (31, 32) are shown on the exterior surface of the covered yarn (30) in an engagement. As shown, the flakes (31, 32) are primarily disposed upon or associated with the low tortuosity second components (34a, 34b) and not primarily disposed on the exposed surface of the highly tortuous micro-fibrous core material (36). It is believed that the flakes of kelp plants, such as the flakes (31, 32) shown in FIG. 3, will engage well with low tortuosity materials such as low tortuosity second components (34a, 34b) that may include, for example, polyester because the external surfaces of seaweed flakes have an exterior surface with features sized and disposed to engage well with low-porosity materials such as polyester. In contrast, it is also believed that the same flakes do not engage well with high tortuosity materials such as, for example, ePTFE, as shown in FIG. 3 because of a mismatch between the external surface features of the flakes and the external surfaces presented by the low tortuosity material. It is further believed that a composite of low and high tortuosity materials with each material disposed adjacent to the other will provide an improved environment for seaweed growth because, among other reasons, the seaweed flakes may remain attached well to the low tortuosity material while the growing seaweed plant reaches out with a growing holdfast and engages the high tortuosity material disposed nearby. As shown in FIG. 3, a braid or wrapped structure of low and high tortuosity components with adjacent low and high tortuosity materials present an improved environment for seaweed attachment and growth because, among other reasons, the proximity of these two dissimilar materials provide the juvenile seaweed plants two artificial surfaces the meet different needs of the plant during its growth cycle.

Example 5

Figure 4A:
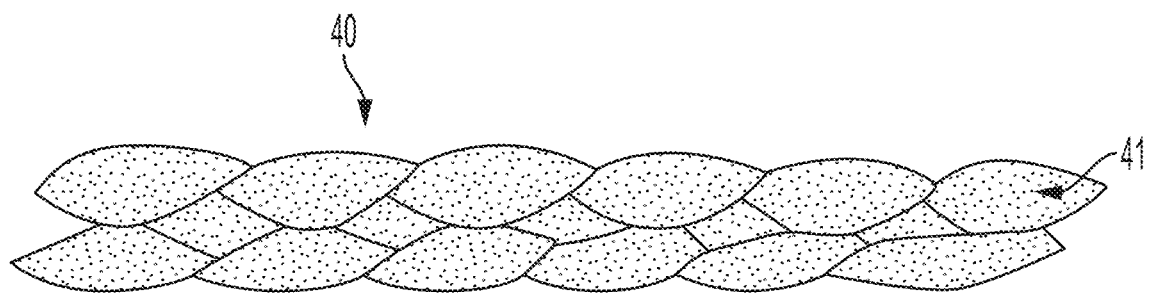
FIG. 4A. An illustration of a braid of a highly tortuous micro-fibrous material.

Referring now to FIG. 4A, shown is a braid (40) of a six-carrier diamond braid consisting essentially of a high-tortuosity material (41) that may be a micro-fibrous, relatively hydrophobic highly torturous material and may also be, for example, a low density expanded polytetrafluoroethylene (ePTFE) such as a Gore material of 3000 denier linear mass. This braid has 5-6 picks per inch.

Example 6

Figure 4B:
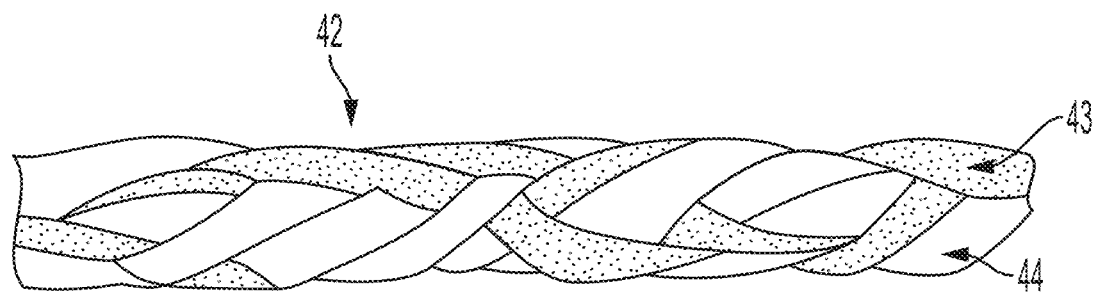
FIG. 4B. An illustration of a composite braid comprising a highly tortuous micro-fibrous material and a material having low tortuosity.

Referring now to FIG. 4B, a six-carrier diamond braid (42) comprising a highly tortuous micro-fibrous material such as ePTFE (43), for example, that is a low density expanded polytetrafluoroethylene (ePTFE) Gore material of 1000 denier linear mass, and a second material having low tortuosity, for example, 8/1 spun polyester (44). This braid has 5-6 picks per inch.

Example 7

Figure 4C:
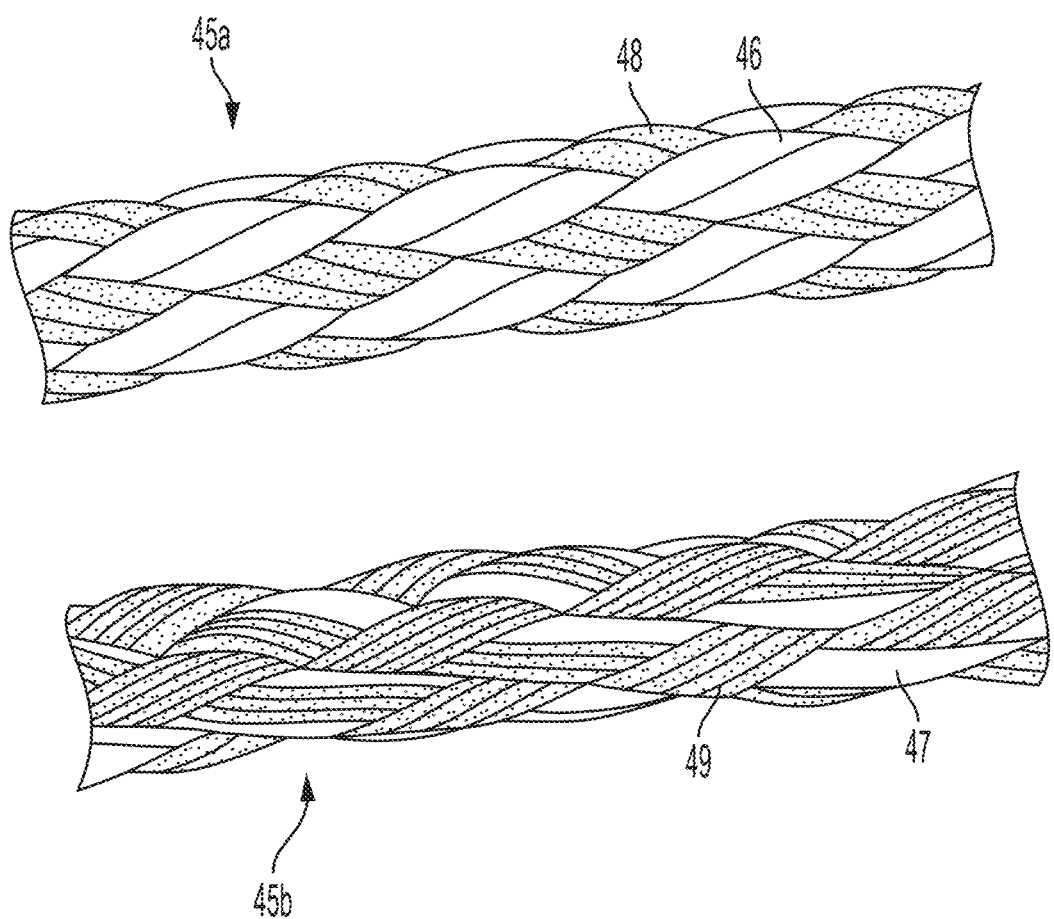
FIG. 4C. Illustrations of two braided composites comprising highly tortuous micro-fibrous material and a material having low tortuosity.

FIG. 4C provides illustrations of two different eight-carrier diamond braids (45a) and (45b). The braid (45a) shown in the upper portion of FIG. 4C is comprised of a high tortuosity material (46) braided with a low tortuosity material (48). The high tortuosity material (46) may include a highly tortuous micro-fibrous material such as, for example, a low density expanded polytetrafluoroethylene (ePTFE) that may be a Gore material of 3000 denier linear mass. The low tortuosity material (48) may include, for example, 8/1 spun polyester.

Still referring to FIG. 4C, the braid (45b) shown in the lower portion of FIG. 4C is comprised of a high tortuosity material (47) braided with a low tortuosity material (49). The braid (45b) is comprised of a highly tortuous micro-fibrous material (47) that may include, for example, a low density expanded polytetrafluoroethylene (ePTFE) that may be a Gore material of 3000 denier linear mass. The low tortuosity material (49) may include, for example, 25/1/3 spun polyester.

Example 8

Figure 5:
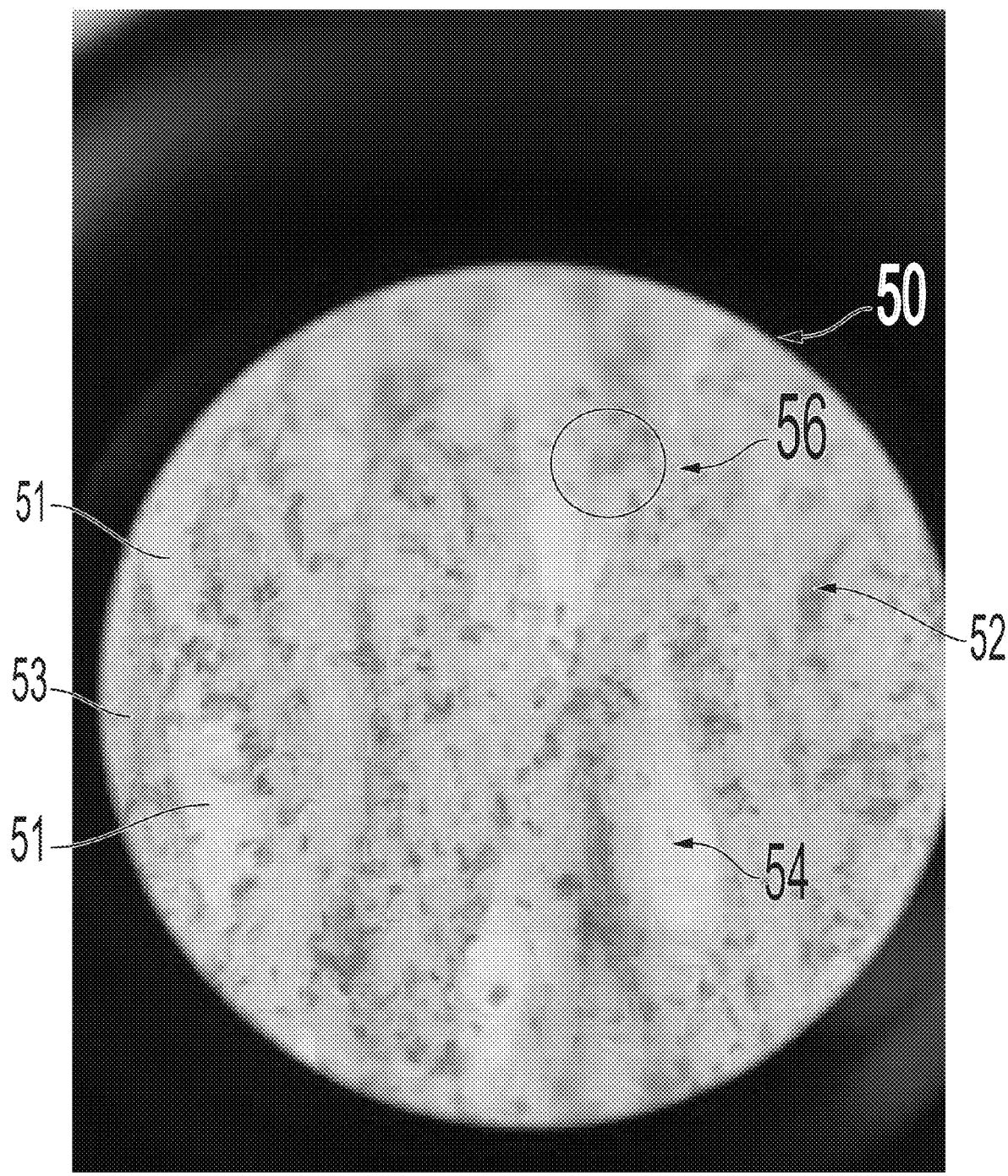
FIG. 5. A color photograph of the surface of a braided composite supporting the growth of seaweed.

FIG. 5 shows a photomicrograph image of the surface of a composite braid (50) such as braid (42) shown in FIG. 4B. As shown in the image, the braid surface includes fibers of a high tortuous material (51) adjacent to fibers of a low tortuous material (53) in a braid configuration. As shown in FIG. 5, the composite braid (50) supports the catchment and growth of juvenile kelp plants (52) which appear in the image as dark spots. As described above with regard to FIG. 3, the braid (50) includes a structure that places low and high tortuosity components adjacent to each other to present an improved environment for seaweed catchment, attachment, and growth. As shown in FIG. 5, white areas (54) of the composite braid comprise the highly tortuous micro-fibrous material (51) and are shown as not fully supporting catchment of the juvenile plants. Still referring to FIG. 5, juvenile kelp plants (52) and (56) are primarily seen engaging the surfaces of the grey areas (56) that comprise materials having less tortuous macro-fibrous components (53), such as polyester. As stated above with regard to FIG. 3, it is believed that a braid or wrapped cord or yarn structure of low and high tortuosity components with adjacent low and high tortuosity materials presents an improved environment for seaweed attachment and growth by allowing catchment of juvenile plants when engaging the low tortuosity materials and subsequent engagement when the juvenile plant present growing holdfasts that engage the high tortuosity materials.

Example 9

FIG. 6 is an SEM image showing a seaweed plant (60) with a portion of a seaweed holdfast (62) extending from the plant to attach to the surface of a micro-fibrous material (64) that may include, for example, ePTFE. The image is to the scale noted in the image.

Example 10

FIG. 7 is an SEM image showing a seaweed plant with a kelp holdfast (72) (with mostly vertical orientations) on the surface of a highly tortuous micro-fibrous material (74) that may include, for example, ePTFE. As shown, the high tortuosity material (74) includes fibrils (76) (with mostly horizontal orientations) that define inter-fibral spaces (78) between the fibrils (76). As also shown, the holdfast (72) is growing into the inter-fibral spaces (78) of the micro-fibrous high tortuosity material (74). The image is to the scale noted in the image. As can be appreciated, the SEM imaging method dehydrates the holdfast (72) in the image and, as also can appreciated, a viable holdfast (72) if viewed without the dehydration would be filled with fluids and swollen to occupy most or all of the inter-fibral spaces (78) to provide an engagement between the holdfast (72) and the highly tortuous micro-fibrous material (74).

Example 11

Figure 8:
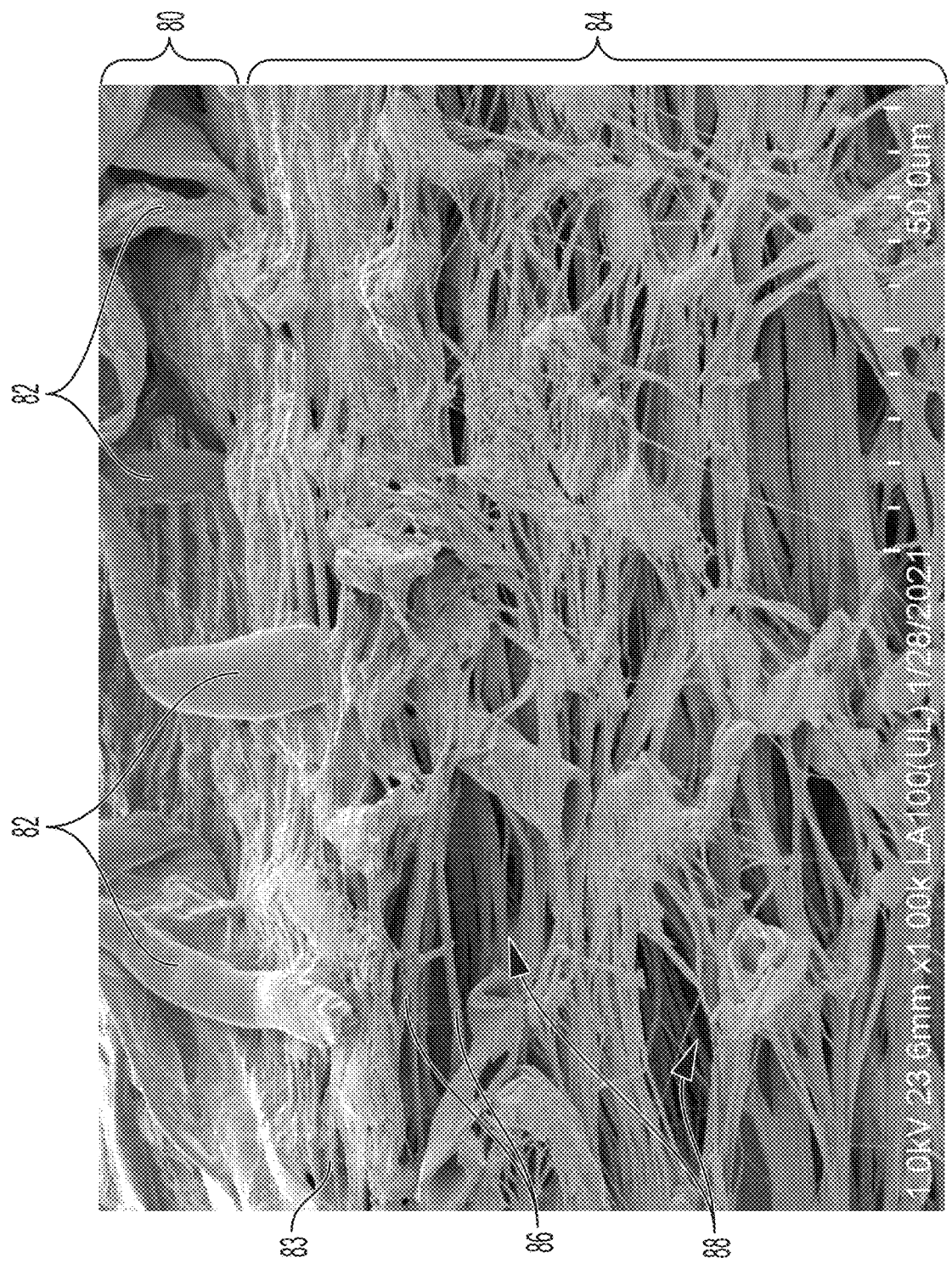
FIG. 8. An SEM image of a cross section of a portion of a seaweed holdfast grown on and into a micro-fibrous material. The image is to the scale noted in the image.
Figure 13:
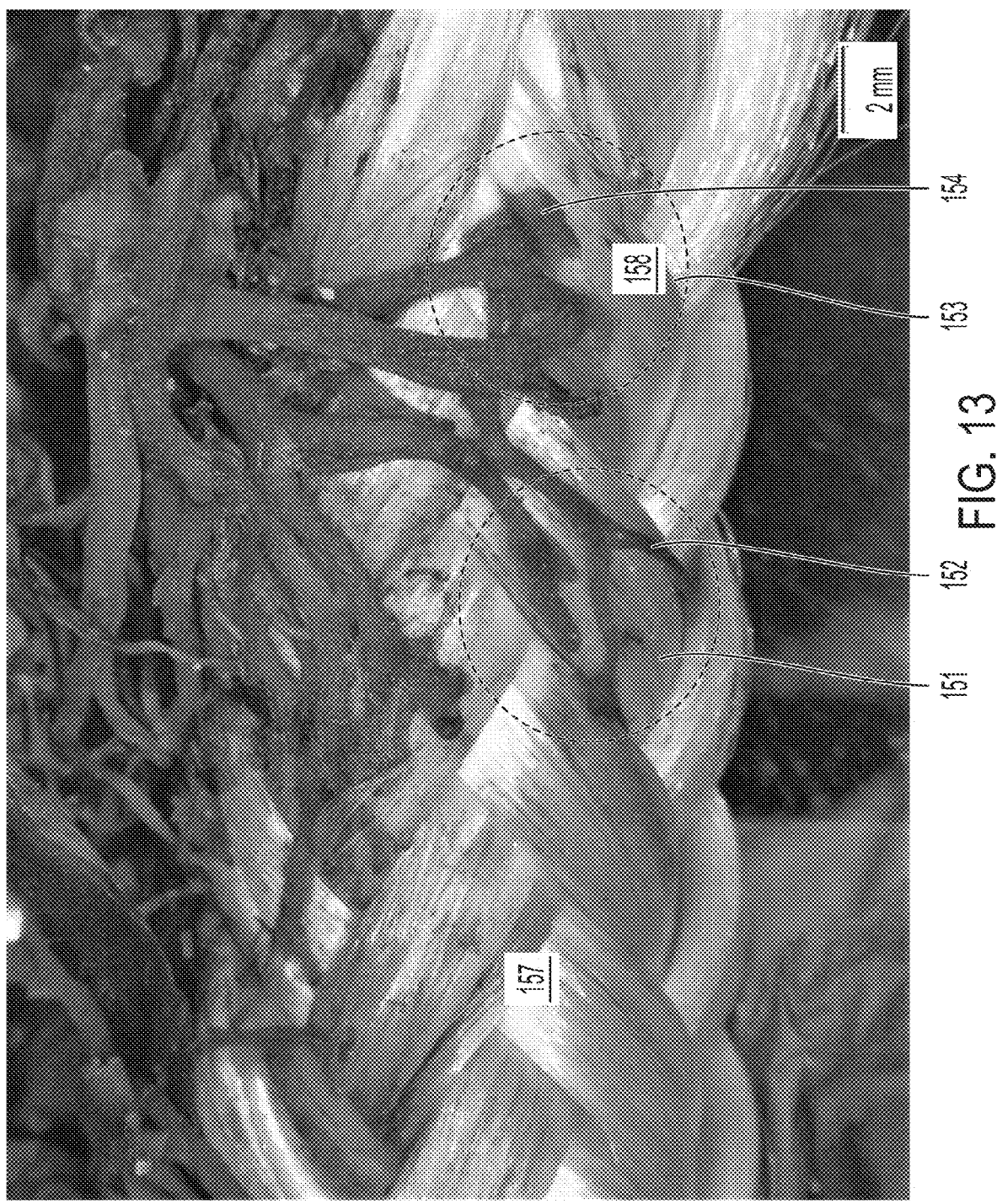
FIG. 13. A magnified photographic image of an aquatic plant growing in contact with a composite cultivation substrate comprising ePTFE and spun polyester. The image is to the scale noted in the image.

FIG. 8 is an SEM image showing a seaweed plant (80) and a cross section of a portion of a seaweed holdfast (82) (disposed in mostly vertical orientations) growing between fibrils (86) (disposed in mostly horizontal orientations) and into inter-fibral spaces (88) of a highly tortuous micro-fibrous material (84). The cross section is prepared by cutting a portion of a high-tortuosity cord or yarn (84), such as ePTFE, where a seaweed holdfast (82) has engaged the material, such as shown in FIG. 13. The cut portion is further positioned to provide an image perspective showing a point where the holdfast (82) is engaging the exterior surface (83) of the cord or yarn and further showing where the holdfast (82) penetrates the exterior surface (83) of the cord or yarn to achieve engagement between the plant (82) and the material (86, 88). The image is to the scale noted in the image. As noted with regard to FIG. 7, the SEM imaging method used to prepare FIG. 8 dehydrates the holdfast (82) in the image and, as also can be appreciated, a viable holdfast (82) if viewed without the dehydration would be filled with fluids and swollen to occupy most or all of the inter-fibral spaces (88) to provide an engagement between the holdfast (82) and the highly tortuous micro-fibrous material (84).

A notable difference between FIGS. 7 and 8 is the orientation of the imagery. FIG. 7 presents an image that looks down on a surface of a cord or yarn where the holdfast grows across a surface of the cord or yarn. FIG. 8 presents an image of essentially the same content showing a seaweed holdfast engaging a material but from a different orientation, obtained by making a 90-degree cut into the material where the holdfast engages the surface of the material and penetrates into the material, such as shown in FIG. 13.

Example 12

Figure 9A:
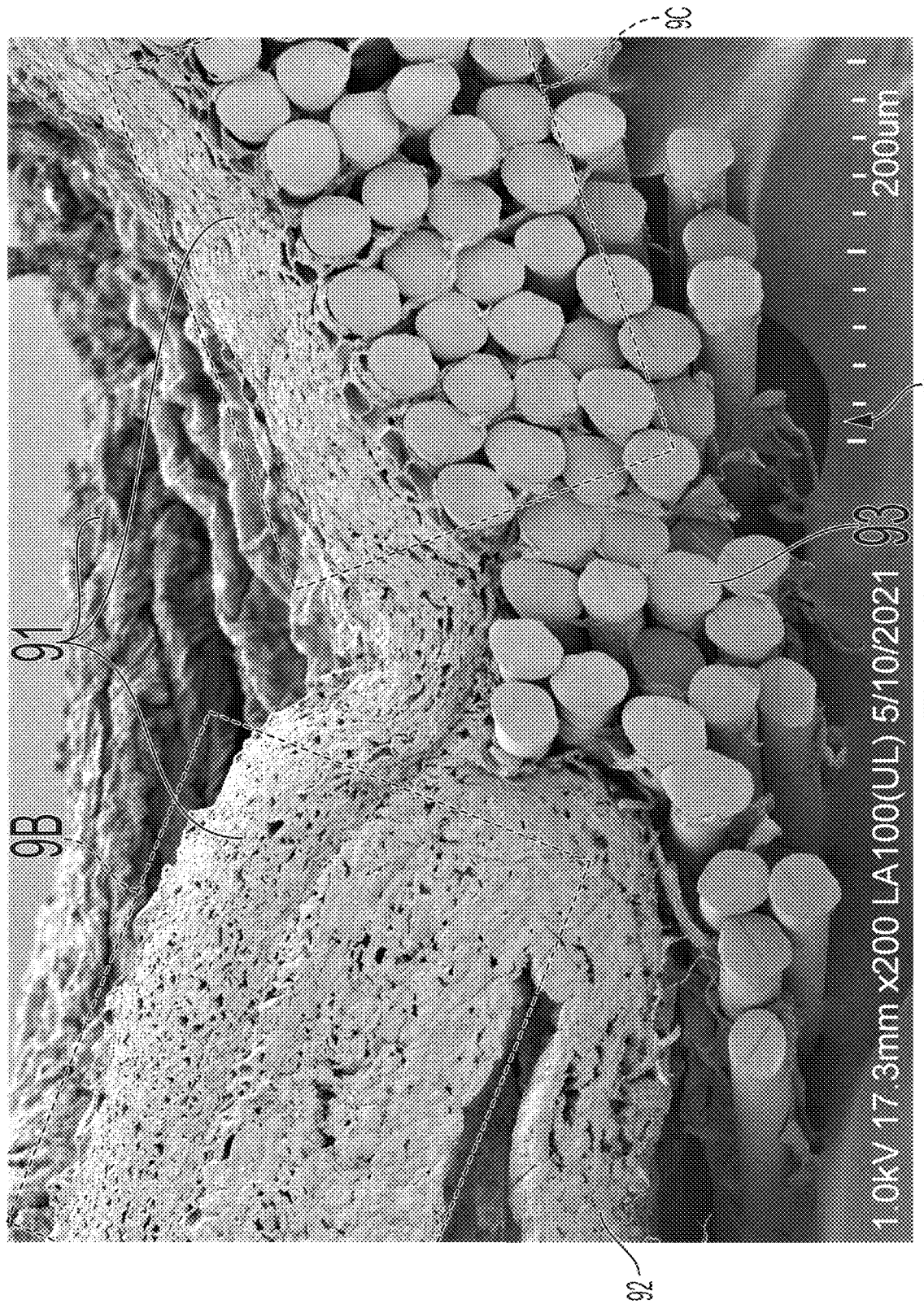
FIG. 9A. An SEM image of a portion of a composite material supporting seaweed growth. The image is to the scale noted in the image.
Figure 9B:
FIG. 9B. A magnified SEM image of a portion of the composite material shown in FIG. 9A. The image is to the scale noted in the image.
Figure 9C:
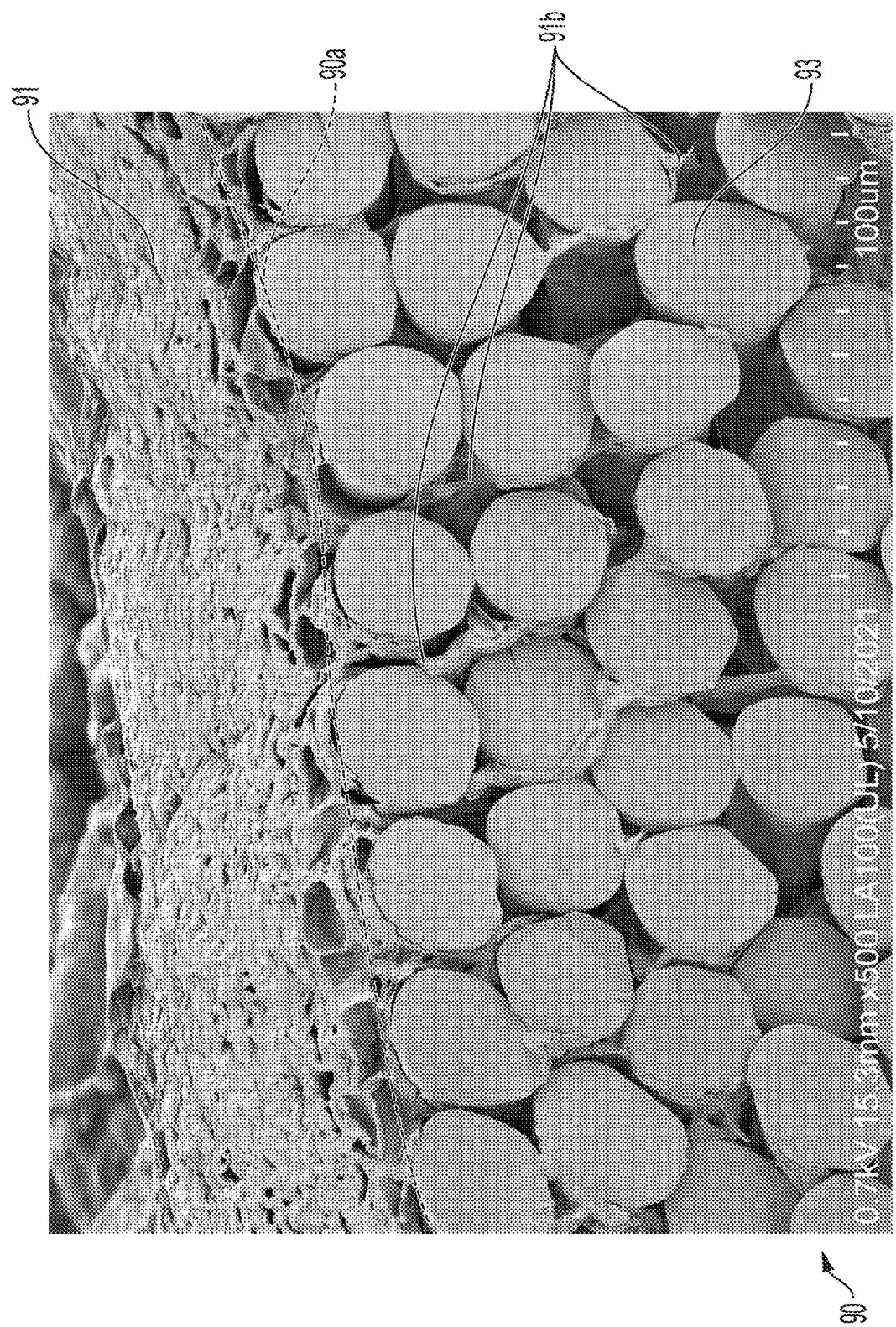
FIG. 9C. A magnified SEM image of a portion of the composite material shown in FIG. 9A. The image is to the scale noted in the image.

FIGS. 9A, 9B, and 9C show three views of the same SEM image, with a magnified main image (FIG. 9A) and a first further magnified image (FIG. 9B) and a second further magnified image (FIG. 9C). The magnified main image (FIG. 9A) includes dotted-line boxes (9B and 9C) noting where the first and second further magnified images (FIG. 9B and FIG. 9C) correspond with the magnified main image (FIG. 9A). All three images (FIGS. 9A, 9B, and 9C) should be understood together, and all images are magnified and scaled as noted in the respective images.

The three images of FIGS. 9A-9C show a cross section of a cord or yarn such as those described in the aforementioned cultivation systems (1), cords, yarns, and braids (20, 25, 30, 40, 42, 45a, 45b, 50). In particular, the images shown in FIGS. 9A-9C are a cross-section of a cord or yarn (90) prepared by a transaxial cut made through the cord or yarn at a location selected to expose the interior structure of the cord or yarn for viewing with an SEM imaging technique and to display where the seaweed holdfast (91) engages the cord or yarn, such as shown in FIG. 13. The SEM imaging of FIGS. 9A, 9B, and 9C are directed to an area of the cut cord or yarn (90) where a plant holdfast (91) can be seen engaging the surface (90a) of the cord or yarn (90) and can been further seen penetrating into the surface (90a) of the cord or yarn (90). As shown in FIG. 9A, the selected section of the braided cord or yarn (90) includes both a high tortuosity material (92) and a low tortuosity material (93) and a seaweed holdfast (91) engaging both the high and low tortuosity materials. In particular, the shown composite cord or yarn (90) is comprised of a highly tortuous micro-fibrous material (91) such as ePTFE and a low tortuous macro-fibrous material (93) such as polyester selected at a location along the cord or yarn (90) where the plant holdfast (91) grows on and into the cord or yard (90).

As also shown in FIG. 9B, the holdfast of the kelp plant (91) exhibits intimate incorporation into the highly tortuous micro-fibrous material (92) as demonstrated by the twisting plant growth (91a) that engages the high-tortuosity material (92) in a manner that makes it difficult to distinguish plant (91a) from high-tortuosity material (92). The plant (91a) and the high-tortuosity material (92) may be made more distinguishable from each other with the use of color imagery, dyes, fluorescence, and other know techniques for providing a visual enhancement to either of the plant or material to distinguish one from the other. As can be observed and understood, the twisting engagement between the plant growth (91a) and high-tortuosity material (92) includes portions of the plant growth (91a) that project directly into the material (92) towards the center of the cord (90) and portions of the plant growth (91a) that turn sideways from a direction pointing towards the center of the cord (90) or that pass around and behind fibrils and other material features of the high-tortuosity material (92) to engage and secure the plant (91) to the high-tortuosity material (92). In stark contrast, the plant growth (91b) engaging the low tortuosity material (93) in FIGS. 9A and 9C is less pronounced and occupies less space within the internal spaces defined by the low-tortuosity material (93). Furthermore, in FIG. 9C the plant growth (91b) is shown to exhibit little to no interaction with the low tortuous macro-fibrous material (93) during this phase of the plant's growth and development, as demonstrated by a majority of the plant growth (91b) projecting in a direction towards the center of the cord (90) with little sideways deviation to wrap behind or around individual fibers of the cord (90).

To assist in identifying the transition from the pure holdfast (91) engaging the surface of a high-tortuosity material (92) to where the holdfast (91) penetrates into the high-tortuosity material (92), a dashed line is provided in FIG. 9B to call out the surface (90a) of the cord or yard (90). As further shown in FIG. 9B, after a certain depth of penetration of the holdfast (91) into high-tortuosity material (92), there is an area (92a) where the plant no longer penetrates into the high-tortuosity material (92). As can be appreciated, FIG. 9B shows three significant phases when noted in the SEM cross-section with a top phase comprising pure surface plant growth (91) disposed on the surface (90a) of the high-tortuosity material (92), a middle inner phase (91a) representing intimate incorporation of penetrative plant growth into the highly tortuous micro-fibrous material (92), and a lower phase (92a) representing the highly tortuous micro-fibrous material without significant plant penetration. The depth of penetrative plant growth (91a) into the highly tortuous material (92) is significant at the middle inner phase with the combination of plant growth (91a) and high-tortuosity material (92) at the middle inner phase reaching a depth of at least 50 μm from the cord surface (90a). The penetrative plant growth (91a) is quantifiable when defined by a volume of the plant growth within the internal spaces defined by the high-tortuosity material (92) at the middle inner phase prior to such growth, with a portion of the high-tortuosity material (92) at the middle inner phase having a volume of plant material (91a) that is 50% or more of the volume defined by the highly tortuous material (92) prior to the ingrowth. Referring now to FIG. 9C and comparing to FIG. 9B, the penetration of the holdfast (91) in FIG. 9C into the low tortuosity material (93) is noticeably limited with a middle inner phase comprising a holdfast growth (91b) that is less than 50% of the volume of defined at the middle inner phase.

Comparing now FIGS. 9B and 9C, at the magnification presented in the imagery and with an SEM technique that does not provide color, it is further apparent in FIG. 9B that the ingrowth and attachment of the plant's holdfast (91a) within the high-tortuosity material (92) is indistinguishable from the high-tortuosity material itself for a depth of 50 μm from the cord surface (90a). In contrast, FIG. 9C shows that the ingrowth of the plant's holdfast (91b) within the low-tortuosity material (93) is readily distinguishable from the low-tortuosity material fora depth of 50 μm from the cord surface (90a) because of the significant presence of spaces between the fibers of the low-tortuosity material (93) that remain unfilled by penetrative plant growth.

Example 13

Figure 10A:
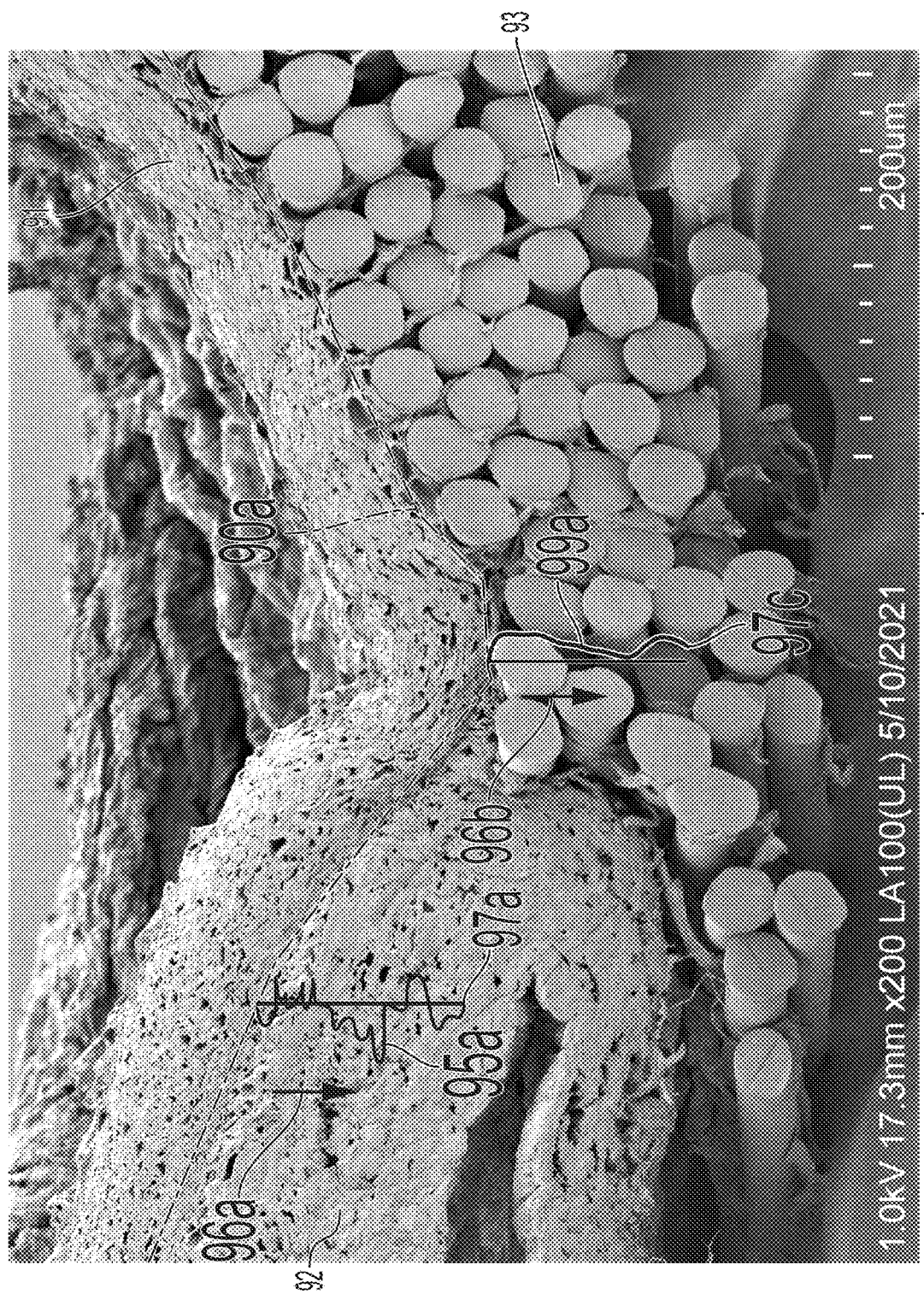
FIG. 10A. The same SEM image of FIG. 9A but with the addition of lines tracing a tortuous path through the component materials and a paired straight line denoting a hypothetical straight path through the material. The image is to the scale noted in the image.
Figure 10B:
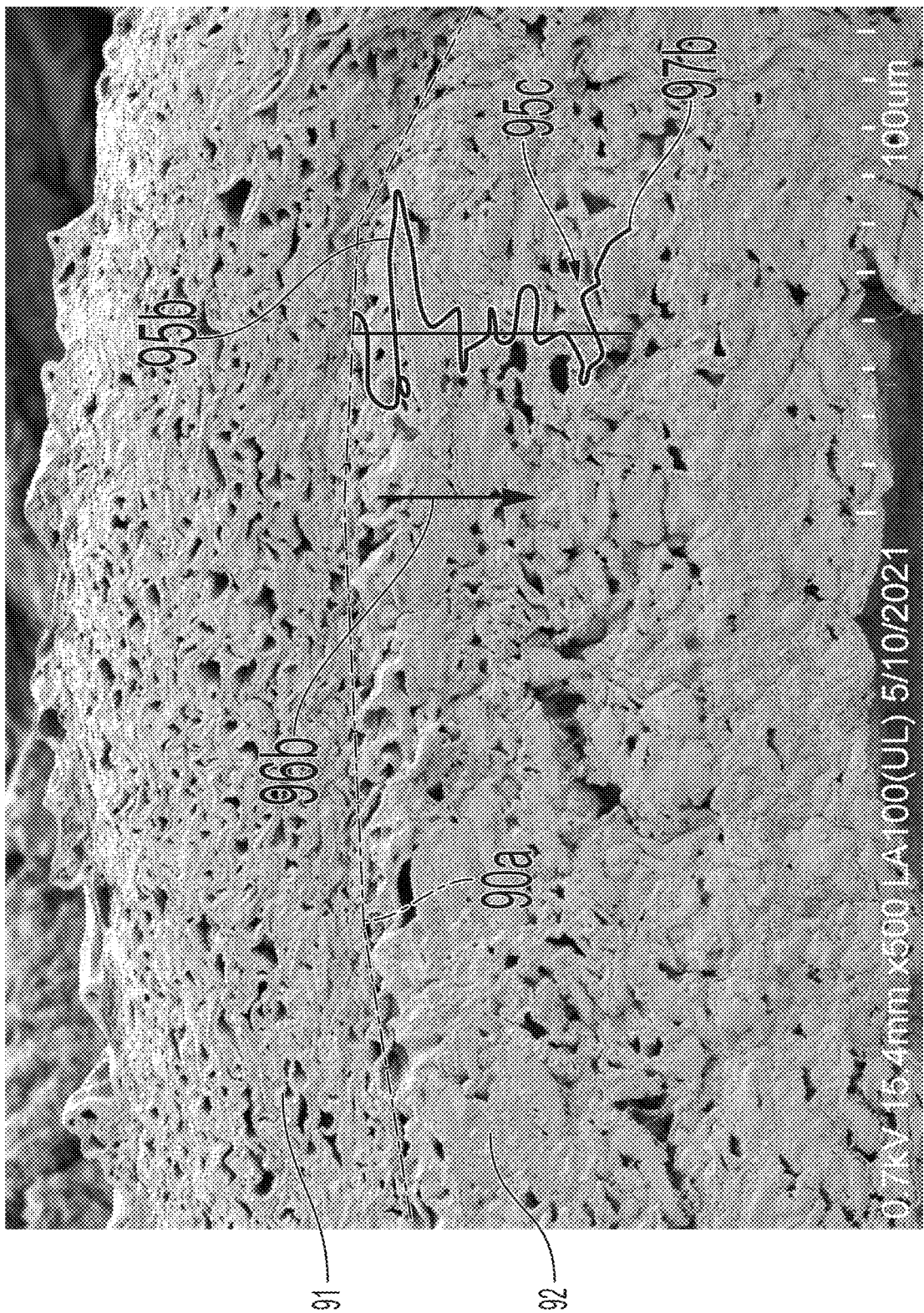
FIG. 10B. The same SEM image of FIG. 9B but with the addition of lines tracing a tortuous path through the component materials and a paired straight line denoting a hypothetical straight path through the material. The image is to the scale noted in the image.
Figure 10C:
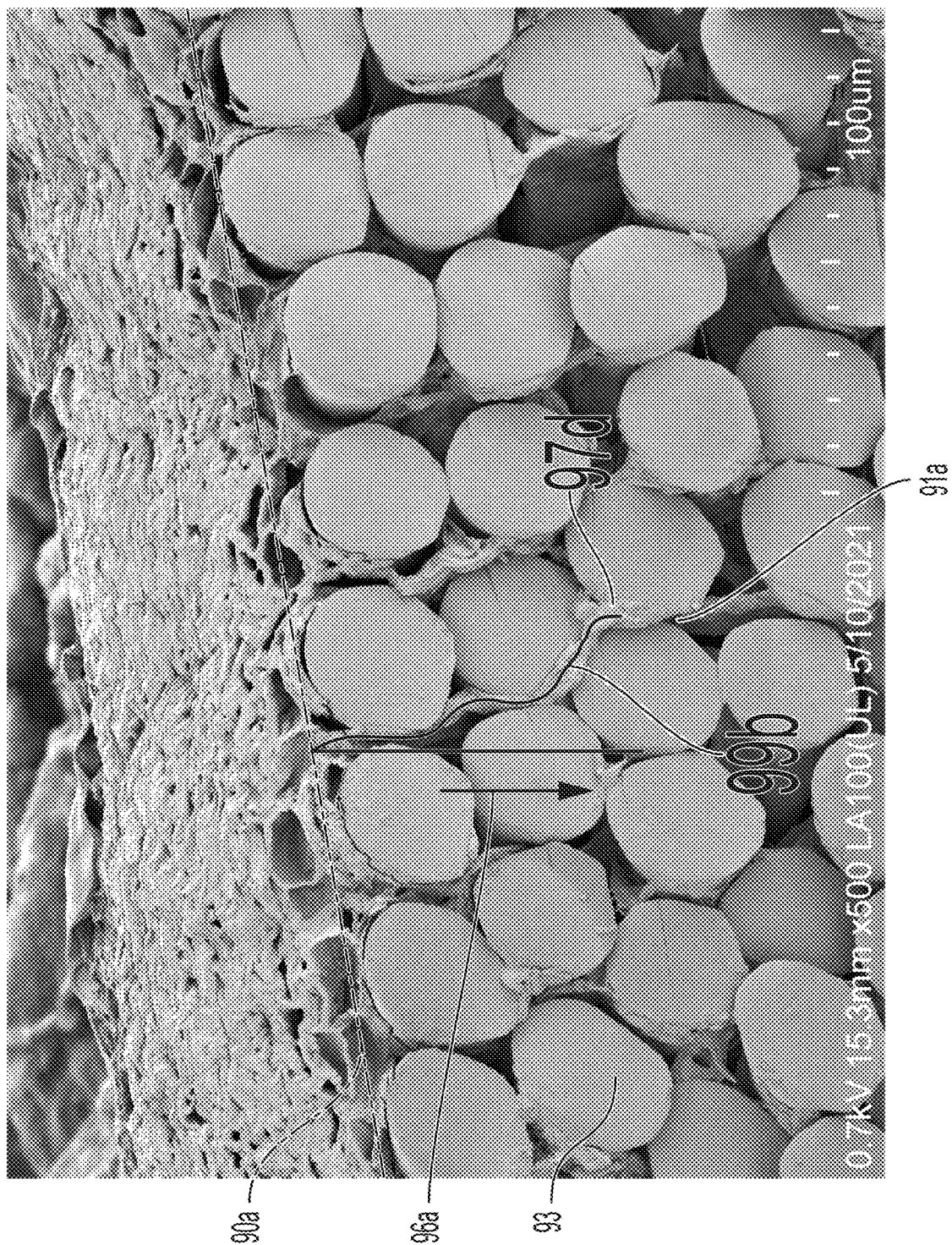
FIG. 10C. The same SEM image of FIG. 9C but with the addition of lines tracing a tortuous path through the component materials and a paired straight line denoting a hypothetical straight path through the material. The image is to the scale noted in the image.

Referring now to FIG. 10, which has the same images and content as FIGS. 9, shown again but not labeled from FIG. 9 are the cord or yard (90), the cord surface (90a), the holdfast (91), the penetrative plant growth (91a)/middle inner phase (91a), the holdfast growth (91b), the high-tortuosity material (92), the lower phase (92a), and the low-tortuosity material (93). In the same manner as explained with regard to FIG. 9, FIG. 10 shows three views of the same SEM image, with a magnified main image (10A) and a first further magnified image (10B) and a second further magnified image (10C). All three images (10A, 10B, 10C) should be understood together, and all images are magnified and scaled as noted in the respective images.

With regard to FIG. 10, it is believed that the tortuosity of a material may be characterized and defined, in part, by identifying a natural path through the material that is either presentable to a potential seaweed ingrowth or that has facilitated the ingrowth of a seaweed holdfast in an observable manner, and also believed that the tortuosity of a material may be further defined by comparing (a) a length of travel along the natural path to (b) a depth that is achieved within the material. It is further believed that the tortuosity of a material may be based in part on a direction of the potential or observable ingrowth path into the material that may be ascertained from a tracing or framework applied to imagery of the material without the presence of seaweed ingrowth and/or applied to imagery of an observable seaweed holdfast ingrowth into the material. It is also believed that the tortuosity of a material may be, in part, defined by a tracing of the natural path through the material applied to imagery of the material and/or seaweed ingrowth into the material to ascertain (a) a length of the natural path to a terminal point of the path and (b) a depth from a surface of the material between the surface and the terminal point, and that the natural path length and depth may be compared to each other to define tortuosity values of the evaluated material.

Images 10A and 10B show two types of highly-tortuous lines (95a, 95b) and images 10A and 10C show two types of non-tortuous lines (99a, 99b). The highly-tortuous line (95a) of image 10A is imposed on the imagery over the spaces present (that may be intra-fibral spaces) in the high-tortuosity material (92) that are available for receiving a penetrative plant growth (91a). The highly-tortuous line (95b) of image 10B is imposed on the imagery over the holdfast penetrative plant growth (91a) that is present and observed penetrating the high-tortuosity material (92) as the plant growth (91a) navigates through the spaces and intra-fibral spaces of the high-tortuosity material (92). The non-tortuous line (99a) of image 10A is imposed on the imagery over the spaces present between fibers of the low-tortuosity material (93) that are available for receiving a holdfast plant growth (91b). The non-tortuous line (99b) of image 10C is imposed on the imagery over the holdfast plant growth (91b) that is present and observed penetrating the low-tortuosity material (93) as the plant growth (91b) navigates through the spaces of the low-tortuosity material (93).

Referring to image 10A, the highly-tortuous line (95a) and the non-tortuous line (99a) each follow a material-defined natural path that disregards the actual path taken by a seaweed holdfast (91) shown in image 10A and instead follows a passage through the high-tortuosity material (92) or the low-tortuosity material (93) that a penetrating holdfast is capable of taking as it navigates the internal structure of the high-tortuosity or low-tortuosity materials, respectively. The highly-tortuous line (95a) may advance into the high-tortuosity material (92) and the non-tortuous line (99a) may advance into the low-tortuosity material (93) from their own starting points, for example, on or at the cord surface (90a) and progress in a direction that is in a midpoint direction (96a) towards either a midpoint (not shown) of the cord or yard (90) or progress in an orthogonal direction (96b) orthogonal to the cord surface (90a). The material-defined natural path traced by highly-tortuous line (95a) shown in image 10A is in a midpoint direction (96a). The material-defined natural path traced by non-tortuous line (99a) shown in image 10A is in an orthogonal direction (96b) that is disposed orthogonally relative to the portion of cord surface (90a) where the non-tortuous line (99a) originates.

Referring now to images 10B and 10C, an alternative highly-tortuous line (95b) in image 10B and an alternative non-tortuous line (99b) in image 10C are respectively shown to follow a growth-defined natural path that follows where a seaweed holdfast (91) is present and observed, respectively, to penetrate into the high-tortuosity material (92) or the low-tortuosity material (93). As shown in images 10B and 10C, both the highly-tortuous line (95b) and the non-tortuous line (99b) each extend from a starting point, for example, on or at the surface (90a) and progress in a direction that is a midpoint direction (96a) towards either a midpoint (not shown) of the cord or yard (90) or point in an orthogonal direction (96b) orthogonal to the cord surface (90a). The penetrating plant growth (91a) shown in image 10B is traced by the highly-tortuous line (95b) in an orthogonal direction (96b). The penetrating plant growth (91a) shown in image 10C is traced by the non-tortuous line (99b) in a midpoint direction (96a).

As can be appreciated, a midpoint direction (96a) aiming from the cord surface (90a) towards a midpoint (not shown) of the cord or yard (90) may be estimated or based on where the midpoint would have been prior to the processing needed to obtain the imagery of the cut cord (90) presented in FIG. 10. As can also be appreciated, an orthogonal direction (96b) aiming away from the cord surface (90a) and into the cord (90) may be estimated or based on a portion of the cord surface (90a) where the cord surface (90a) is linear or sufficiently linear to define an orthogonal direction (96b) at or near the starting point for the relevant tracing. As can be further appreciated, when tracing the highly-tortuous line (95a) or the non-tortuous line (99a) over the material-defined natural path, the material-defined lines (95a, 99a) may be plotted by tracing a path that continuously advances in either the midpoint direction (96a) or the orthogonal direction (96b) with the use of continually turning of the path to avoid impeding structures with each turn being in a direction towards the midpoint direction (96a) or the orthogonal direction (96b).

The primary influence on the tracing of the highly-tortuous line (95a) or the non-tortuous line (99a) applied to respective material-defined natural paths is the selection of each turn of the traced paths being based on the options presented by internal material structures positioned along the material-defined natural path guided by a preference to select the turn option that continues advancement in the desired midpoint direction (96a) or the orthogonal direction (96b). The primary influence on the tracing of the highly-tortuous line (95b) or the non-tortuous line (99b) applied to the respective growth-defined natural paths is the selection of each turn being based on the options presented by the observed penetrative plant growth (91a) along the growth-defined natural path guided by a preference to select the observed growth that continues advancement in the desired midpoint direction (96a) or the orthogonal direction (96b). As can be appreciated, a tracing of lines (95a, 99a) based on the material-defined natural path does not require the presence of the penetrative plant growth (91a).

The tracing of a material-defined or a growth-defined natural path that continuously advances in the midpoint direction (96a) or the orthogonal direction (96b) may be limited to tracings that are contained entirely in a two-dimensional or photo-enabled flat plane presented in imagery of a cut cord (90) as shown in images 10A, 10B, and 10C, or may be unrestrained and allowed to turn in three-dimensions without being limited to a plane defined by the imagery. As shown in image 10A, the highly-tortuous line (95a) traces a material-defined natural path in a midpoint direction (96a) and is comprised of turns that are confined by the flat plane presented in the imagery and is also comprised of turns that continually advance the material-defined natural path in the midpoint direction (96a) with no turns that lead in a direction opposite to the midpoint direction (96a). As shown in image 10B, the highly-tortuous line (95b) traces a growth-defined natural path in an orthogonal direction (96b) and is comprised of turns that are confined by the flat plane presented in the imagery and is also comprised of turns that follow the observed penetrative plant growth (91a) in a mostly orthogonal direction (96b) that, due to the nature of the growth, may at times double back in a direction opposite to the orthogonal direction (96b) at some points (95c) until the observed growth reaches a later point more advanced in the orthogonal direction (96b). As shown in image 10A, the non-tortuous line (99a) traces a material-defined natural path in an orthogonal direction (96b) and is comprised of turns that are confined by the flat plane presented in the imagery and is also comprised of turns that continually advance the material-defined natural path in the orthogonal direction (96b) with no turns that lead in a direction opposite to the orthogonal direction (96b). As shown in image 10C, the non-tortuous line (99b) traces a growth-defined natural path in a midpoint direction (96a) and is comprised of turns that are confined by the flat plane presented in the imagery and is also comprised of turns that follow the observed penetrative plant growth (91a) in a mostly midpoint direction (96a) that, due to the nature of the growth, may at times double back in a direction opposite to the midpoint direction (96a) at some points (not observable in the Example presented in image 10C) until the observed growth reaches a later point more advanced in the midpoint direction (96a).

Referring to FIG. 10, the highly-tortuous lines (95a, 95b) and the non-tortuous lines (99a, 99b) may each be traced to reach a respective terminal point (97a for 95a, 97b for 95b, 97c for 99a, 97d for 99b) to provide a length of the respective highly-tortuous line or non-tortuous line and to provide a depth that is reached within the material for each line as compared to the cord surface (90a) near where the direction (96a, 96b) was defined. The terminal point (97a, 97b, 97c, 97d) may be at an arbitrary depth from the cord surface (90a) as shown in FIG. 10 or fixed at a depth of 50 μm or 100 μm from the cord surface (90a) in the selected midpoint direction (96a) or orthogonal direction (96b). As can be appreciated, the depth associated with each terminal point (97a, 97b, 97c, 97d) defines a straight-line distance between the cord surface (90a) and the terminal point (97a, 97b, 97c, 97d) (that is, a straight-line length) that may be compared to the twisting length of the corresponding highly-tortuous line (95a, 95b) or a non-tortuous line (99a, 99b). The lengths of the highly-tortuous lines (95a, 95b) may each be compared to corresponding straight-line lengths to provide a ratio (a tortuosity value) representing the tortuosity of the high-tortuosity material (92) and, in a similar manner, the lengths of the non-tortuous lines (99a, 99b) may each be compared to corresponding straight-line lengths to provide a ratio (a tortuosity value) representing the tortuosity of the low-tortuosity material (99).

For example, with reference to FIG. 10, the highly-tortuous line (95a) may have a twisting length of 400 μm (along the highly-curved natural path from cord surface 90a to terminal point 97a) and its corresponding straight-line measured depth may have a length of 200 μm (along a straight line between cord surface 90a and terminal point 97a), thereby providing a tortuosity value of 2 for the high-tortuosity material (92) calculated from 400 μm divided by 200 μm. A tortuosity value of 2, for example, would represent that for each unit of straight-line length achieving a designated depth (of 50 μm, for example) in a selected direction (either a midpoint direction or an orthogonal direction) into the high-tortuosity material from the cord surface, the twisting natural path through of the material structures requires twice that unit length to reach the desired depth into the material at the terminal end of the natural path. In another example, with reference to image 10B, the highly-tortuous line (95b) may have a twisting length of 600 μm and its corresponding straight-line measured depth may have a length of 200 μm, thereby providing a tortuosity value of 3 for the high-tortuosity material (92) calculated from 600 μm divided by 200 μm. A tortuosity value of 3, for example, would represent that for each unit of straight-line length achieving a depth in a selected direction into the high-tortuosity material, the natural path through the material requires three-times that unit length to reach the desired depth into the material. As can be appreciated, with the application of this calculation method, a high-tortuosity material would have a tortuosity value that is greater than the tortuosity value for a low-tortuosity material. As can also be appreciated, the high-tortuosity material (92) shown in images 10A-10B and characterized as have tortuosity values of 2 and 3 may be further characterized, using the aforementioned examples and without limitation, as having a tortuosity value of 2-3 representing a range, as having an average tortuosity value of 2.5, or as having an average value based the aforementioned values and additional values constituting a statistically sufficient number of samplings to characterized a material tortuosity. In further embodiments, the high-tortuosity materials shown and described herein are believed to have tortuosity values inclusively ranging from 2-200, 2-100, 2-50, 2-10, 2-5, 2-3, 5-200, 5-100, 5-50, 5-10, 10-200, 10-100, 10-50, 50-200, 50-100, and 100-200. It is also believed that high-tortuosity materials shown and described herein have tortuosity values that are equal or greater than 2, equal or greater than 5, equal or greater than 10, equal or greater than 20, equal or greater than 50, equal or greater than 100, and equal or greater than 200.

In a similar manner in another example, with reference to images 10A and 10C, the non-tortuous line (99a) may have a twisting length of 210 µm and its corresponding straight-line measured depth could have a length of 200 µm, thereby providing a tortuosity value of 1.05 for the low-tortuosity material (93). A tortuosity value of 1.05, for example, may represent that for each unit of straight-line length achieving a depth in a selected direction (either a midpoint direction or an orthogonal direction) into the low-tortuosity material, the twisting natural path defined by the material requires 1.05 times that unit length to reach the desired depth into the material. In another example, with reference to image 10C, the non-tortuous line (99b) may have a twisting length of 250 µm and its corresponding straight-line measured depth may have a length of 200 µm, thereby providing a tortuosity value of 1.25 for the low-tortuosity material (93). A tortuosity value of 1.25, for example, may represent that for each unit of straight-line length achieving a depth in a selected direction into the high-tortuosity material, the natural path of the material requires 1.25 times that unit length to reach the desired depth into the material. As can be appreciated, the low-tortuosity material (93) shown in images 10A and 10C may be characterized, using the aforementioned examples and without limitation, as having a tortuosity value of 1.05-1.25, as having an average tortuosity value of 1.15, or as having an average value based on a sufficient number of samplings for the material. In evaluations of known low-tortuosity materials used to cultivate seaweed, it is believed that low-tortuosity materials have tortuosity values that are less than 2, between 1 and 2, between 1 and 1.75, between 1 and 1.50, and between 1 and 1.25.

Some embodiments described previously include a braid or composition of a high-tortuosity material combined with or adjacent to a low-tortuosity material. In such arrangements, the tortuosity of the braided or composite cord or yarn may be expressed as a ratio of the tortuosity value for the high-tortuosity material compared to the tortuosity value for the low-tortuosity material. For example, in a braided cord having a high-tortuosity material with a tortuosity value of 2 and a low-tortuosity material with a tortuosity value of 1.05, a comparative tortuosity value may be expressed as a combined ratio 1.90 (calculated from 2 divided by 1.05), as a difference 0.95 (calculated from 2 minus 1.05), or as an additive to a baseline defined by the low-tortuosity material such as +0.95 (representing that the high-tortuosity material's tortuosity value of 2 represents an enhancement of +0.95 to the low-tortuosity material's tortuosity value of 1.05). In other expressions, the number of braids and the type of material in each braid may be used to bias the expressions to give greater calculative weight to the material with the greater presence, the greater mass, or the greater surface area on the external-facing surface of the cord presenting a seaweed-engagement surface.

Example 14

Figure 11B:
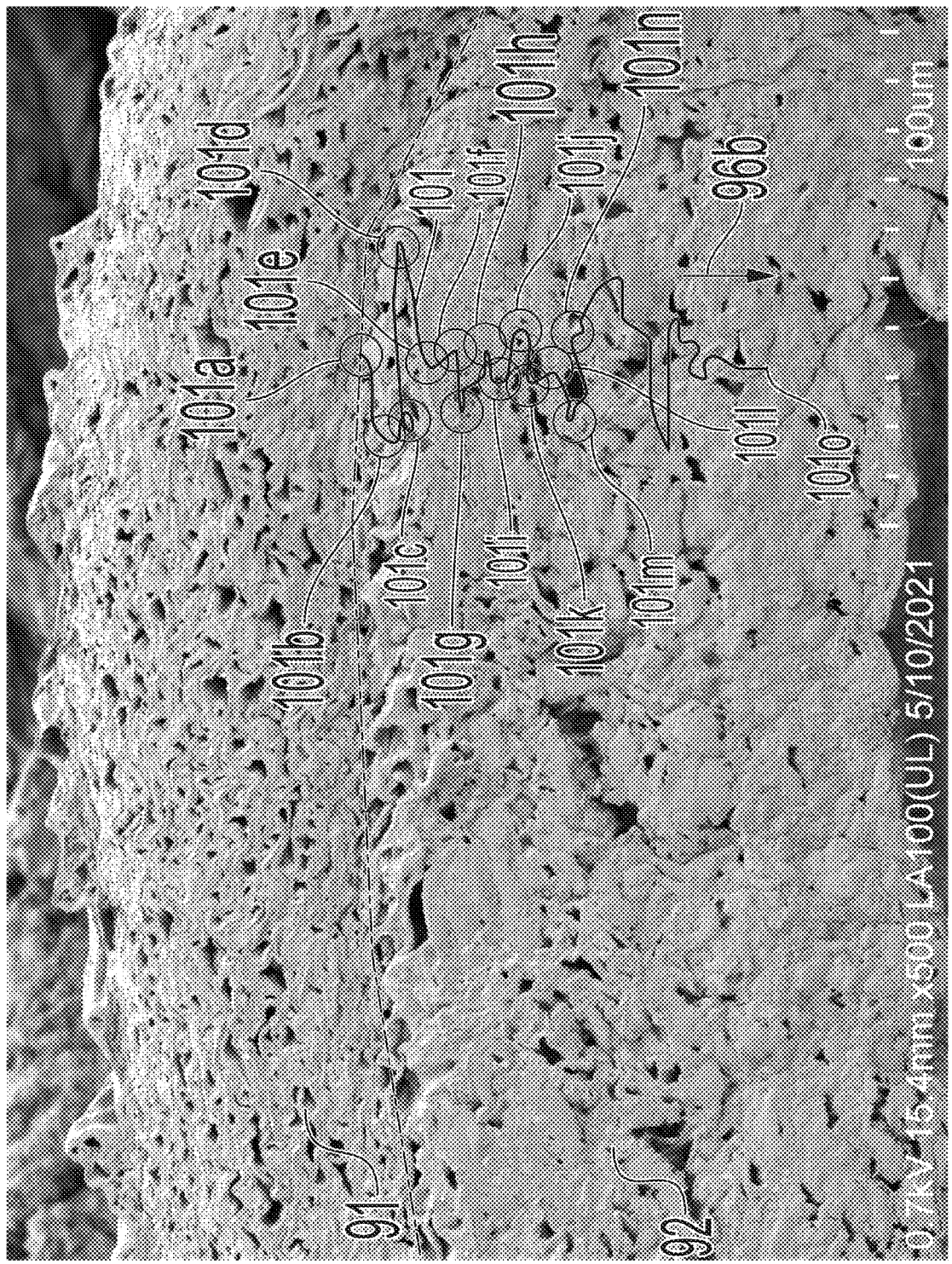
FIG. 11B. The same SEM image of FIGS. 9B and 10B but with the addition of a series of vectors tracing a tortuous path through the component materials. The image is to the scale noted in the image.

Referring now to FIGS. 11A and 11B, which have the same images and content as FIGS. 9 (images 9A and 9b) and 10 (images 10A and 10B), shown again but not labeled from FIGS. 9 and 10 are the cord or yard (90), the cord surface (90a), the holdfast (91), the penetrative plant growth (91a)/middle inner phase (91a), the holdfast growth (91b), the high-tortuosity material (92), the lower phase (92a), the low-tortuosity material (93), the midpoint direction (96a), and the orthogonal direction (96b). In the same manner as explained with regard to FIG. 9, FIG. 11B is an expanded view of a portion of FIG. 11A. Both FIGS. 11A and 11B should be understood together and, is necessary, understood with FIG. 9C from FIG. 9. As with FIGS. 9 and 10, all images in FIGS. 11A and 11B are magnified and scaled as noted in the respective images.

With regard to FIGS. 11A and 11B, it is believed that the tortuosity of a material may be characterized and defined, in part, by identifying a natural path through the material that is either presentable to a potential seaweed ingrowth or that has facilitated the ingrowth of a seaweed holdfast in an observable manner, and also believed that the tortuosity of a material may be further defined by comparing (a) a length of travel along the natural path to (b) a quantity turning or number of turns experienced during that travel. It is further believed that the tortuosity of a material may be based in part on a length of the potential or observable ingrowth into the material that may be ascertained from a tracing or a framework applied to imagery of the material without the presence of seaweed ingrowth and/or applied to imagery of an observable seaweed holdfast ingrowth into the material. It is also believed that the tortuosity of a material may be, in part, defined by a tracing of the natural path through the material applied to imagery of the material and/or seaweed ingrowth into the material to ascertain (a) a length of the natural path and (b) an accumulated number turns or accumulated degrees of turning experienced along the length of the natural path, and that the natural path length and accumulated totals for turns or degrees may be compared to each other to define a tortuosity value of the evaluated material.

Referring now to FIGS. 11A and 11B and with reference to the descriptions of FIGS. 9 and 10, FIG. 11A shows a series of vectors (100) tracing a natural path through the low-tortuosity material (93) and FIG. 11B shows a line (101) that represents a series of vectors (100) tracing a natural path through the high-tortuosity material (92). Each vector (100) of the series of vectors is a straight line that extends a discrete length from a starting point to an ending point to trace a mostly straight segment of the natural path, and the series of vectors (100) together trace an entire natural path as described previously with regard to FIGS. 9 and 10. Each vector (100) of the series of vectors join end to end and define an angulation between adjoining vectors that represents discrete turns in the natural path. That angulation may be evaluated to provide a number of turns observed along the natural path or to provide a number of degrees of turning between adjoining vectors (100) along the natural path. Each vector corresponds to a discrete distance that the natural path travels through the material without the presence of seaweed material, and may also correspond to a discrete distance of travel of an observed seaweed holdfast traveling a natural path through the material. As shown in FIG. 11A, the angulation or change in the directionality of adjoining vectors occurs at points (100a, 100b, 100c, 100d, 100e, 100f, and 100g) until reaching the end of the last vector (100) at a terminal point (100h). As can be appreciated, where one vector adjoins the next vector in the series there is a corresponding angulation between adjoining vectors or, viewed another way, a change in directionality of the path defined by a prior vector in the series. The angulation or the change in a directionality of the natural path may be assigned a value in degrees of turning as observed in a two-dimensional plane defined by an image, such as FIG. 11A for example, or the number of turns may be counted between each vector of a series. The total number of degrees of turning or angulation in the natural path may be summed to determine the total turning or angularity presented by the natural path for a given length of travel.

In the example of FIG. 11A where a change of directionality is determined along a material-defined natural path, a first vector (100) in the series of vectors sets an initial direction that is used to determine the degrees of turning needed to change the initial direction of the first vector to the direction of the second vector. As shown in FIG. 11A, the initial vector and the other vectors (100) may trace a natural path that starts at the cord surface (90a) in a midpoint direction or an orthogonal direction and then experience a turning of a number of degrees to align with the next vector (100) in the series of vectors. As shown in FIG. 11A, the first vector is in an orthogonal direction (96b) in a two-dimensional plane of the image and is shown to lead to the next second vector at point 100a where there is a 60° turn to the left to align with the second vector, and then this turning process repeats when the second vector ends at point 100b where there is a 65° turn to the right to lead to the third vector and so on. The series continues as follows: 30° to the right at point 100c; 45° to the left at point 100d; 45° to the left at point 100e; 45° to the right at point 100f; 30° to the left at point 100g; and then terminating at point 100h. The cumulative angularity for this natural path is calculated to be the sum of the individual turn values. In the example of FIG. 11A, the seven turns add up to 320° in the selected two-dimensional plane (calculated from 60°+65°+30°+45°+45°+45°+30°=) 320°. The low-tortuosity material (93) of FIG. 11A can be understood to experience 320° of turning to achieve a path length that is measurable from the scaling noted in FIG. 11A. An examination of each vector in FIG. 11A and the scale provided allows the measurement of a natural path length of 125 μm calculated from individual vector length values of 20 μm, 15 μm, 15 μm, 15 μm, 10 μm, 15 μm, 15 μm, and 20 μm. The low-tortuosity material (93) of FIG. 11A can be thus determined to have a tortuosity value that is based on 320 degrees of turning experienced over a natural path length of 125 μm in a direction established by the first orthogonal vector (100) of the series of vectors. When expressed as a ratio, the low-tortuosity material (93) shown in the example of FIG. 11A can be said to have a tortuosity value of 2.56 degrees for each micrometer of length or, expressed yet another way, said to have a tortuosity value of 2.56 degrees/μm (calculated from 320 degrees divided by 125 μm). As can be appreciated, a material with a higher tortuosity would present a greater tortuosity value because a greater degree of turning would be experienced for each unit length of travel along a natural path viewed in a high tortuosity material.

As explained above with regard FIG. 10, the low-tortuosity material (93) shown in FIG. 11A and characterized as have tortuosity value of 2.56 degrees/μm may be further characterized, using the aforementioned examples and without limitation, as having a tortuosity value expressed as a range encompassing multiple evaluations of the material, as having an average tortuosity value based on an average of multiple evaluations of the material, or as having an average value based on a statistically sufficient number of samplings to characterized a material tortuosity. It is further believed that low-tortuosity materials used for seaweed applications are limited to tortuosity values that are less than 3.00 degrees/μm.

Referring now to FIG. 11B, a natural path of high-tortuosity material (92) is traced by a line (101) that represents the series of vectors (100) applied in the description of FIG. 11A. The high prevalence of turns in the natural path of FIG. 11B inhibits the application and viewing of the high-tortuosity natural path with same-sized discrete vectors that were used with FIG. 11A for a low-tortuosity natural path and, in order to permit evaluation of FIG. 11B for this disclosure, a line (101) is applied to capture a majority of the vectors and turns that would have been represented by a multitude of small-sized discrete vectors (100). As can be appreciated, discrete vectors (100) applied to a high-tortuosity material may be better represented by the line (101) with a greater degree of magnification and with the use of computer-enabled imagery analysis that may enable or enhance the identification of vectors and turns in the identification of the natural path. As can also be appreciated, the use of the line (101) is a simplification that omits some of the turns and degrees of turning that would be observed with a high magnification of the imagery in FIG. 11B.

As described previously with regard to FIGS. 9 and 10, the line (101) may trace a natural path through the material without the presence of seaweed or may trace a natural path that follows an observable holdfast ingrowth. As also described with regard to FIGS. 9 and 10, the line (101) may advance in a midpoint direction or an orthogonal direction. In FIG. 11B, the line (101) advances in an orthogonal direction (96b) from the cord surface (90a) and traces a natural path defined by observable seaweed ingrowth that, at times, turns back in a direction opposite to the orthogonal direction where the seaweed ingrowth presents such turning.

Still referring to FIG. 11B, points along the line (101) are shown to change direction and a visual estimate of the degrees of turning associated with each turn may be obtained from the image in FIG. 11B. In the example of FIG. 11B, each significant turn is evaluated from a two-dimensional plane of the image, which allows the degrees of turning to be assessed for each point as follows: a 90° right turn at point 101a; a 180° left turn at point 101b; a full 360° loop at point 101c; a 170° right turn at point 101d; a 100° left turn at point 101e; a 70° right turn at point 101f; a 180° left turn followed by a 60° right turn at point 101g that is then followed by a 60° left turn; a 180° right turn at point 101h; a 180° left turn at point 101i; a 180° right turn at point 101j; a 110° left turn at point 101k; a 90° right turn at point 101l; a 180° left turn followed by a 60° right turn at point 101m and then followed by a 60° left turn; and then a 90° right turn followed by a 90° left turn at point 101n. Although not marked in FIG. 11B, the line (101) shows additional turns until reaching a terminal point (101o). Those additional unmarked turns subsequent to point 101n provide the following degrees of turning until reaching the terminal point (101o): a 30° right turn; a 70° right turn; a 70° left turn; a 70° right turn; a 30° left turn; a 160° left turn; a 180° right turn; a 90° left turn; a 110° right turn; a 90° left turn; a 130° left turn; a 170° right turn; a 90° left turn; a 130° left turn; a 120° right turn; and a 45° left turn. The addition of all of the above-described turns provides a total of 4075 degrees of turning to navigate the high-tortuosity material to reach the terminal point (101*o*). As shown in FIG. 11B, the length of the line (101) can be assessed with the scaling provided in the image to have a length of 540 μm in the two-dimensional plane of view provided in the image. The high-tortuosity material (92) of FIG. 11B can thus be determined to have a tortuosity value that is based on 4075 degrees of turning experienced over a natural path length of 540 μm in a direction established from the start at point 101*a*. When expressed as a ratio, the high-tortuosity material (92) shown in the example of FIG. 11B can be said to have a tortuosity value of 7.55 degrees for each micrometer of length or, expressed yet another way, said to have a tortuosity value of 7.55 degrees/μm (calculated from 4075 degrees divided by 540 μm). As can be appreciated, a material with a lower tortuosity would present a lower tortuosity value because a lesser degree of turning would be experienced for each unit length of travel along a natural path viewed in a low tortuosity or non-tortuous material.

As explained above with regard FIG. 10, the high-tortuosity material (92) shown in FIG. 11B and characterized as have tortuosity value 7.55 degrees/μm may be further characterized, using the aforementioned examples and without limitation, as having a tortuosity value expressed as a range encompassing multiple evaluations of the material, as having an average tortuosity value based on an average of multiple evaluations of the material, or as having an average value based on a statistically sufficient number of samplings to characterized a material tortuosity. In further embodiments, the high-tortuosity materials shown and described herein are believed to have tortuosity values inclusively ranging from 3-1000 degrees/μm, 3-500 degrees/μm, 3-200 degrees/μm, 3-100 degrees/μm, 3-50 degrees/μm, 3-10 degrees/μm, 3-5 degrees/μm, 5-1000 degrees/μm, 5-500 degrees/μm, 5-200 degrees/μm, 5-100 degrees/μm, 5-50 degrees/μm, 5-10 degrees/μm, 7-1000 degrees/μm, 7-500 degrees/μm, 7-200 degrees/μm, 7-100 degrees/μm, 7-50 degrees/μm, and 7-10 degrees/μm. It is also believed that high-tortuosity materials shown and described herein have tortuosity values that are equal or greater than 3 degrees/μm, equal or greater than 5 degrees/μm, equal or greater than 7 degrees/μm, and equal or greater than 10 degrees/μm.

Some embodiments described previously include a braid or composition of a high-tortuosity material combined with or adjacent to a low-tortuosity material. In such arrangements, the tortuosity of the braided or composite cord or yarn may be expressed as a ratio of the tortuosity value for the high-tortuosity material compared to the tortuosity value for the low-tortuosity material. For example, in a braided cord having a high-tortuosity material with a tortuosity value of 7.00 degrees/μm and a low-tortuosity material with a tortuosity value of 2.50 degrees/μm, a comparative tortuosity value may be expressed as a combined ratio of 2.8 (calculated from 7.00 degrees/μm divided by 2.50 degrees/μm), as a difference of 4.50 degrees/μm (calculated from 7.00 degrees/μm minus 2.50 degrees/μm), or as an additive to a baseline defined by the low-tortuosity material such as +4.50 degrees/μm (representing that the high-tortuosity material's tortuosity value of 7.00 degrees/μm represents an enhancement of +4.50 degrees/μm to the low-tortuosity material's tortuosity value of 2.50 degrees/μm). In other expressions, the number of braids and the type of material in each braid may be used to bias the expressions to give greater calculative weight to the material with the greater presence, the greater mass, or the greater surface area on the external-facing surface of the cord presenting a seaweed-engagement surface.

In addition to the above, an alternative method of comparing the tortuosity values of two materials is to follow the natural paths present in each material until a predetermined path length is reached, and then comparing the degrees of turning achieved for each material. Yet another method of comparing the tortuosity values of two materials is to follow the natural paths present in each material and to accumulate a degrees of turning experienced until a predetermined amount of degrees is achieved, and then comparing the path length or material depth that was achieved. With reference to the examples in FIGS. 11A and 11B, one measure of tortuosity is the length of a path extending until a given angularity is achieved. Bodies moving through highly tortuous material such as ePTFE will be required to change direction more frequently than bodies moving through less tortuous materials such as spun polyester. The length of a path traversing into, within, or through a given material until it reaches a set degree of cumulative angularity is one way to measure the tortuosity of the material. For purposes of measuring tortuosity, angularity may be set at a given value, and the length of a path traced by a body as it moves along a natural path may be measured until the body reaches the cumulative angularity limit.

Example 15

Referring again to FIG. 11B, it is believed that the tortuosity of a material may be characterized and defined, in part, by identifying a natural path through the material that is either presentable to a potential seaweed ingrowth or that has facilitated the ingrowth of a seaweed holdfast in an observable manner and further believed that material tortuosity can be characterized by comparing (a) a portion of the travel along the natural path in a direction that increases the depth of the natural path within the material to (b) a portion of the travel along the natural path in a direction orthogonal or sideways to the aforementioned direction that increases the depth of the natural path within the material. It is further believed that the tortuosity of a material may be based in part on a length of the potential or actual ingrowth into the material that may be ascertained from tracing applied to imagery of the material without the presence of seaweed ingrowth and/or applied to imagery of observable seaweed holdfast ingrowth into the material. It is also believed that the tortuosity of a material may be, in part, defined by a tracing of the natural path through the material that is applied to imagery of the material and/or seaweed ingrowth into the material to ascertain (a) a first depth-advancing portion of the natural path that advances the depth of the natural path within the material and (b) a second depth-neutral portion of the natural path that does not advance or diminish the depth of the natural path within the material, and that the depth-advancing portion and the depth-neutral portion may be compared to each other to define tortuosity values of the evaluated material.

As explained above with regard to FIG. 11B, the natural path may be traced by a line, such as line (101), and shown to have depth-advancing portions that advance progress of the tracing line in the selected direction, such as an orthogonal direction (96*b*) in FIG. 11B and have depth-neutral portions that do not advance or diminish prior advancement in the selected direction. In a similar manner and with regard to FIG. 11A, the natural path may be traced by a series of vectors, such as vectors (100), and each of the series of vectors may be shown to have depth-advancing portions that advance progress of the tracing line in the selected direction, such as an orthogonal direction (96b) in FIG. 11A, and have depth-neutral portions that do not advance or diminish prior advancement in the selected direction. The line (101) of FIG. 11B or each of the vectors (100) of FIG. 11A can be portioned into a first portion that is parallel to the selected direction (the orthogonal direction 96b) and a second portion that is non-parallel to the selected direction. The first portion may be further refined to remove elements that are opposite to the selected direction, thereby reducing the first portion to only a depth-enhancing portion. As can be appreciated, the length of the first depth-enhancing portion can be compared to the second depth-neutral portion to provide a tortuosity value of the natural path and the material.

In the example of FIG. 11A, a distance from the starting point of the series of vectors at cord surface (90a) to the terminal point (100h) is ascertainable from the scale of the image to provide a depth-enhancing distance (or depth) of 200 μm. The same evaluation of the image and its scaling provide a distance traversed either left or right of the orthogonal direction (96b) as the series of vectors progress to the terminal point (100h), which is ascertainable from the scale of the image to provide a depth-neutral distance (or total side-to-side movement) of 70 μm. A comparison of the depth-neutral value to the depth-enhancing value for the example of FIG. 11A provides a tortuosity value of 26% (calculated as a percentage with a side-to-side portion of 70 μm divided by the total observed 200+70 μm), which represents that 26% percent of the natural path traversing though the low-tortuosity material (93) is dedicated to sideways travel. It is believed that a low-tortuosity material used for seaweed cultivation provide a tortuosity value that is below 30%. A highly tortuous path of a high-tortuosity material would have a greater percentage of its travel dedicated to sideways movements as compared to a less tortuous path presented in a low-tortuosity material. As can be appreciated, if a material presented a straight-line path into the material with no tortuosity, such a line would have a tortuosity valve of zero percent as none of its travel would be side-to-side.

In the example of FIG. 11B, a distance from the starting point of the line (100) at point 101a at the cord surface (90a) to the terminal point (101o) is ascertainable from the scale of the image to provide a depth-enhancing distance (or depth) of 110 μm. The same evaluation of the image and its scaling provide a distance traversed either left or right of the orthogonal direction (96b) as the line (101) progresses to the terminal point (101o), which is ascertainable from the scale of the image to provide a depth-neutral distance (or total side-to-side movement) of 230 μm. A comparison of the depth-neutral value to the depth-enhancing value for the example of FIG. 11B provides a tortuosity value of 68% (calculated as a percentage with 230 μm divided by 230+110 μm), which represents that 68% percent of the natural path traversing though the high-tortuosity material (92) is dedicated to sideways travel.

As explained above with regard FIG. 10, the high-tortuosity material (92) shown in FIG. 11B and characterized as have tortuosity value of 68% may be further characterized, using the aforementioned examples and without limitation, as having a tortuosity value expressed as a range encompassing multiple evaluations of the material, as having an average tortuosity value based on an average of multiple evaluations of the material, or as having an average value based on a statistically sufficient number of samplings to characterized a material tortuosity. In further embodiments, the high-tortuosity materials shown and described herein are believed to have tortuosity values inclusively ranging from 30-90%, 30-80%, 30-70%, 30-60%, 30-50%, 30-40%, 40-90%, 40-80%, 40-70%, 40-60%, 40-50%, 50-90%, 50-80%, 50-70%, 50-60%, 60-90%, 60-80%, 60-70%, 70-90%, 70-80%, and 80-90%. It is also believed that high-tortuosity materials shown and described herein have tortuosity values that are equal or greater than 50%, equal or greater than 60%, equal or greater than 70%, equal or greater than 80%, and equal or greater than 90%.

Example 16

Figure 12:
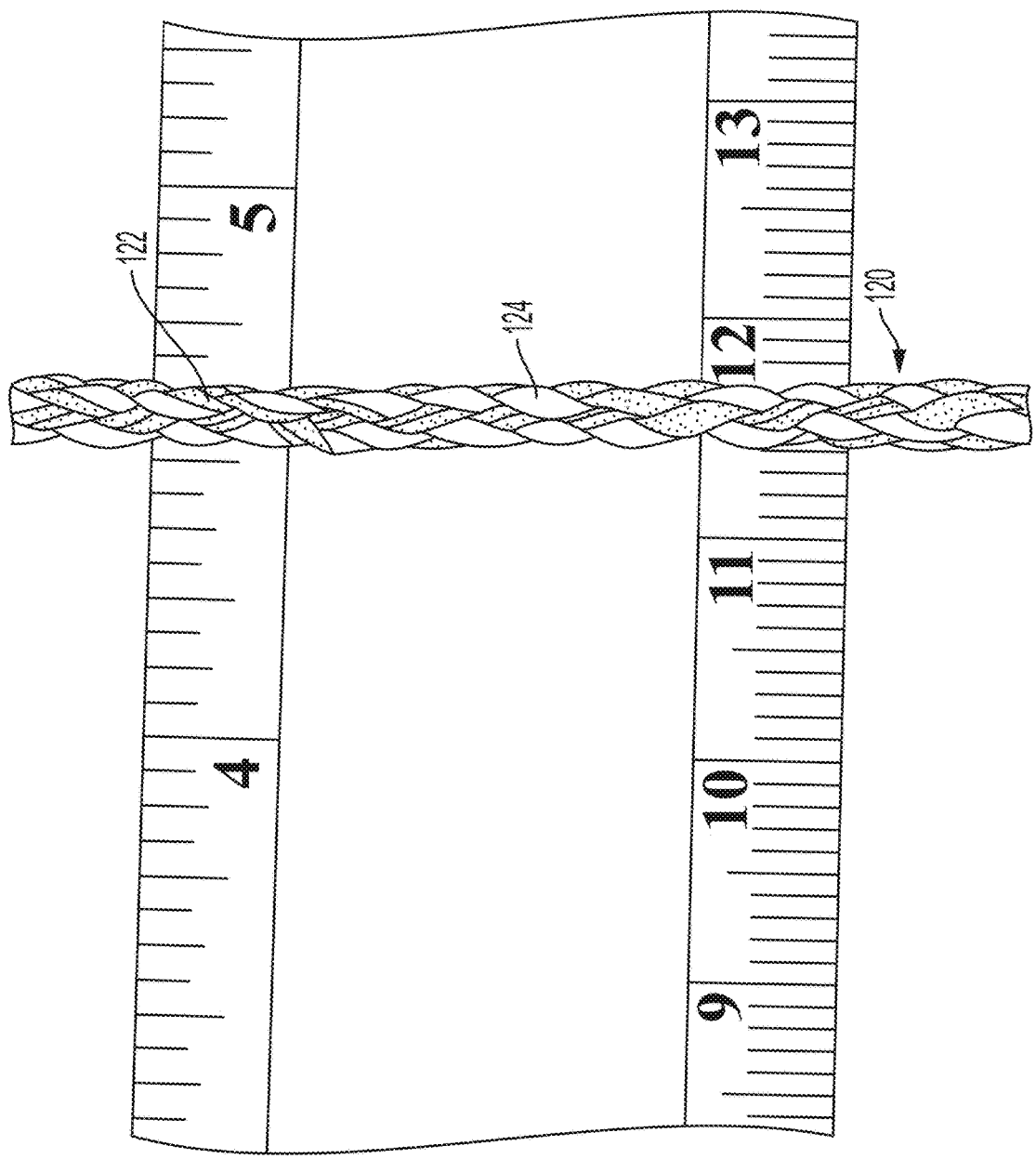
FIG. 12. An illustration of a composite eight-carrier diamond braid comprising a highly tortuous micro-fibrous material and a material having low tortuosity. The image is to the scale noted in the image, with millimeters and inches displayed on an illustration of a ruler.

Referring now to FIG. 12, shown to scale is an eight-carrier diamond braid (120) having five to six picks per inch consists of a first group of four carriers and second group of four carriers. Each of the four carriers of the first group contains one end of an expanded polytetrafluoroethylene (ePTFE) fiber, with the ePTFE fiber (122) (shown with a tan color or stippling) having a density of less than 1.0 g/cc, a typical inter-fibril spacing of between 1 μm and 50 μm, and a linear mass density of 1000 denier. Each of the four carriers of the first group also contain one end of an 8/1 spun polyester fiber. Each of the four carriers of the second group contain two ends of an 8/1 spun polyester fiber (124) (shown with a white color or with no stippling). As can be appreciated by a person of skill in the art, a similar braid may be woven using, for example, a twelve-carrier braid having a first group of six carriers and a second group of six carriers. Other variations of braiding techniques are envisioned and within the scope of options for the formation of braid (120). For example, for a more rounded external diameter of the braid, a higher number of carriers may be employed such as, for example, 16, 32, and 64 carrier braids. For a more robust braid, the linear mass density of the ePTFE fibers may be increased to 2000, 3000, 4000, or 5000 denier.

In an alternative embodiment of this Example, an eight-carrier diamond braid may be woven with 100% ePTFE fiber (with no polyester components) with five to six picks per inch that consists of eight carriers with each of the eight carriers containing one end of an ePTFE fiber, with the ePTFE fiber having a density of less than 1.0 g/cc, a typical inter-fibril spacing of between 1 μm and 50 μm, and a linear mass density of 1000 denier. As can be appreciated by a person of skill in the art, a similar braid may be woven using, for example, a twelve-carrier braid or more. Other variations of braiding techniques are envisioned and within the scope of options for the formation of braid. For example, for a more rounded external diameter of the braid, a higher number of carriers may be employed such as, for example, 16, 32, and 64 carrier braids. For a more robust braid, the linear mass density of the fiber may be increased to 2000, 3000, 4000, or 5000 denier.

Example 17

As mentioned previously, a seedling or juvenile seaweed plant requires a stable engagement between its holdfast and an anchoring surface in order to grow and mature into a healthy plant and provide a high-yield harvest for a seaweed farmer. Analyses of a variety of seaweed growth patterns has revealed that poor engagement between holdfast and anchoring surface stimulates the seaweed plant to dedicate more nutrients to holdfast development and less to overall plant growth during a season. It is believed that a high degree of engagement between a holdfast and an anchoring substrate material and, in particular, a high degree of holdfast penetration into an anchoring substrate material is associated with an improved plant engagement with the substrate. It is further believed that an improved plant-anchor engagement at a holdfast-substrate interface is associated with the achievement of robust plant health and an improved yield at harvest.

As can be appreciated by a skilled person, the cultivation substrate may be a component of a seaweed cultivation system that includes a rope of an appropriate length and tensile strength to allow the rope to be supported by a float or anchor in an aquatic environment. In some embodiments the rope is initially seeded with immature seaweed plants that are disposed to grow onto and into the rope material to form an engagement with the rope. Images of this interface between cultivation substrate and seaweed holdfast may be obtained after a period of growth by cutting through the rope in a transaxial or perpendicular orientation at a location where the seaweed has engaged with the rope to form one or more cross-sections, as shown in FIG. 13. The cut rope may provide a view of the interface between the cultivation substrate and the holdfast with known macroscopic and microscopic visualization techniques capable of providing a view of the interface at an appropriate angle and with appropriate lighting or other visualization techniques. Other macro- and microscopic visualization techniques may be used such as techniques that apply a dye to enhance the imagery to distinguish between substrate and holdfast or to simply enhance the presence of seaweed material. Another visualization technique may involve the use of fluorescence to enhance the imagery to distinguish between substrate and holdfast or to enhance the presence of seaweed material.

As can be appreciated by a skilled person, the images may be created at any time during the process of growing an aquatic plant on the aquatic growth substrate. Growth on a given substrate may be initiated by contacting the substrate with spores, gametophytes, sporophytes, juvenile plants, or plants or portions of plants in a more advanced stage of growth. Images and samples may be taken at any time during the growth cycle for example, shortly after attachment to a time when the plant is ready for harvest.

FIG. 13 shows a magnified color image of an aquatic plant growing in contact with the surface of a composite cultivation substrate comprising a weave of spun polyester (157) and ePTFE (158). The area defined by broken circle (151) is an isolated detail showing portions of the plant holdfast (152) in contact with the outer surface of the cultivation substrate comprising spun polyester (157). Broken circle (153) is an isolated detail showing portions of the plant holdfast (154) in contact with the outer surface of the cultivation substrate comprised of ePTFE (158) in the composite. As shown in this image, the growth of the portion of the holdfast (154) growing on the surface of subtracted comprised of ePTFE (158) exhibits a more robust growth and engagement than see in with the growth of the portion of the holdfast (152) in contact with the spun polyester (157).

Example 18

Referring to FIGS. 14-17, it is believed that the suitability of a material for holdfast engagement and the tortuosity of a material may be characterized and defined, in part, by identifying and characterizing the degree to which a seaweed holdfast engages and grows into the material after the seaweed is allowed to grow into the material for a defined amount of time. It is also believed that the degree of holdfast engagement and ingrowth can be assessed visually by preparing a sample where a holdfast-material engagement is present and by using microscopy and, in particular, the use of visible light techniques and fluoroscopy techniques to view and identify the presence of holdfast ingrowth within the material. It is further believed that visible light and fluorescent photographic images of materials with engaged seaweed holdfasts can be processed and displayed in a manner that reveals the level of engagement and ingrowth and that those photographic images can be used to assess a quantity, degree, and depth of ingrowth into the material. It is also believed that scaled tracings and frames can be applied to such photographic imagery to quantify the level of engagement and ingrowth, and that comparisons can be made between seaweed holdfast structures that are disposed adjacent to the material (and are thus not within the material as an ingrowth), portions of the material that have holdfast ingrowth, and portions of the material that have minimal or no holdfast ingrowth.

Figure 14B:
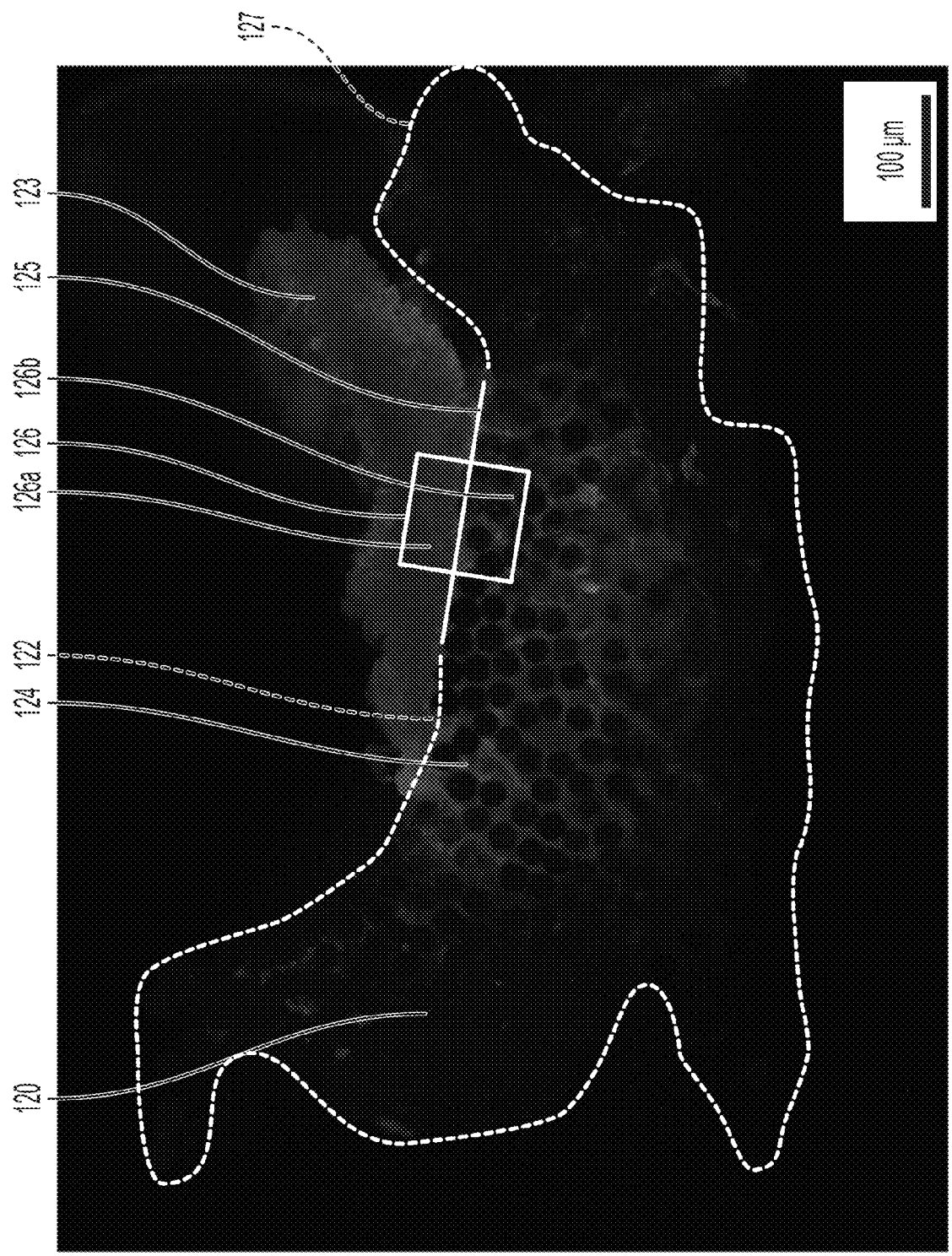
FIG. 14B. A magnified florescent photographic image of a cross sectional view of the same imagery presented in FIG. 14A. The image is to the scale noted in the image.

FIGS. 14A and 14B show two microscopic views of the same example. The example is a portion of a braided cord in part made of the same low-tortuosity material shown and described with regard to FIGS. 9, 10, and 11A-11B. The imagery of FIGS. 14A and 14B is a view of a cross-section of a cord prepared by cutting the cord transaxially and by manipulating the cut end of the cord to present a view of the low-tortuosity material and a seaweed holdfast engaging and penetrating into the low-tortuosity material, using a preparation technique that is similar to the preparation technique described with regard to FIGS. 9, 10, and 11A-11B. FIG. 14A is a microscopic view of the cross-section in visible light and FIG. 14B is a microscopic view of the same cross-section in a fluorescence enabling light. Both FIGS. 14A and 14B are at the same scale and both are to the scale noted in the respective imagery. Visible light images such as that shown in FIG. 14A may be created using standard photography techniques.

FIG. 14A shows a portion of a cord (110) having a low-tortuosity material (120) made of polyester fibers that define spaces (121) between the fibers. The low-tortuosity material (120) has a surface (122) that is the exterior surface of the cord that was, prior to preparation, presented to an aquatic environment during a growth period to promote the growth of a seaweed holdfast onto and into the surface (122) of the cord (110). As shown in the imagery, a view of the cut cord (110) was selected and prepared to show a seaweed holdfast (123) disposed adjacent to the cord surface (122) and to show seaweed ingrowth (124) penetrating into the low-tortuosity material (120) in the spaces (121) between the fibers. In the photographic imagery of FIG. 14A displaying the cord (110) and holdfast (123) in visible light, it is possible to distinguish between the artificial cord material and the organic seaweed material in part due to the dark brown coloration of the seaweed material as compared to the colorless polyester and in part due to the finer structures of the seaweed material as compared to larger structures of the polyester fibers.

As can be seen in FIG. 14A, a portion of the cord surface (122) has a straight orientation where the low-tortuosity material (120) and the seaweed holdfast (123) remain adjacent to each other and the seaweed ingrowth (124) extending from the holdfast (123) remains intact within the structure of the low-tortuosity material (120). Placed over the imagery of the straight oriented cord surface (122) is a boundary line (125) having a length of at least 100 µm. The boundary line (125) marks a feature on the imagery where there is a suitable representation of a seaweed-material engagement and, in particular, where there is a straight or mostly straight engagement between the low-tortuosity material (120) and the holdfast (123), and where the holdfast (123) presents engagement with a penetrative ingrowth (124) extending into the low-tortuosity material (120). As also shown, a frame (126) is placed over the boundary line in a specific orientation to bisect the frame (126) and place half of the frame (126) on each side of the boundary line (125). The frame (126) is square of a 100 μm by 100 μm and bisected by the boundary line (125) such that a first half of the frame (126*a*) extends over the seaweed holdfast (123) (by 50 μm in this example) and a second half of the frame (126*b*) extends over the low-tortuosity material (120) having the seaweed ingrowth (124) (by 50 μm in this example). The second half of the frame (126*b*) is not placed over an area of the low-tortuosity material (120) that lacks seaweed ingrowth (124). As can be appreciated, the placement of the boundary line (125) and the frame (126) are deliberately made to capture a consistent and representative view of the seaweed holdfast (123) in the first frame half (126*a*) and to capture a consistent and representative view of the penetrative ingrowth (124) in the second frame half (126*b*). In a comparison of the first frame half (126*a*) and the second frame half (126*b*) of FIG. 14A, it is apparent to a person of skill that the organic seaweed material visually present in the second frame half (126*b*) under visible light microscopy is less than 25% of the organic seaweed material visually present in the first frame half (126*a*) under the same visualization technique. It is believed that low-tortuosity materials that have engaged with a seaweed holdfast and had ingrowth of the holdfast into the low-tortuosity material will present a quantity of organic seaweed material in the second frame half (126*b*) that ranges from 10% to 25% of the quantity of organic seaweed material in the first frame half (126*a*).

It is also believed that the application of a frame (126) of 100 μm by 100 μm provides a sufficient sampling of the seaweed-material engagement to represent the engagement across a larger surface of the cord (122), and that such a frame can be applied at multiple locations presenting engagement and ingrowth to provide an average for a sample cord. It is contemplated that other frames may be used that define an area that is a fair representation of the seaweed-material engagement for a majority of a cord, such as a frame that is a circle having a diameter of 100 μm that can be bisected by the boundary line (125).

FIG. 14B presents the same image of FIG. 14A but with fluorescent imaging instead of visible light. Fluorescent images such as that shown in FIG. 14B may be created using standard techniques such as with the use of an Aquapen hand-held device. Additional information on a fluorescence imaging technique may be found in sources such as, "Chlorophyll fluorescence analysis; a guide to good practice and understanding some new applications", Murchie and Lawson, *Journal of Experimental Botany*, Vol. 64, No. 13, pp. 3983-3998, 2013.

FIG. 14B includes all of the same structures noted in FIG. 14A but with some structures that are less or more visible when subjected to the fluorescence image technique displayed in FIG. 14B. To aid the viewer, a dotted line (127) has been applied to FIG. 14B to outline where the polyester low-tortuosity material (120) is present as seen in FIG. 14A. As can be seen in FIG. 14B, the low-tortuosity material (120) within dotted line (127) is black, non-fluorescent, and indistinguishable from areas of the image that have no fluorescence. In addition, the contrast of the image in FIG. 14B has been adjusted to maintain the imagery of the low-tortuosity material (120) at a level that has zero or minimal presence in the fluorescent imagery. As can be seen, with the adjustment of contrast, the low-tortuosity material (120) can be made to either match a zero-fluorescence background of the image or to be set to a level that can be defined as a zero-fluorescence baseline level in the imagery. As can be appreciated, this calibration of the fluorescent imagery contrast is important because, if properly executed, the calibration will eliminate the low-tortuosity material (120) as a significant source of fluorescence in the imagery when comparison is done between the first frame half (126*a*) and the second frame half (126*b*).

As can also be seen in FIG. 14B, the holdfast (123) and the penetrative ingrowth (124) both provide an observable level of fluorescence that is visually and measurably distinguishable from the low-tortuosity material (120) and the zero-fluorescence background of the image. When viewing the frame 126, it is also apparent that the fluorescence of the first half frame (126*a*) circumscribing an area containing the organic seaweed material of the holdfast (123) is substantially greater than the fluorescence of the second half frame (126*b*) circumscribing an area containing the organic seaweed material of the penetrative ingrowth (124) disposed between the fibers of the low-tortuosity material (120). In a comparison of the first frame half (126*a*) and the second frame half (126*b*) of FIG. 14B, it is apparent to a person of skill that the organic seaweed material visually present in the second frame half (126*b*) under a fluorescence imaging microscopy technique is less than 25% of the organic seaweed material present in the first frame half (126*a*) under the same visualization technique. It is believed that low-tortuosity materials that have engaged with a seaweed holdfast and had ingrowth of the holdfast into the low-tortuosity material will present a second quantity of organic seaweed material circumscribed by the second frame half (126*b*) that ranges from 10% to 25% of a first quantity of organic seaweed material circumscribed by the first frame half (126*a*).

Figure 15A:
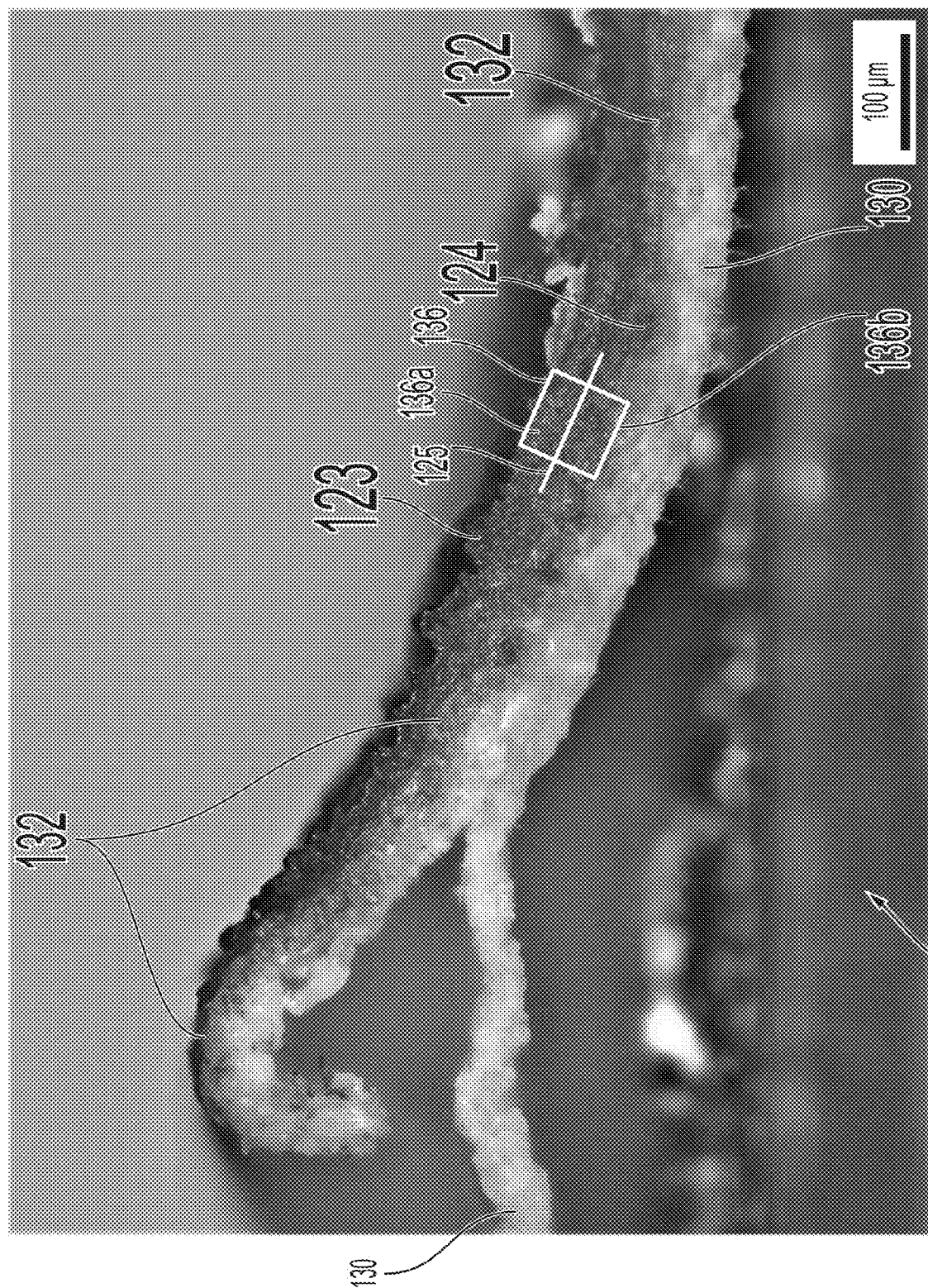
FIG. 15A. A magnified visible light photographic image of a cross sectional view of a portion of an aquatic plant growing on and into a composite cultivation substrate. The image is to the scale noted in the image.
Figure 15B:
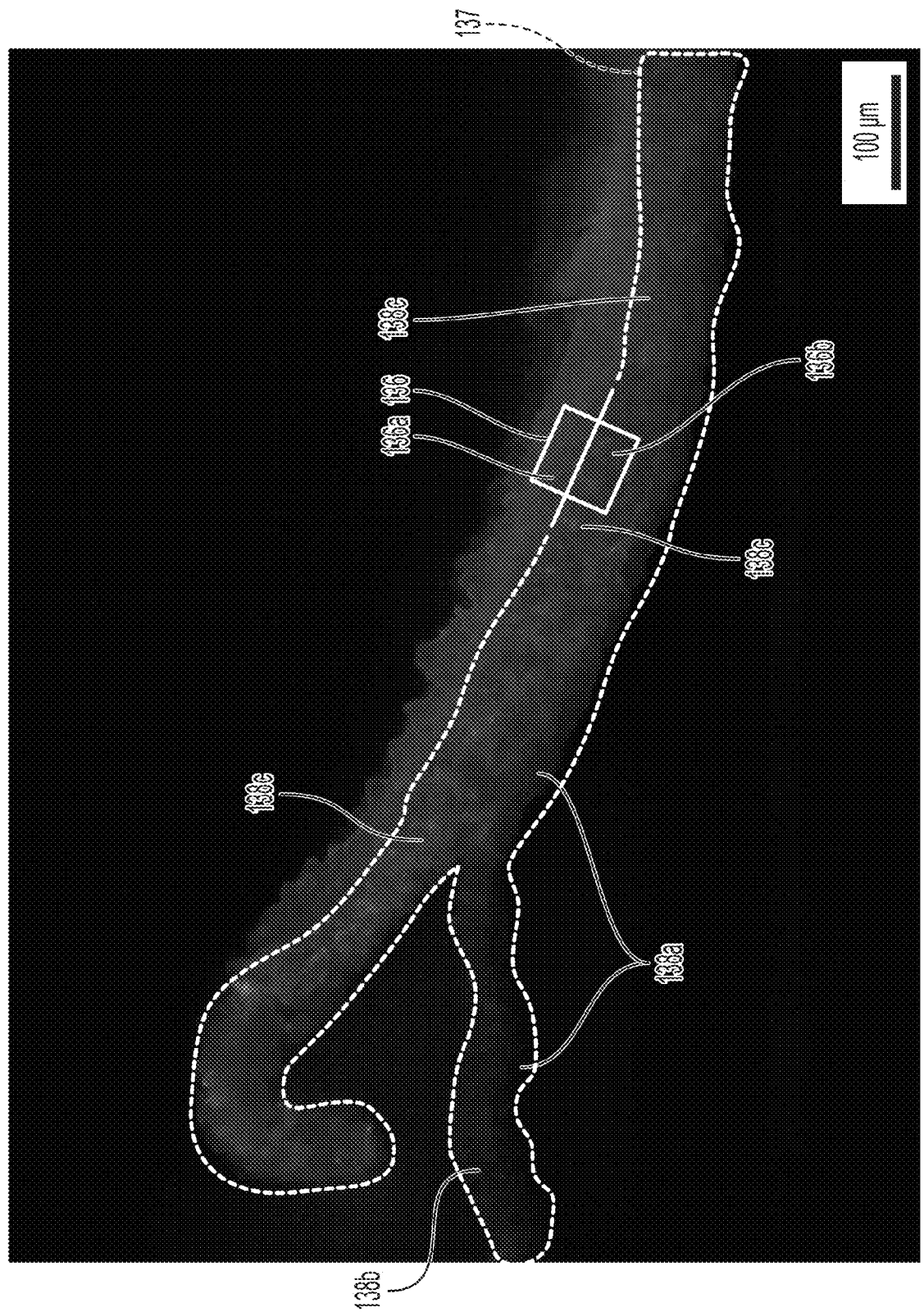
FIG. 15B. A magnified florescent photographic image of a cross sectional view of the same imagery presented in FIG. 15A. The image is to the scale noted in the image.

Reference is now made to FIGS. 15A and 15B. As can be appreciated, the same visualization techniques applied to FIGS. 14A and 14B may be applied to the images of FIGS. 15A and 15B, respectively, to (a) select and prepare the example of the cord and holdfast with holdfast ingrowth and provide a cross-sectional view, (b) obtain imagery of the cord material, holdfast, and penetrative ingrowth with either visible lighting or a fluorescence technique, and (c) apply lines and frames to the imagery to achieve a similar comparison between specific comparable regions of the imagery. For simplicity and where possible, the same numbering scheme is used with FIGS. 15A-15B as used with FIGS. 14A-14B where similar structures or features are identified.

FIGS. 15A and 15B show two microscopic views of the same example. The example is a portion of a braided cord in part made of the same high-tortuosity material shown and described with regard to FIGS. 9, 10, and 11A-11B. The imagery of FIGS. 15A and 15B is a view of a cross-section of a cord prepared by cutting the cord transaxially and by manipulating the cut end of the cord to present a view of the high-tortuosity material and a seaweed holdfast engaging and penetrating into the high-tortuosity material, using a preparation technique that is similar to the preparation technique described with regard to FIGS. 9, 10, 11A-11B, and 14A-14B. FIG. 15A is a microscopic view of the cross-section in visible light and FIG. 15B is a microscopic view of the same cross-section in a fluorescence enabling light. Both FIGS. 15A and 15B are at the same scale and both are to the scale noted in the respective imagery. Visible light images such as that shown in FIG. 15A may be created using standard photography techniques.

FIG. 15A shows a portion of a cord (110) having a high-tortuosity material (130) made of ePTFE fibrils that define intra-fibral spaces (not shown) between the fibrils. The high-tortuosity material (130) has a surface (132) that is the exterior surface of the cord that was, prior to preparation, presented to an aquatic environment during a growth period to promote the growth of a seaweed holdfast onto and into the surface (132) of the cord (110). As shown in the imagery, a view of the cut cord (110) was selected and prepared to show a seaweed holdfast (123) disposed adjacent to the cord surface (132) and to show seaweed ingrowth (124) penetrating into the high-tortuosity material (130) in the intra-fibral spaces (not shown) between the fibrils. In the photographic imagery of FIG. 15A displaying the cord (110) and holdfast (123) in visible light, it is possible to distinguish between the artificial cord material and the organic seaweed material in part due to the dark brown coloration of the seaweed material as compared to the white ePTFE. It is also possible to view the seaweed ingrowth (124) present in the white ePTFE high-tortuosity material (130) because the white ePTFE becomes tan where the seaweed is sufficiently present to provide a color difference as compare to the white ePTFE and the dark brown seaweed holdfast (123) disposed adjacent to the surface (132) of the high-tortuosity material (130).

As can be seen in FIG. 15A, a portion of the cord surface (132) has a straight orientation where the high-tortuosity material (130) and the seaweed holdfast (123) remain adjacent to each other and the seaweed ingrowth (124) extending from the holdfast (123) remains intact within the structure of the high-tortuosity material (130). Placed over the imagery of the straight oriented cord surface (132) is a boundary line (125) having a length of at least 100 μm. The boundary line (125) marks a feature on the imagery where there is a suitable representation of a seaweed-material engagement and, in particular, where there is a straight or mostly straight engagement between the high-tortuosity material (130) and the holdfast (123), and where the holdfast (123) presents engagement with a penetrative ingrowth (124) extending into the high-tortuosity material (130). As also shown, a frame (136) is placed over the boundary line (125) in a specific orientation to bisect the frame (136) and place half of the frame (136) on each side of the boundary line (125). The frame (136) is square of 80 μm by 80 μm and bisected by the boundary line (125) such that a first half of the frame (136a) extends over the seaweed holdfast (123) (by 40 μm in this example) and a second half of the frame (136b) extends over the high-tortuosity material (130) having the seaweed ingrowth (124) (by 40 μm in this example). The second half of the frame (136b) is not placed over an area of the low-tortuosity material (130) that lacks seaweed ingrowth (124). As can be appreciated, the placement of the boundary line (125) and the frame (136) are deliberately made to capture a consistent and representative view of the seaweed holdfast (123) in the first frame half (136a) and to capture a consistent and representative view of the penetrative ingrowth (124) in the second frame half (136b). In a comparison of the first frame half (136a) and the second frame half (136b) of FIG. 15A, it is apparent to a person of skill that the organic seaweed material visually present in the second frame half (136b) under visible light microscopy and having a white or tan color is contains 25% or more of the organic seaweed material visually present in the first frame half (136a) (having a dark brown color) under the same visualization technique. It is believed that high-tortuosity materials that have engaged with a seaweed holdfast and had ingrowth of the holdfast into the high-tortuosity material will present a second quantity of organic seaweed material circumscribed by the second frame half (136b) that ranges from 25% to 90% of a first quantity of organic seaweed material circumscribed by the first frame half (136a). In further embodiments, the high-tortuosity materials shown and described herein are believed to facilitate seaweed ingrowth where a second frame half (136b) circumscribes a second quantity of organic seaweed material that constitutes a percentage fraction of a first quantity of organic seaweed material that is circumscribed by a first frame half (136a), with the percentage fraction being one of the inclusive ranges of 30-90%, 30-80%, 30-70%, 30-60%, 30-50%, 30-40%, 40-90%, 40-80%, 40-70%, 40-60%, 40-50%, 50-90%, 50-80%, 50-70%, 50-60%, 60-90%, 60-80%, 60-70%, 70-90%, 70-80%, and 80-90%, and equal or greater than 25%, equal or greater than 30%, equal or greater than 40%, equal or greater than 50%, equal or greater than 60%, equal or greater than 70%, equal or greater than 80%, and equal or greater than 90%.

It is also believed that the application of a frame (136) of 80 μm by 80 μm provides a sufficient sampling of the seaweed-material engagement to represent the engagement across a larger surface of the cord (122), and that such a frame can be applied at multiple locations presenting engagement and ingrowth to provide an average for a sample cord. It is noted that the frame (136) of FIG. 15A is slightly smaller than the frame (126) of FIG. 14A because the ePTFE material presents a narrower structure in the selected imagery of FIG. 15A. It is contemplated that other frames may be used that define an area that is a fair representation of the seaweed-material engagement for a majority of a cord, such as a frame that is a circle having a diameter of 80 μm that can be bisected by the boundary line (125).

FIG. 15B presents the same image of FIG. 15A but with fluorescent imaging instead of visible light. Fluorescent images such as that shown in FIG. 15B may be created in the same manner described above with regard to FIG. 14B.

FIG. 15B includes all of the same structures noted in FIG. 15A but with some structures that are less or more visible when subjected to the fluorescence image technique displayed in FIG. 15B. To aid the viewer, a dotted line (137) has been applied to FIG. 15B to outline where the ePTFE high-tortuosity material (130) is present as seen in FIG. 15A. As can be seen in FIG. 15B, the high-tortuosity material (130) within dotted line (137) has black and non-fluorescent portions (138a) and almost non-fluorescent portions (138b) that are indistinguishable from areas of the image that have no fluorescence. In addition, the contrast of the image in FIG. 15B has been adjusted to maintain the imagery of the high-tortuosity material (130) at a level that has zero or minimal presence in the fluorescent imagery. As can be seen, with the adjustment of contrast, the high-tortuosity material (130) that does not have seaweed ingrowth (124) (at, for example, black and non-fluorescent portions (138a) and almost non-fluorescent portions (138b)) can be made to either match a zero-fluorescence background of the image or to be set to a level that can be defined as a zero-fluorescence baseline level in the imagery. As can be appreciated, this calibration of the fluorescent imagery contrast is important because, if properly executed, the calibration will eliminate the high-tortuosity material (130) as a significant source of fluorescence in the imagery when comparison is done between the first frame half (136a) and the second frame half (136b).

As can also be seen in FIG. 15B, the holdfast (123) and the penetrative ingrowth (124) both provide an observable level of fluorescence that is visually and measurably close or identical to the fluorescence at some portions (138c) of the high-tortuosity material (130) disposed near the cord surface (132). When viewing the frame 136, it is also apparent that the fluorescence of the first half frame (136a) circumscribing an area containing the organic seaweed material of the holdfast (123) is substantially similar or identical to the fluorescence of the second half frame (136b) circumscribing an area containing the organic seaweed material of the penetrative ingrowth (124) disposed between the fibrils of the high-tortuosity material (130). In a comparison of the first frame half (136a) and the second frame half (136b) of FIG. 15B, it is apparent to a person of skill that the organic seaweed material visually present in the second frame half (136b) under a fluorescence imaging microscopy technique is 25% or more of the organic seaweed material present in the first frame half (136a) under the same visualization technique. It is believed that high-tortuosity materials that have engaged with a seaweed holdfast and had ingrowth of the holdfast into the high-tortuosity material will present a quantity of organic seaweed material in the second frame half (136b) that ranges inclusively from 25% to 90% of the quantity of organic seaweed material in the first frame half (136a). In further embodiments, the high-tortuosity materials shown and described herein are believed to facilitate seaweed ingrowth where a second frame half (136b) circumscribes a second quantity of organic seaweed material (detectable by fluorescence techniques) that constitutes a percentage fraction of a first quantity of organic seaweed material that is circumscribed by a first frame half (136a) (and detectable by fluorescence techniques), with the percentage fraction being one of the inclusive ranges of 30-90%, 30-80%, 30-70%, 30-60%, 30-50%, 30-40%, 40-90%, 40-80%, 40-70%, 40-60%, 40-50%, 50-90%, 50-80%, 50-70%, 50-60%, 60-90%, 60-80%, 60-70%, 70-90%, 70-80%, and 80-90%, and equal or greater than 25%, equal or greater than 30%, equal or greater than 40%, equal or greater than 50%, equal or greater than 60%, equal or greater than 70%, equal or greater than 80%, and equal or greater than 90%.

Further to the reference made earlier regarding the presentation of a cord with low-tortuosity and/or high-tortuosity materials to an aquatic environment during a growth period to promote the growth of a seaweed holdfast onto and into the cord surface, it can be appreciated that the timing required to achieve such growth can be defined to correspond with a variety of growing cycles and seaweed plant maturation stages. For example, the growth period may be at least seven days, at least one month, or at least three months, or the growth period may be a time sufficient to constitute a season suitable for the cultivation of a seaweed plant. In other examples, a growth period may be defined by a spore stage of the seaweed plant, a seedling stage of the seaweed plant, a juvenile stage of the seaweed plant, or a period sufficient to achieve the growth of a mature seaweed plant.

Example 19

In this Example, a length of ePTFE was used as a cultivation substrate and a length of polyester was used as a control substrate, with the ePTFE and polyester substrates having similar widths and each being seeded with spores of *Saccharina latissima* (sugar kelp) and left in a laboratory hatchery under suitable light, seawater and temperature conditions to induce germination and fertilization of the spores into juvenile seedlings. After six weeks in the laboratory hatchery, a one-meter-long sample of each substrate was removed from the seawater tank and surface water on each substrate was removed using an absorbent cloth. The one-meter-long samples were then weighed. The seaweed from each substrate was then removed by passing each substrate through a small orifice to effectively strip the seaweed from the substrate surfaces. Each one-meter sample of substrate was then reweighed and the difference in original and final weight values were calculated to represent the weight of total plant growth on each substrate per one meter length of substrate.

Figure 16:
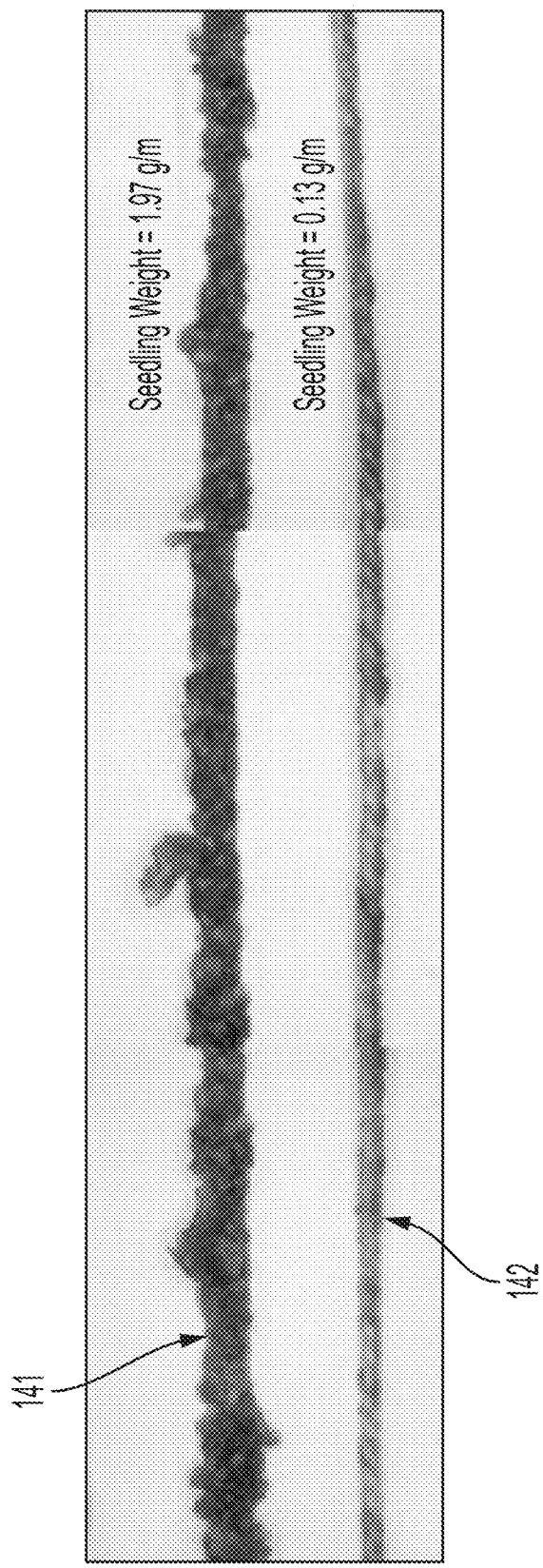
FIG. 16. A photographic image of two cord portions showing seaweed growth.

Referring now to FIG. 16, presented are two images of the same aquatic plant growing on ePTFE (141) and polyester (142) for the same length of time. As noted in FIG. 16, the mass per unit length of the aquatic plant seeding growing on and into the ePTFE material (141) was found to be 1.97 grams per meter and the mass per unit length of the aquatic plant seeding growing on and into the polyester material (142) was found to be 0.13 grams per meter. As can be appreciated, the growth density observed for the ePTFE material (141) is about fifteen times greater than the growth density observed for the polyester material (142). This Example demonstrates that the use of ePTFE as a growth medium of seaweed is associated with more robust growth at the adult stage of an aquatic plant's growth cycle as compared to the same growth cycle observed with a polyester growth medium.

The foregoing examples illustrate various concepts described in association with the embodiments of this disclosure and are meant to be read collectively with those concepts.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention, provided they come within the scope of the appended claims and their equivalents.

The invention claimed is:

1. A seaweed cultivation substrate for anchoring a holdfast of a seaweed plant in an aquatic environment, the substrate comprising:
a first cord extending over a first length and defining an exterior first cord surface configured to face the aquatic environment, the first cord comprising a plurality of first polymer fibers disposed proximate to each other along the first length and defining a first cross-sectional thickness of the first cord, each of the plurality of first polymer fibers further defining a first spacing between adjacent first polymer fibers, the plurality of first polymer fibers and the first spacing together defining a first natural path length extending from the exterior first cord surface and navigating around adjacent first polymer fibers to a first midpoint of the first cross-sectional thickness, the plurality of first polymer fibers and the first spacing together further defining a first tortuosity ratio of the first cord defined by the first natural path length compared to a first straight-line length measured from the exterior first cord surface to the first midpoint;
a second cord engaging the exterior first cord surface, the second cord extending over a second length and defining an exterior second cord surface configured to face the aquatic environment, the second cord comprising a plurality of second polymer fibers disposed proximate to each other along the second length and defining a second cross-sectional thickness of the second cord, each of the plurality of second polymer fibers further defining a second spacing between adjacent second polymer fibers, the plurality of second fibers and the second spacing together defining a second natural path length extending from the exterior second cord surface and navigating around adjacent second polymer fibers to a second midpoint of the second cross-sectional thickness, the plurality of second polymer fibers and the second spacing together further defining a second tortuosity ratio of the second cord defined by the second natural path length compared to a second straight-line length measured from the exterior second cord surface to the second midpoint;

wherein the second tortuosity ratio is at least 5 times greater than the first tortuosity ratio.

2. The seaweed cultivation substrate according to claim 1, wherein the second tortuosity ratio is at least 50 times greater than the first tortuosity ratio.

3. The seaweed cultivation substrate according to claim 1, wherein the said second cord comprises a micro-fibrous material comprising a network of linked fibers with an inter-fibril distance of about 1 μm to about 200 μm.

4. The seaweed cultivation substrate according to claim 1, wherein the first cord comprises a bundle of nonlinked fibers.

5. The seaweed cultivation substrate according to claim 1, wherein the first and the second cords have hydrophilicities that differ from one another.

6. The seaweed cultivation substrate according to claim 1, the second cord has a density equal to or less than $1.0 \, g \, cm^{-3}$ and the first cord has a density greater than or equal to $1.0 \, g \, cm^{-3}$.

7. The seaweed cultivation substrate according to claim 1, wherein the said second cord comprises a micro-fibrous material comprising a network of linked fibers with an average inter-fibril distance (μm) and with an average density ($g \, cm^{-3}$), and wherein the second cord has a ratio of the average inter-fibril distance (μm) to the average density ($g \, cm^{-3}$) from about 1 to about 2000.

8. The seaweed cultivation substrate according to claim 1, wherein the second cord includes at least one expanded fluoropolymer, expanded thermoplastic polymer or expanded polymer formed by chemical vapor deposition.

9. The seaweed cultivation substrate according to claim 1, wherein the first cord is at least one material selected from the group of materials consisting of: spun/filament polyester, spun/filament nylon, spun HEMP, and natural fibers.

10. The seaweed cultivation substrate according to claim 1, wherein the cultivation substrate is in at least one of the forms selected from the group consisting of:

a braid, a knit, a yarn, a covered yarn, a nonwoven, a weave, a fabric, a particulate dispersion, a bead, a stitch-bonded fabric, and a laminate.

11. The seaweed cultivation substrate according to claim 1, wherein the second cord forms a core having an external surface.

12. The seaweed cultivation substrate according to claim 11, wherein the first cord is attached to at least a portion of the external surface of the core.

13. The seaweed cultivation substrate according to claim 12, wherein the first cord is attached to the external surface of the core as bands spaced at any distance from one another selected from the range of about 0.9 mm to about 10 mm from one another.

14. The seaweed cultivation substrate according to claim 12, wherein the bands are spaced more than about 10 mm from one another.

15. The seaweed cultivation substrate according to claim 11, wherein the first cord is in the form of at least one rope, and the at-least one rope is wrapped around at least a portion of the external surface of the core.

16. The seaweed cultivation substrate according to claim 11, wherein the first cord is in the form of at least one ribbon, and the at-least one ribbon is wrapped around at least a portion of the external surface of the core.

17. The seaweed cultivation substrate according to claim 1, wherein the cultivation substrate is in the form of a braid including at least one second cord and at least one first cord.

18. The seaweed cultivation substrate according to claim 1, wherein the cultivation substrate is in the form of a covered yarn including at least one first cord and at least one second cord.

19. The seaweed cultivation substrate according to claim 11, wherein repeating portions from about 0.9 mm to about 1.1 mm of the external surface of the core are not covered by the first cord.

20. The seaweed cultivation substrate according to claim 11, wherein repeating portions from about greater than 1.0 mm of the external surface of the core are not covered by the first cord.

* * * * *